(12) United States Patent
Fukuoka

(10) Patent No.: US 10,302,846 B2
(45) Date of Patent: May 28, 2019

(54) DISPLAY DEVICE

(71) Applicant: Sharp Kabushiki Kaisha, Sakai, Osaka (JP)

(72) Inventor: Kenta Fukuoka, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/548,207

(22) PCT Filed: Jan. 26, 2016

(86) PCT No.: PCT/JP2016/052114
§ 371 (c)(1),
(2) Date: Aug. 2, 2017

(87) PCT Pub. No.: WO2016/125624
PCT Pub. Date: Aug. 11, 2016

(65) Prior Publication Data
US 2018/0017729 A1 Jan. 18, 2018

(30) Foreign Application Priority Data
Feb. 2, 2015 (JP) .................................. 2015-018484

(51) Int. Cl.
*F21V 8/00* (2006.01)
*G02B 6/00* (2006.01)
(Continued)

(52) U.S. Cl.
CPC ............. *G02B 6/0056* (2013.01); *G02B 6/00* (2013.01); *G02B 6/005* (2013.01); *G02B 6/0033* (2013.01);
(Continued)

(58) Field of Classification Search
CPC ..................................................... G02B 6/0056
See application file for complete search history.

(56) References Cited

U.S. PATENT DOCUMENTS 5,796,454 A * 8/1998 Ma ....................... G02F 1/13718
349/176
8,314,902 B2 * 11/2012 Kim .................... G02F 1/13362
349/62

(Continued)

FOREIGN PATENT DOCUMENTS

CN 103376589 A 10/2013
JP 2001-332115 A 11/2001
(Continued)

*Primary Examiner* — Alexander K Garlen
(74) *Attorney, Agent, or Firm* — ScienBiziP, P.C.

(57) ABSTRACT

Provided is a display device that can be realized with a simple configuration and functions as a transparent display allowing background to be clearly seen therethrough. When a liquid crystal panel is in an ON state, polarized backlight that is incident from a polarized backlight unit reaches a front surface. At this point, ambient light that is incident from a rear side also reaches the front surface. Accordingly, an observer who is on a front side of a transparent display can visually recognize an image that is displayed in an overlaid manner on the background seen through the transparent display. In a case where the liquid crystal panel is placed into an OFF state, the polarized backlight cannot reach the front surface of the transparent display, and the ambient light reaches the front surface.

20 Claims, 39 Drawing Sheets

(51) Int. Cl.
  *G09F 9/00* (2006.01)
  *G02F 1/1333* (2006.01)
  *G02F 1/1335* (2006.01)
  *G02F 1/1347* (2006.01)

(52) U.S. Cl.
  CPC ....... *G02B 6/0068* (2013.01); *G02F 1/13362* (2013.01); *G02F 1/13471* (2013.01); *G02F 1/133536* (2013.01); *G09F 9/00* (2013.01); *G02F 2001/133342* (2013.01); *G02F 2001/133627* (2013.01)

(56) References Cited

U.S. PATENT DOCUMENTS

| | | | |
|---|---|---|---|
| 2005/0212993 A1* | 9/2005 | Lazarev | G02B 6/0056 349/62 |
| 2008/0088762 A1 | 4/2008 | Sawada et al. | |
| 2009/0168453 A1 | 7/2009 | Koike et al. | |
| 2011/0261291 A1* | 10/2011 | Park | G02B 6/0056 349/65 |
| 2013/0271674 A1 | 10/2013 | Liu et al. | |

FOREIGN PATENT DOCUMENTS

| | | |
|---|---|---|
| JP | 2005-011539 A | 1/2005 |
| JP | 2006-101333 A | 4/2006 |
| JP | 2006-128036 A | 5/2006 |
| JP | 2009-140916 A | 6/2009 |
| JP | 2014-130270 A | 7/2014 |

\* cited by examiner

FIG. 2
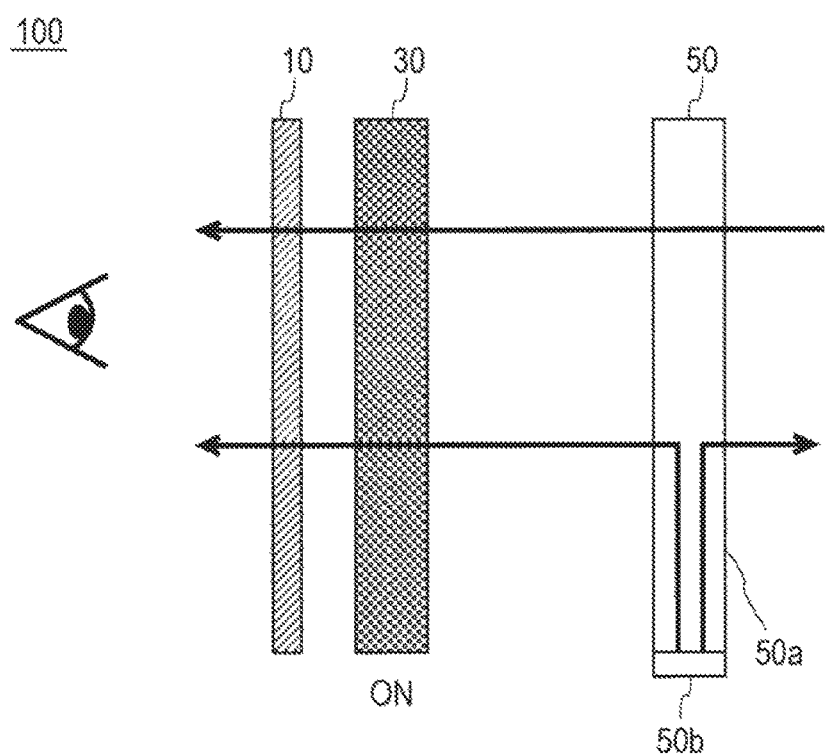
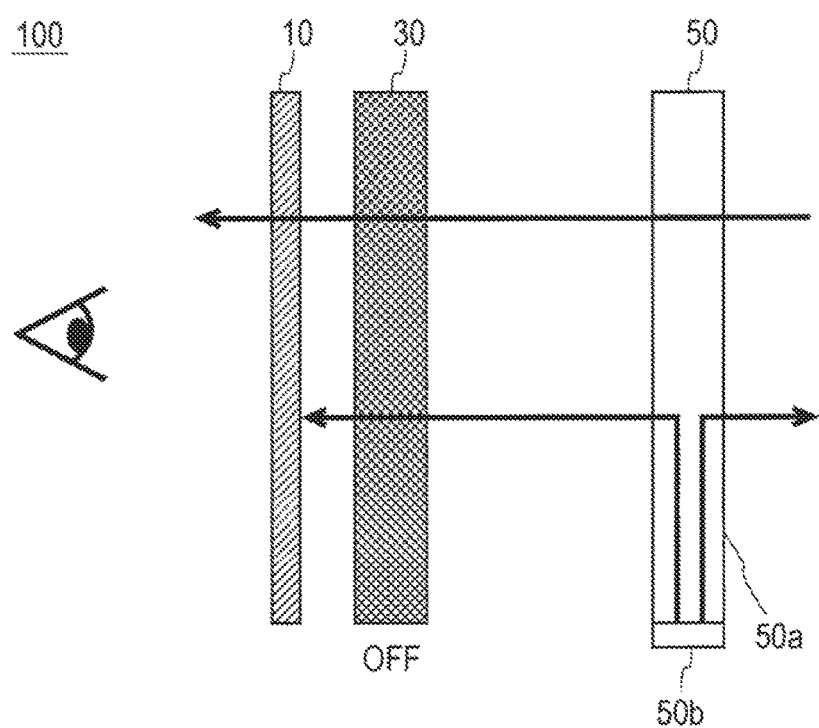

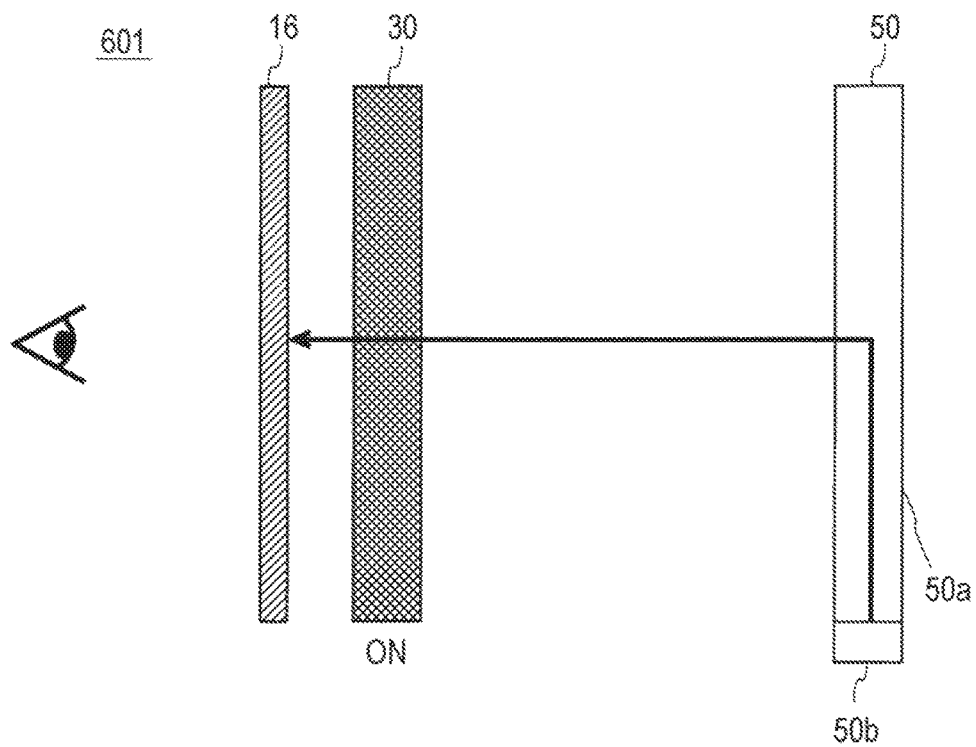
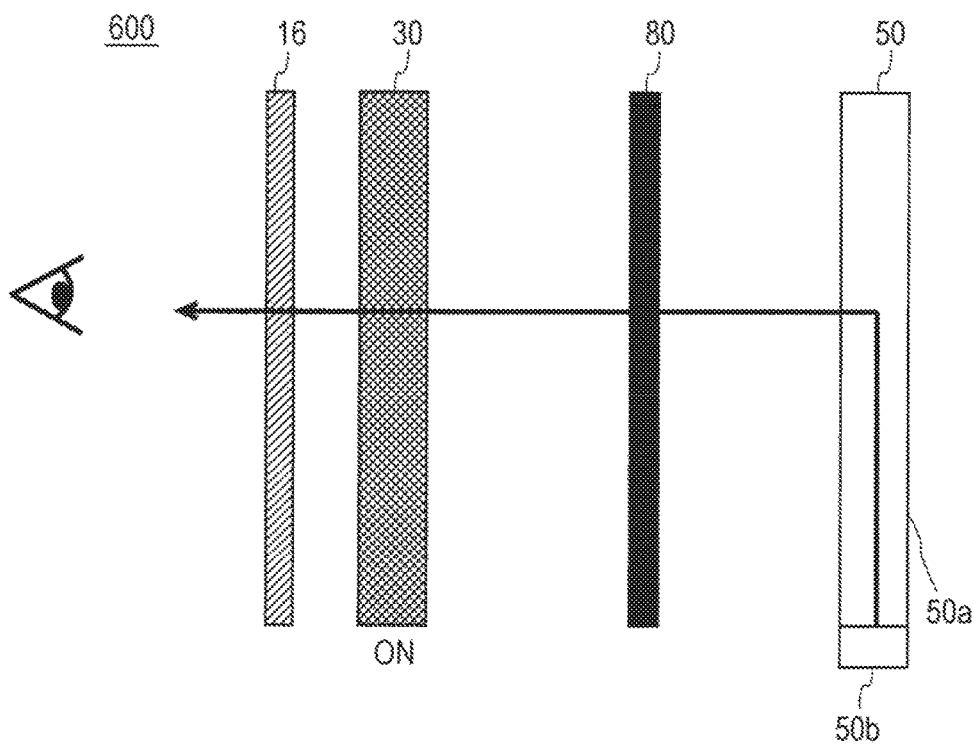

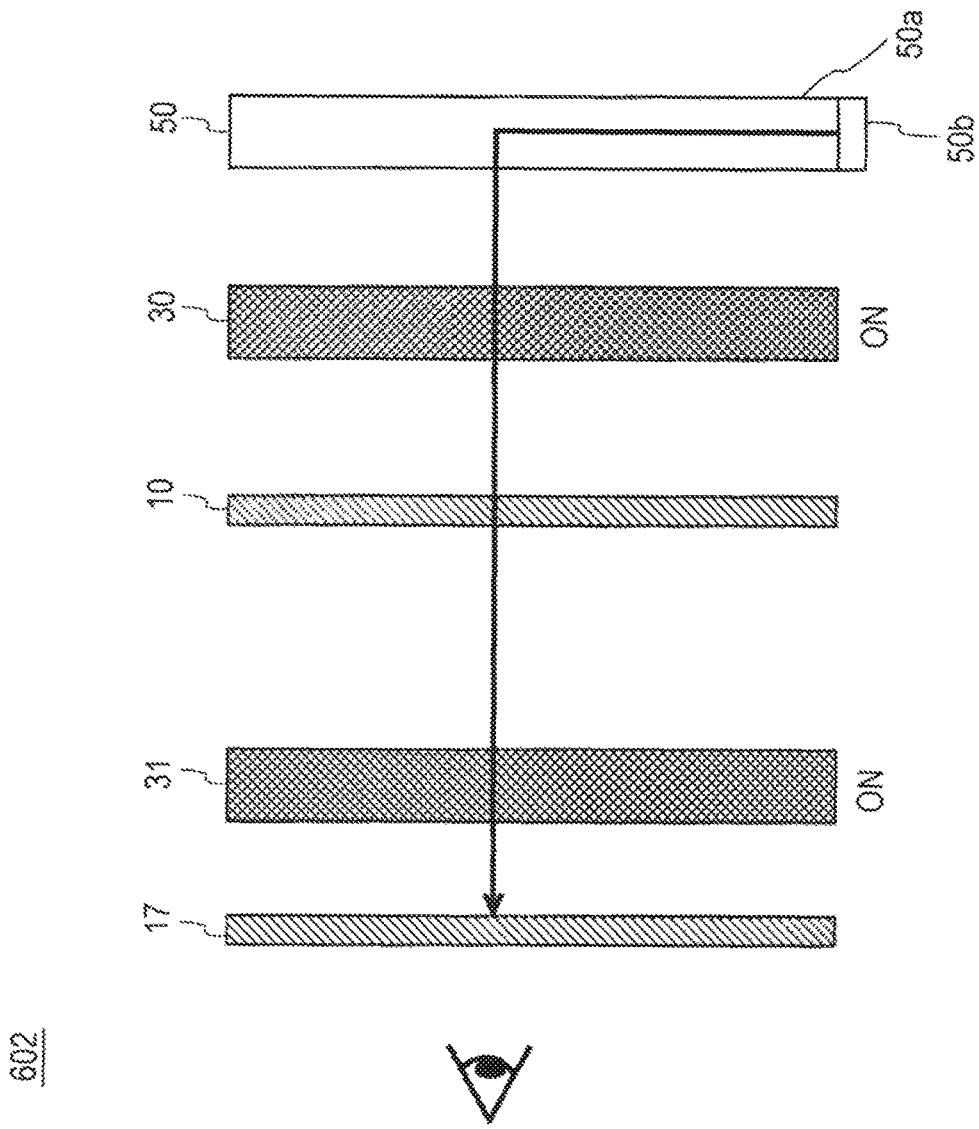

DISPLAY DEVICE

TECHNICAL FIELD

The present invention relates to a display device and particularly relates to a display device that functions as a transparent display allowing background to be seen therethrough.

BACKGROUND ART

In recent years, progress has been made in developing a transparent display that not only displays an image in accordance with image signals supplied from an external device but also allows the background to be seen therethrough. The transparent display has been gradually put on the market. As an example of such a transparent display, PTL 1 discloses a liquid crystal display device in which a prism is arranged between a liquid crystal panel and a light guide plate and a direction of light emitted from the light guide plate is changed by the prism to the normal direction of the light guide plate.

CITATION LIST

Patent Literature

PTL 1: Japanese Unexamined Patent Application Publication No. 2001-332115

SUMMARY OF INVENTION

Technical Problem

However, since the liquid crystal panel in the liquid crystal display device disclosed in PTL 1 is disposed between two polarizers, a problem arises in that the configuration of the liquid crystal display device is complicated. In addition, since the prism is arranged between the liquid crystal panel and the light guide plate, and a light reflective sheet is attached to a rear surface of the light guide plate, a problem arises in that the background at a rear side is not clearly seen from a front side through the liquid crystal display device.

Therefore, an object of the present invention is to provide a display device that can be realized with a simple configuration and functions as a transparent display allowing the background to be clearly seen therethrough.

Solution to Problem

A first aspect of the present invention is a display device that can display an image on a transparent display through which background is seen from a front side of the display device, the display device including a first illuminant/ambient light adjusting unit that is configured of a pixel array having a plurality of pixels arranged therein and modulates a polarization direction of incident light for each of the pixels and transmits the incident light to the front side in a case where a voltage corresponding to an externally provided image signal is applied; a polarized illumination unit that is arranged on a rear surface of the first illuminant/ambient light adjusting unit, transmits ambient light incident from a rear side thereof toward the first illuminant/ambient light adjusting unit, and emits polarized illumination light, of illuminant light emitted from an illuminant, including a specific polarization direction toward the first illuminant/ambient light adjusting unit; and a first polarized component separating unit that is arranged on a front surface of the first illuminant/ambient light adjusting unit and transmits at least any of the ambient light and the polarized illumination light having a polarization direction in the same direction as a transmission axis thereof to the front side in a case where at least any of the ambient light and the polarized illumination light is incident.

A second aspect of the present invention is that in the first aspect of the present invention, the first polarized component separating unit is a first absorptive separating unit that absorbs a polarized component of the incident light in the same direction as an absorption axis thereof and transmits a polarized component having a polarization direction in the same direction as a transmission axis thereof.

A third aspect of the present invention is that in the first aspect of the present invention, the display device further includes a second polarized component separating unit that is arranged on a rear surface of the polarized illumination unit and transmits a polarized component, of the ambient light incident from the rear side, having a polarization direction in the same direction as a transmission axis thereof.

A fourth aspect of the present invention is that in the third aspect of the present invention, the first polarized component separating unit is a first reflective separating unit that reflects a polarized component of the incident light having a polarization direction in the same direction as a reflection axis thereof and transmits a polarized component having a polarization direction in the same direction as a transmission axis thereof, and the second polarized component separating unit is a second absorptive separating unit that absorbs a polarized component of the incident light in the same direction as an absorption axis thereof and transmits a polarized component having a polarization direction in the same direction as a transmission axis thereof.

A fifth aspect of the present invention is that in the fourth aspect of the present invention, the display device further includes a third absorptive separating unit that is arranged on a front surface of the first reflective separating unit, absorbs a polarized component of the incident light in the same direction as an absorption axis thereof, and transmits a polarized component having a polarization direction in the same direction as a transmission axis thereof.

A sixth aspect of the present invention is that in the second aspect of the present invention, the display device further includes a light on/off control unit that is arranged on a front surface of the first absorptive separating unit, is configured of a pixel array having a plurality of pixels arranged therein, and modulates the incident light for each of the pixels and transmits the incident light to the front side in a case where a voltage corresponding to an externally provided image signal is applied; and a third polarized component separating unit that is arranged on a front surface of the light on/off control unit, transmits a polarized component of the ambient light incident from the rear side toward the front side, and absorbs or transmits the polarized illumination light.

A seventh aspect of the present invention is that in the sixth aspect of the present invention, the first illuminant/ambient light adjusting unit and the light on/off control unit are arranged in close contact with each other with the first absorptive separating unit disposed therebetween, and the size of the pixels included in the light on/off control unit is the same or approximately the same as the size of the pixels included in the first illuminant/ambient light adjusting unit.

An eighth aspect of the present invention is that in the second aspect of the present invention, the display device further includes a second illuminant/ambient light adjusting unit that is arranged on a rear surface of the polarized illumination unit, is configured of a pixel array having a plurality of pixels arranged therein, and modulates the polarization direction of the light for each of the pixels and transmits the incident light to the front side or the rear side in a case where a voltage corresponding to an externally provided image signal is applied; and a fourth polarized component separating unit that is arranged on a rear surface of the second illuminant/ambient light adjusting unit, transmits a polarized component of the ambient light to the front side, and transmits the polarized illumination light or the ambient light incident from the front side to the rear side.

A ninth aspect of the present invention is that in the eighth aspect of the present invention, the first illuminant/ambient light adjusting unit and the second illuminant/ambient light adjusting unit are arranged in close contact with each other with the polarized illumination unit disposed therebetween, and the size of the pixels included in the first illuminant/ambient light adjusting unit is different from the size of the pixels included in the second illuminant/ambient light adjusting unit.

A tenth aspect of the present invention is that in the third aspect of the present invention, the display device further includes a third illuminant/ambient light adjusting unit that is arranged on a rear surface of the second polarized component separating unit, is configured of a pixel array having a plurality of pixels arranged therein, and modulates the polarization direction of the incident light for each of the pixels and transmits the incident light to the front side or the rear side in a case where a voltage corresponding to an externally provided image signal is applied; and a fifth polarized component separating unit that is arranged on a rear surface of the third illuminant/ambient light adjusting unit, transmits a polarized component of the ambient light to the front side, and transmits ambient light incident from the front side to the rear side.

An eleventh aspect of the present invention is that in the first aspect of the present invention, the display device further includes a first polarization direction changing unit that changes a polarization direction of the polarized illumination light between the first illuminant/ambient light adjusting unit and the polarized illumination unit, in which the first polarization direction changing unit chances the polarization direction of the polarized illumination light to cause the polarized illumination light to be incident on the first illuminant/ambient light adjusting unit, thereby transmitting the polarized illumination light to the front side.

A twelfth aspect of the present invention is that in the first aspect of the present invention, the display device further includes a light on/off control unit that is arranged on the front side of the first polarized component separating unit, is configured of a pixel array having a plurality of pixels arranged therein, and modulates the incident light for each of the pixels and transmits the incident light to the front side in a case where a voltage corresponding to an externally provided image signal is applied; a third polarized component separating unit that is arranged on a front surface of the light on/off control unit; and a second polarization direction changing unit that is arranged between the light on/off control unit and the first polarized component separating unit and changes a polarization direction of the polarized illumination light, in which the second polarization direction changing unit changes the polarization direction of the polarized illumination light to cause the polarized illumination light to be incident on the light on/off control unit, thereby transmitting the polarized illumination light to the front side.

A thirteenth aspect of the present invention is that in the first aspect of the present invention, the polarized illumination unit includes an illuminant that emits the illuminant light, and a light guide plate that causes the illuminant light to propagate by total internal reflection on a surface thereof and emits the illuminant light to the front side and the rear side, the illuminant light includes at least a polarized component changing in a width direction of the light guide plate and is incident on the light guide plate from one edge or two opposite edges of the light guide plate, and the light guide plate emits the polarized component of the illuminant light changing in the width direction of the light guide plate to the front side and the rear side.

A fourteenth aspect of the present invention is that in the thirteenth aspect of the present invention, the polarized illumination unit further includes a plurality of illuminants and a plurality of cylindrical lenses respectively arranged in correspondence with the plurality of illuminants between the plurality of illuminants and the light guide plate, each of the plurality of cylindrical lenses aligns a traveling direction of the incident illuminant light and causes the illuminant light to be incident on the light guide plate in a state of the illuminant light being spread in the width direction, and the sum of the widths of the plurality of cylindrical lenses is approximately the same as the width of the light guide plate.

A fifteenth aspect of the present invention is that in the thirteenth aspect of the present invention, the polarized illumination unit further includes a polarized component selecting unit that is arranged between the illuminant and the light guide plate, and the polarized component selecting unit selects the polarized component, of polarized components included in the illuminant light, changing in the width direction of the light guide plate and emits the polarized component toward the light guide plate.

A sixteenth aspect of the present invention is that in the fifteenth aspect of the present invention, the polarized component selecting unit is an absorptive separating unit that absorbs a polarized component, of the polarized components included in the illuminant light, changing in a thickness direction of the light guide plate and transmits the polarized component changing in the width direction of the light guide plate.

A seventeenth aspect of the present invention is that in the fifteenth aspect of the present invention, the polarized component selecting unit is a reflective separating unit that reflects a polarized component, of the polarized components included in the illuminant light, changing in a thickness direction of the light guide plate and transmits the polarized component changing in the width direction of the light guide plate.

An eighteenth aspect of the present invention is that in the fifteenth aspect of the present invention, the polarized component selecting unit includes a polarization separating unit that separates a polarized component changing in the width direction of the light guide plate and a polarized component changing in a thickness direction of the light guide plate included in the illuminant light and a polarization direction converting unit that transmits only the polarized component changing in the thickness direction, the polarization separating unit emits the polarized component, of the polarized components included in the illuminant light, changing in the width direction of the light guide plate toward the light guide plate and causes the polarized component changing in the thickness direction to be incident on the polarization direction converting unit, and the polarization direction converting unit converts the polarized component changing in the thickness direction into the polarized component changing in the width direction of the light guide plate and emits the converted polarized component toward the light guide plate.

A nineteenth aspect of the present invention is that in the thirteenth aspect of the present invention, the illuminant is configured of a plurality of laser illuminants that emits laser light, the polarized illumination unit includes a plurality of cylindrical concave lenses that destroys a translation property of the laser light emitted from each of the plurality of laser illuminants to spread the laser light, and a plurality of cylindrical convex lenses that restores the translation property of the laser light in correspondence with the plurality of cylindrical concave lenses, and the sum of the widths of the plurality of cylindrical convex lenses is approximately the same as the width of the light guide plate.

A twentieth aspect of the present invention is that in the thirteenth aspect of the present invention, the polarized illumination unit includes a non-scattering reflective layer that is formed on an end surface at an edge of the light guide plate except for a light incidence edge where the illuminant light is incident, and the light guide plate reflects the illuminant light in a non-scattering manner, which propagates in the light guide plate and is incident on the non-scattering reflective layer, and causes the illuminant light to be emitted from a surface and an inner surface thereof.

A twenty-first aspect of the present invention is that in the thirteenth aspect of the present invention, the polarized illumination unit further includes a light absorptive layer that is formed on an end surface at an edge of the light guide plate except for a light incidence edge where the illuminant light is incident, and the light guide plate causes the illuminant light that propagates in the light guide plate and is incident on the light absorptive layer to be absorbed by the light absorptive layer, and causes the illuminant light that is not incident on the light absorptive layer to be emitted from a surface and an inner surface thereof.

A twenty-second aspect of the present invention is that in the thirteenth aspect of the present invention, distortion is not formed in the light guide plate.

A twenty-third aspect of the present invention is that in the thirteenth aspect of the present invention, a refractive index anisotropy axis is formed in the light guide plate in the width direction or a thickness direction of the light guide plate.

A twenty-fourth aspect of the present invention is that in the thirteenth aspect of the present invention, a protrusion that is configured of a material having approximately the same refractive index as the light guide plate is formed on a surface of the light guide plate.

A twenty-fifth aspect of the present invention is that in the thirteenth aspect of the present invention, a recess is formed on a surface of the light guide plate.

Advantageous Effects of Invention

According to the first aspect, the first polarized component separating unit that transmits at least any of the polarized illumination light and the ambient light having a polarization direction in the same direction as the transmission axis thereof to the front side is arranged on the front surface of the first illuminant/ambient light adjusting unit. Thus, at least any of the ambient light and the polarized illumination light having a polarization direction in the same direction as the transmission axis of the first polarized component separating unit can be transmitted to the front side. In the display device of such a simple configuration, controlling the polarization directions of the polarized illumination light and the ambient light enables displaying an image in an overlaid manner on the background seen through the display device or displaying only the background.

According to the second aspect, the display device transmits a polarized component of the polarized illumination light or the ambient light in the same direction as the transmission axis of the first absorptive separating unit. The display device of such a simple configuration can display the image in an overlaid manner on the background seen therethrough or display only the background. In addition, decreasing the number of constituent members can increase the transparency of the display device. Furthermore, an area of the image that is to be displayed in black is substantially transparent. Thus, the same type of displaying as the case of realizing a transparent display by an organic electro luminescence (EL) display or the like can be performed.

According to the third aspect, the second polarized component separating unit is arranged on the rear surface of the polarized illumination unit. Accordingly, the display device, in the state of maintaining a constant sum of the transmittance of the polarized illumination light and the transmittance of the ambient light transmitted by each pixel, can control gradation with the distribution ratio of the transmittances or reduce glare sensed by an observer on the rear side at the time of visual recognition by reducing light leaking to the rear side.

According to the fourth aspect, the first reflective separating unit transmits the polarized illumination light transmitted by the first illuminant/ambient light adjusting unit to the front side and also reflects the polarized illumination light to the rear side. The polarized illumination light reflected to the rear side is transmitted by the second absorptive separating unit. Accordingly, the display device of a simple configuration enables an observer on the front side and an observer on the rear side to visually recognize the same image.

According to the fifth aspect, the third absorptive separating unit is arranged on the front surface of the first reflective separating unit. Thus, the ambient light that is incident on the display device from the front side is reflected, and the display device functioning as a mirror display is prevented. Accordingly, the observer on the front side easily sees the image or the background on the rear side.

According to the sixth aspect, the light on/off control unit and the third polarized component separating unit are arranged on the front surface of the first absorptive separating unit. Thus, it is possible to separate the polarized illumination light and the ambient light and transmit any thereof to the front side, not transmit both thereof, or transmit the polarized illumination light and the ambient light with predetermined proportions. Accordingly, the display device can realize not only a turn-on state of displaying the image in an overlaid manner on the background or displaying the image per pixel and a transparent state of displaying only the background but also a turn-off state of not displaying the image and the background. Realizing the turn-off state enables black display. Thus, the display quality of the image can be improved.

According to the seventh aspect, the first illuminant/ambient light adjusting unit and the light on/off control unit are arranged in close contact with each other with the first absorptive separating unit interposed therebetween. Thus, even if the first illuminant/ambient light adjusting unit and the light on/off control unit have the same or approximately the same pixel size, generation of moire can be reduced. In addition, since illuminant/ambient light adjusting units having the same pixel size can be used as the first illuminant/ ambient light adjusting unit and the light on/off control unit, the efficiency of use of light can be improved, and the manufacturing cost of the display device can be decreased.

According to the eighth aspect, the second illuminant/ambient light adjusting unit and the fourth polarized component separating unit are arranged on the rear surface of the polarized illumination unit. Thus, it is possible to transmit any of the polarized illumination light and the ambient light to the front side or the rear side of the display device, not transmit both thereof, or transmit the polarized illumination light and the ambient light with predetermined proportions. Accordingly, the display device, in the same manner as the case of the sixth aspect, realizes not only the turn-on state of displaying the image per pixel and the transparent state of displaying only the background but also the turn-off state of not displaying the image and the background, thereby enabling black display. Thus, the display quality of the image can be improved. In addition, the first illuminant/ambient light adjusting unit and the second illuminant/ambient light adjusting unit are arranged left and right of the polarized illumination unit with the polarized illumination unit interposed therebetween. Therefore, applying voltages corresponding to different image signals to the first and second illuminant/ambient light adjusting units enables displaying different images in the first and second illuminant/ambient light adjusting units. Thus, the observer on the front side of the display device and the observer on the rear side can visually recognize different images.

According to the ninth aspect, the first illuminant/ambient light adjusting unit and the second illuminant/ambient light adjusting unit are arranged in close contact with each other with the polarized illumination unit interposed therebetween. Thus, the first illuminant/ambient light adjusting unit and the second illuminant/ambient light adjusting unit are arranged at at least a distance corresponding to the thickness of the polarized illumination unit. In this case, using different pixel sizes for both of the first illuminant/ambient light adjusting unit and the second illuminant/ambient light adjusting unit can reduce generation of moire.

According to the tenth aspect, a configuration from the first polarized component separating unit to the second polarized component separating unit is the same as the configuration of the third aspect. Thus, any of the polarized illumination light and the ambient light can be transmitted to the front side. In addition, the third illuminant/ambient light adjusting unit and the fifth polarized component separating unit function as a shutter that transmits or blocks the ambient light incident from the rear side. Thus, the display device can realize not only the turn-on state of displaying the image and the transparent state of the background being seen therethrough but also the turn-off state of blocking both of the polarized illumination light and the ambient light. Accordingly, black display is enabled, and the display quality of the image can be improved.

According to the eleventh aspect, the first polarization direction changing unit that changes the polarization direction of the polarized illumination light is arranged between the first illuminant/ambient light adjusting unit and the polarized illumination unit. Accordingly, in the case of a difference between the direction of the transmission axis of the first illuminant/ambient light adjusting unit or the first polarized component separating unit arranged on the front surface of the first illuminant/ambient light adjusting unit and a desired direction, the polarization direction of the polarized illumination light is changed, and the polarized illumination light is transmitted by the first polarized component separating unit and the first illuminant/ambient light adjusting unit. Accordingly, without preparation of a new first illuminant/ambient light adjusting unit or a new first polarized component separating unit, the observer on the front side of the display device can visually recognize the image. Thus, the manufacturing cost of the display device can be reduced to be low.

According to the twelfth aspect, the second polarization direction changing unit that changes the polarization direction of the polarized illumination light is arranged between the light on/off control unit and the first polarized component separating unit. Accordingly, in the case of a difference between the direction of the transmission axis of the light on/off control unit or the third polarized component separating unit arranged on the front surface of the light on/off control unit and a desired direction, the polarization direction of the polarized illumination light is changed by the second polarization direction changing unit, and the polarized illumination light is transmitted by the light on/off control unit and the third polarized component separating unit. Accordingly, without preparation of a new light on/off control unit or a new third polarized component separating unit, the observer on the front side of the display device can visually recognize the image. Thus, the manufacturing cost of the display device can be reduced to be low.

According to the thirteenth aspect, incidence of the illuminant light in the light guide plate from one edge or two opposite edges of the light guide plate can improve the degree of polarization of emitted light of the light guide plate.

According to the fourteenth aspect, when the illuminant light emitted from the illuminant is transmitted by the cylindrical lens, the translation property of the illuminant light is improved, and thus the degree of polarization of the emitted light of the light guide plate can be improved.

According to the fifteenth aspect, the polarized component selecting unit improves the degree of polarization of the illuminant light immediately before incidence on the light guide plate. Thus, the degree of polarization of the emitted light of the light guide plate can be improved.

According to the sixteenth aspect, in the case of the polarized component selecting unit being an absorptive separating unit, illuminant light of a high degree of polarization can be incident on the light guide plate, and the manufacturing cost of the polarized illumination unit can be decreased.

According to the seventeenth aspect, in the case of the polarized component selecting unit being a reflective separating unit, the reflected illuminant light can be reused. Thus, the efficiency of use of the polarized component selecting unit can be increased.

According to the eighteenth aspect, the polarized component selecting unit includes the polarization separating unit and the polarization direction converting unit, and the polarization separating unit can cause illuminant light of a high degree of polarization to be incident on the light guide plate. In addition, the polarization direction converting unit converts the polarization direction of the polarized component separated by the polarization separating unit to the same polarization direction as the polarized component transmitted by the polarization separating unit. Thus, the illuminant light can be efficiently used.

According to the nineteenth aspect, the laser illuminant can be used as the illuminant. Thus, the polarized illumination light emitted from the light guide plate has a high degree of polarization, and an image of high reproducibility can be displayed.

According to the twentieth aspect, forming the non-scattering reflective layer on the end surfaces of the light guide plate can prevent disturbance of the traveling direction and polarization of light that may be generated when light propagating in the light guide plate reaches the end surfaces of the light guide plate. Accordingly, the degree of polarization of the emitted light of the light guide plate can be improved.

According to the twenty-first aspect, forming the light absorptive layer on the end surfaces of the light guide plate can prevent disturbance of the traveling direction and polarization of light that may be generated when light propagating in the light guide plate reaches the end surfaces of the light guide plate. Accordingly, the degree of polarization of the emitted light of the light guide plate can be improved.

According to the twenty-second aspect, the light guide plate having no distortion can reduce disturbance of polarization when light propagates in the light guide plate. Accordingly, the degree of polarization of the emitted light of the light guide plate can be improved.

According to the twenty-third aspect, the illuminant light that is incident on the light guide plate propagates in such a manner that the polarization direction thereof is along the refractive index anisotropy axis. Therefore, if the direction of the refractive index anisotropy axis in the light guide plate is constant, the illuminant light incident on the light guide plate propagates without the polarization direction thereof being disturbed. Accordingly, the degree of polarization of the polarized illumination light emitted from the light guide plate can be improved.

According to the twenty-fourth aspect, the light guide plate having the protrusion on, the surface thereof can cause light propagating in the light guide plate to be acquired in the state of minimum disturbance of the polarization direction of the light. Accordingly, the degree of polarization of the emitted light of the light guide plate can be improved.

According to the twenty-fifth aspect, the light guide plate having the recess on the surface thereof can cause light propagating in the light guide plate to be acquired in the state of minimum disturbance of the polarization direction of the light. Accordingly, the degree of polarization of the emitted light of the light guide plate can be improved.

BRIEF DESCRIPTION OF DRAWINGS

FIG. 2 is a diagram illustrating transmission of polarized backlight and ambient light in the transparent display illustrated in FIG. 1. More specifically, FIG. 2(A) is a diagram illustrating the transmission of polarized backlight and ambient light in the transparent display in the case of displaying an image on the transparent display, and FIG. 2(B) is a diagram illustrating the transmission of polarized backlight and ambient light in the transparent display in the case of not displaying an image on the transparent display.

FIG. 4(A) is a diagram illustrating the transmission of polarized backlight and ambient light in the transparent display in the case of displaying an image on the transparent display, and FIG. 4(B) is a diagram illustrating the transmission of polarized backlight and ambient light in the transparent display in the case of not displaying an image on the transparent display.

FIG. 7(A) is a diagram illustrating the transmission of polarized backlight and ambient light in the transparent display in the case of displaying an image on the transparent display, and FIG. 7(B) is a diagram illustrating the transmission of polarized backlight and ambient light in the transparent display in the case of not displaying an image on the transparent display.

FIG. 28 is a diagram illustrating transmission of polarized backlight in a transparent display where a λ/2 waveplate is not arranged.

FIG. 29 is a diagram illustrating the transmission of polarized backlight and ambient light in the transparent display illustrated in FIG. 27.

FIG. 30 is a diagram illustrating the transmission of polarized backlight in a transparent display where a λ/2 waveplate is not arranged.

DESCRIPTION OF EMBODIMENTS

1. First Embodiment

Figure 1:
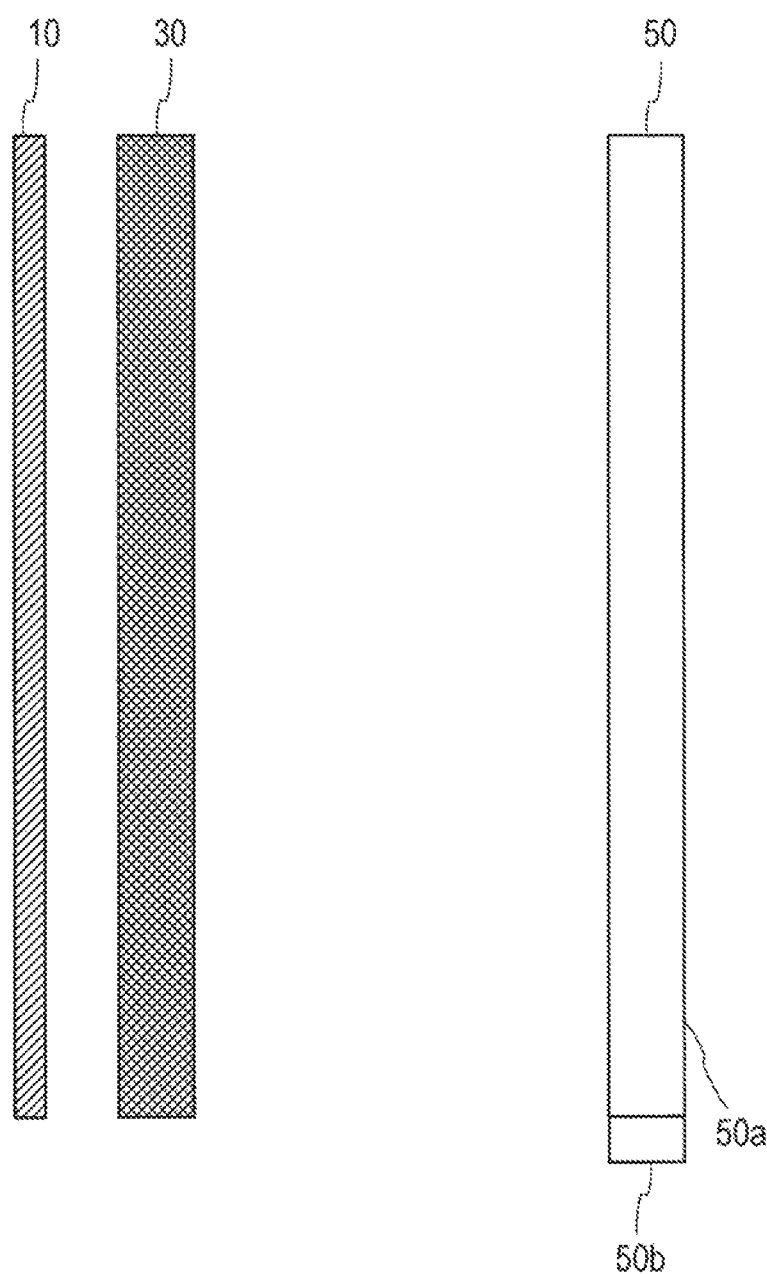
FIG. 1 is a diagram illustrating a configuration of a transparent display according to a first embodiment of the present invention.

FIG. 1 is a diagram illustrating a configuration of a transparent display 100 according to a first embodiment of the present invention. As illustrated in FIG. 1, in the transparent display 100 that is a display device, an absorptive polarizer 10, a liquid crystal panel 30, and a polarized backlight unit 50 are arranged in parallel in this order from a front side. The absorptive polarizer 10 has a characteristic of transmitting a polarized component of incident light that has a polarization direction in the same direction as a transmission axis, and absorbing a polarized component that has a polarization direction orthogonal with respect to the direction of the transmission axis (a polarization direction in the same direction as an absorption axis). In the present specification, the absorptive polarizer 10 and a reflective polarizer 21 of a transparent display 300 described later may be collectively referred to as a "first polarized component separating unit". The absorptive polarizer 10 may be referred to as a "first absorptive separating unit". The liquid crystal panel 30 may be referred to as a "first illuminant/ambient light adjusting unit". The polarized backlight unit 50 may be referred to as a "polarized illumination unit".

The polarized backlight unit 50 includes a light guide plate 50a and an illuminant 50b that is attached to an end portion of the light guide plate 50a. The polarized backlight unit 50 emits a polarized component, of light emitted from the illuminant 50b, having a specific polarization direction toward the liquid crystal panel 30 as backlight. The polarized backlight unit 50 transmits, toward the liquid crystal panel 30, ambient light that is incident from a rear side and includes polarized components of all polarization directions (unpolarized light). It is preferable that the polarized backlight unit 50 emit backlight that includes a large amount of a specific polarized component, and have a high transmittance of the ambient light incident from the rear side. Specifically, it is preferable that the polarized backlight unit 50 emit backlight of which the degree of polarization defined by Formula (1) is larger than or equal to 0.6, and have a transmittance of larger than or equal to 80% of the ambient light.

$$\text{Degree of polarization} = (I1-I2)/(I1+I2) \quad (1)$$

In Formula (1), I1 and I2 are respectively the maximum intensity and the minimum intensity of polarized components that have orthogonal polarization directions. In the present specification, backlight that has a high degree of polarization is referred to as "polarized illumination light". A specific configuration of the polarized backlight unit 50 emitting polarized backlight will be described in detail in the latter part of the present specification.

FIG. 2 is a diagram illustrating transmission of the polarized backlight and the ambient light in the transparent display 100. More specifically, FIG. 2(A) is a diagram illustrating the transmission of the polarized backlight and the ambient light in the transparent display 100 in the case of displaying an image on the transparent display 100, and FIG. 2(B) is a diagram illustrating the transmission of the polarized backlight and the ambient light in the transparent display 100 in the case of not displaying an image on the transparent display 100. In the following description, the polarization direction of the polarized backlight emitted from the polarized backlight unit 50 is assumed to be the same as the direction of the absorption axis of the absorptive polarizer 10. Hereinafter, the polarization direction of the polarized backlight emitted from the polarized backlight unit 50 will be described as being the same as the direction of the absorption axis of the absorptive polarizer 10 in the state of a voltage not being applied to the liquid crystal panel 30.

First, the case illustrated in FIG. 2(A) will be described. If the polarized backlight is incident on the liquid crystal panel 30 from the polarized backlight unit 50 in the state of a voltage corresponding to an externally provided image signal being applied to the liquid crystal panel 30 (liquid crystal ON state), the polarization direction of the polarized backlight is rotated by 90° by the liquid crystal panel 30, and the polarized backlight is incident on the absorptive polarizer 10. Consequently, the polarization direction of the polarized backlight is the same as the direction of the transmission axis of the absorptive polarizer 10. Thus, the polarized backlight is transmitted by the absorptive polarizer 10 and reaches the front surface of the transparent display 100.

Meanwhile, the ambient light incident from the rear side is unpolarized light. Thus, a polarized component having a polarization direction in the same direction as the transmission axis of the absorptive polarizer 10 is transmitted by the absorptive polarizer 10 and reaches the front surface of the transparent display 100. Accordingly, an observer who is on the front side of the transparent display 100 can visually recognize an image that is displayed in an overlaid manner on the background seen through the transparent display 100.

Next, the case illustrated in FIG. 2(B) will be described. If the polarized backlight is incident on the liquid crystal panel 30 from the polarized backlight unit 50 in the state of a voltage corresponding to an externally provided image signal not being applied to the liquid crystal panel 30 (liquid crystal OFF state), the polarized backlight is incident on the absorptive polarizer 10 without the polarization direction thereof being rotated by the liquid crystal panel 30. Consequently, the polarization direction of the polarized backlight is the same as the direction of the absorption axis of the absorptive polarizer 10. Thus, the polarized backlight is absorbed by the absorptive polarizer 10 and cannot reach the front surface of the transparent display 100.

Meanwhile, the ambient light incident from the rear side is unpolarized light. Thus, a polarized component, of the ambient light transmitted by the liquid crystal panel 30, having a polarization direction in the same direction as the transmission axis of the absorptive polarizer 10 is transmitted by the absorptive polarizer 10 and reaches the front surface of the transparent display 100. Accordingly, the observer on the front side of the transparent display 100 can visually recognize the background seen through the transparent display 100 and cannot visually recognize the image.

If the voltage applied to the liquid crystal panel 30 is changed from the state illustrated in FIG. 2(B) to the state illustrated in FIG. 2(A), the rotation angle of the polarization direction of the polarized backlight is consequently increased, and the proportion of a polarized component, included in the polarized backlight, that is in the same direction as the transmission axis of the absorptive polarizer 10 is increased. Meanwhile, the ambient light is typically unpolarized light. Thus, even if the polarization direction thereof is rotated, the proportion of a polarized component, included in the ambient light, that is in the same direction as the transmission axis of the absorptive polarizer 10 is not changed. Thus, the transmittance of the ambient light transmitted by the absorptive polarizer 10 is constant at all times.

Therefore, during the period from the state illustrated in FIG. 2(B) to the state illustrated in FIG. 2(A), the image that is displayed in an overlaid manner on the background seen through the transparent display 100 is visually recognized in the same manner as the case illustrated in FIG. 2(A). As the applied voltage is increased, the luminance of the image visually recognized by the observer is increased, and the luminance of the background is constant and not changed. Changing the applied voltage of the liquid crystal panel 30 enables the image to be displayed with gradation. The polarized backlight from the polarized backlight unit 50 is also emitted to the rear side. Thus, the observer on the rear side senses glare when seeing the transparent display 100.

Accordingly, in the present embodiment, arranging the polarized backlight unit 50, which emits the polarized backlight, on the rear side of the liquid crystal panel 30 and arranging the absorptive polarizer 10 on the front side of the liquid crystal panel 30 enables displaying the image with gradation or not displaying the image. The ambient light is transmitted by the front surface with a constant transmittance at all times. Thus, the observer can visually recognize the background that is displayed with constant luminance.

A reflective polarizer of which the transmission axis and the reflection axis are respectively the same as the transmission axis and the absorption axis of the absorptive polarizer 10 may be arranged instead of the absorptive polarizer 10. In the case of arranging the reflective polarizer, the same effect as the case of arranging the absorptive polarizer 10 is acquired. In the present specification, the absorptive polarizer 10 and the reflective polarizer may be collectively referred to as a "first polarized component selecting unit".

1.1 Effect

According to the present embodiment, using the polarized backlight unit 50 allows the absorptive polarizer 10 to be arranged on only the front side of the liquid crystal panel 30, and the liquid crystal panel 30 is not required to be interposed between polarizers from both sides thereof. Thus, the transparent display 100 can have a simple configuration. Accordingly, the manufacturing cost of the transparent display 100 can be decreased, and both of the image and the background can be brightly displayed with improved transmittance.

Switching the polarized backlight unit 50 ON/OFF enables the transparent display 100 to display the image in an overlaid manner on the background seen therethrough or to allow only the background to be seen therethrough. In addition, an area of the image that is to display black becomes transparent and can display the background. Accordingly, the same type of displaying as the case of realizing the transparent display by using an organic EL display or the like is enabled.

The polarized backlight unit 50 emits a polarized component, of light from the illuminant, having a specific polarization direction toward not only the liquid crystal panel 30 but also the rear side. The polarized component that is emitted to the rear side can be used as illumination on the rear side.

2. Second Embodiment

Figure 3:
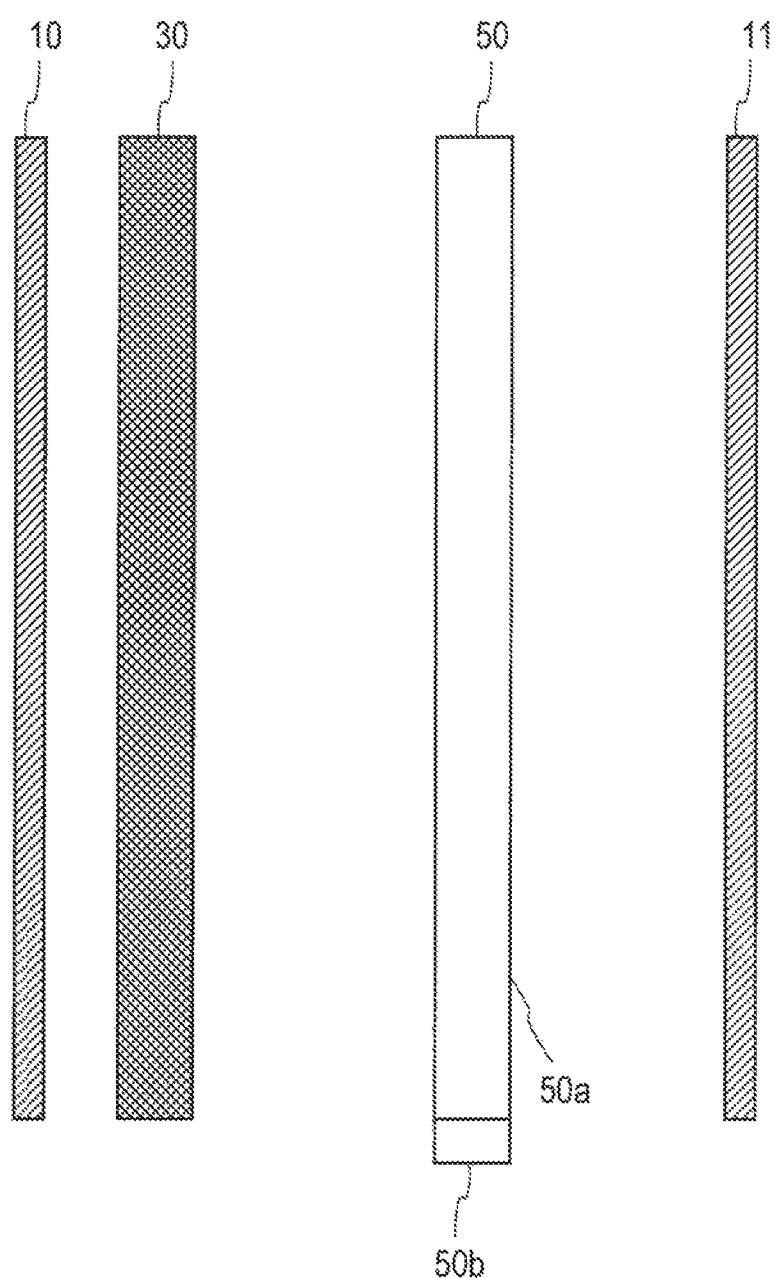
FIG. 3 is a diagram illustrating a configuration of a transparent display according to a second embodiment of the present invention.

FIG. 3 is a diagram illustrating a configuration of a transparent display 200 according to a second embodiment of the present invention. As illustrated in FIG. 3, in the transparent display 200 that is a display device, an absorptive polarizer 11 is further arranged on the rearmost surface of the transparent display 100 illustrated in FIG. 1. That is, the absorptive polarizer 10, the liquid crystal panel 30, the polarized backlight unit 50, and the absorptive polarizer 11 are arranged in parallel in this order from the front side of the transparent display 200. In the present specification, the absorptive polarizer 11 and a reflective polarizer 20 of a transparent display 210 described later may be collectively referred to as a "second polarized component separating unit". The absorptive polarizer 11 may be referred to as a "second absorptive separating unit".

The directions of the absorption axis and the transmission axis of the absorptive polarizer 11 arranged on the rearmost surface of the transparent display 200 are respectively the same as the directions of the absorption axis and the transmission axis of the absorptive polarizer 10. In addition, in the present embodiment, the polarization direction of the polarized backlight emitted from the polarized backlight unit 50 is assumed to be the same as the directions of the absorption axes of the absorptive polarizers 10 and 11. That is, in the present embodiment, the polarization direction of the ambient light transmitted by the absorptive polarizer 11 is orthogonal with respect to the polarization direction of the polarized backlight emitted from the polarized backlight unit 50.

Figure 4:
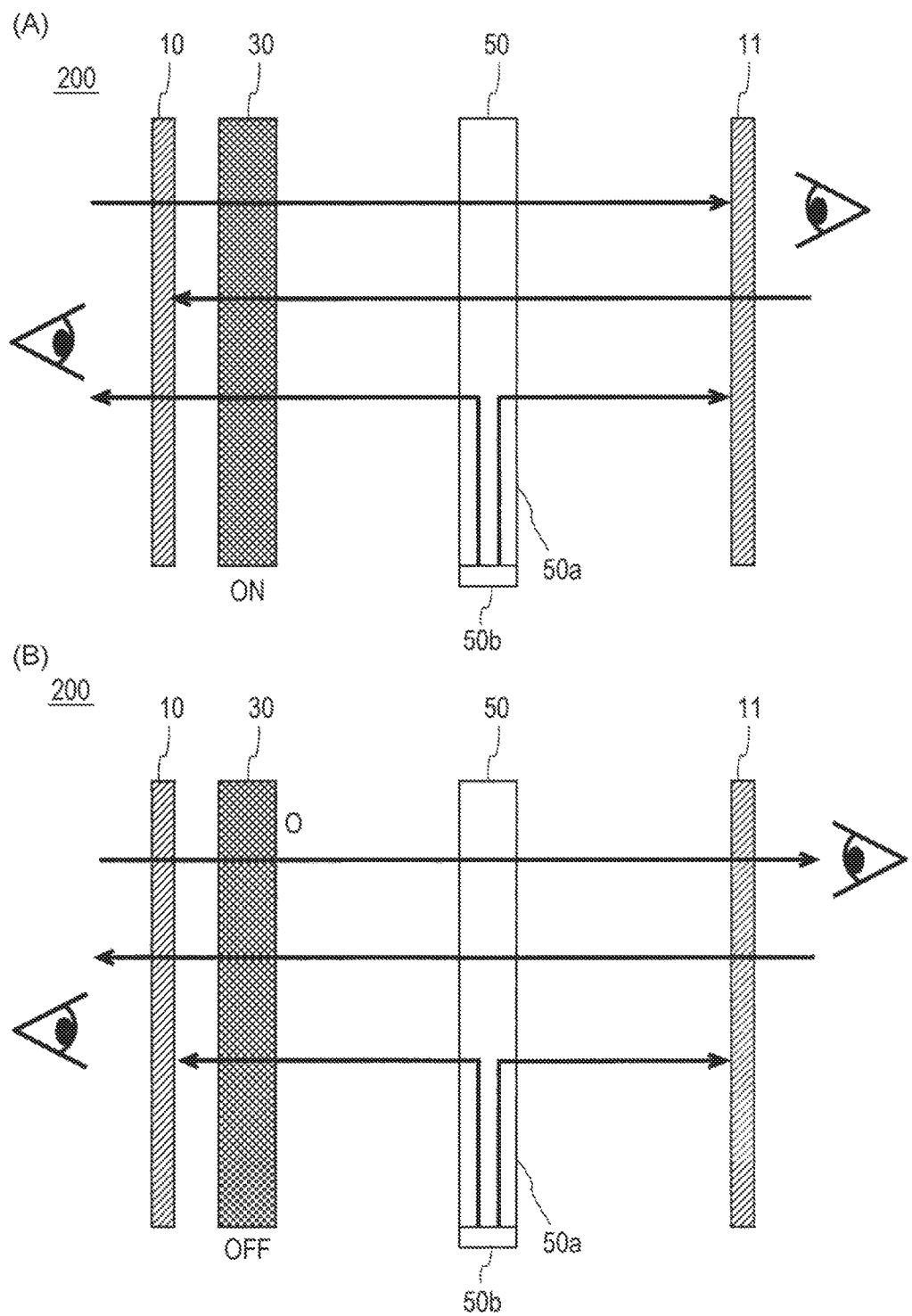
FIG. 4 is a diagram illustrating transmission of polarized backlight and ambient light in the transparent display illustrated in FIG. 3. More specifically.

FIG. 4 is a diagram illustrating transmission of the polarized backlight and the ambient light in the transparent display 200. More specifically, FIG. 4(A) is a diagram illustrating the transmission of the polarized backlight and the ambient light in the transparent display 200 in the case of displaying an image on the transparent display 200, and FIG. 4(B) is a diagram illustrating the transmission of the polarized backlight and the ambient light in the transparent display 200 in the case of not displaying an image on the transparent display 200.

First, the case illustrated in FIG. 4(A) will be described. If the polarized backlight emitted from the polarized backlight unit 50 is incident on the liquid crystal panel 30 when the liquid crystal panel 30 is in the ON state, the polarization direction of the polarized backlight is rotated by 90°, and the polarized backlight is incident on the absorptive polarizer 10. Consequently, the polarization direction of the polarized backlight is the same as the direction of the transmission axis of the absorptive polarizer 10. Thus, the polarized backlight is transmitted by the absorptive polarizer 10 and reaches the front surface of the transparent display 200.

Meanwhile, the polarization direction of a polarized component, of the ambient light incident from the rear side, that is transmitted by the absorptive polarizer 11 is rotated by 90° by the liquid crystal panel 30, and the polarized component is incident on the absorptive polarizer 10. Consequently, since the polarization direction of the ambient light is the same as the direction of the absorption axis of the absorptive polarizer 10, the ambient light is absorbed by the absorptive polarizer 10. Thus, the observer on the front side of the transparent display 200 can visually recognize only the image and cannot visually recognize the background.

Next, the case illustrated in FIG. 4(B) will be described. If the polarized backlight emitted from the polarized backlight unit 50 is incident on the liquid crystal panel 30 when the liquid crystal panel 30 is in the OFF state, the polarized backlight is incident on the absorptive polarizer 10 without the polarization direction thereof being rotated. Consequently, the polarization direction of the polarized backlight is the same as the direction of the absorption axis of the absorptive polarizer 10. Thus, the polarized backlight is absorbed by the absorptive polarizer 10 and cannot reach the front surface of the transparent display 200.

Meanwhile, a polarized component, of the ambient light incident from the rear side, that is transmitted by the absorptive polarizer 11 is incident on the absorptive polarizer 10 without the polarization direction thereof being rotated by the liquid crystal panel 30. Consequently, the polarization direction of the ambient light is the same as the direction of the transmission axis of the absorptive polarizer 10. Thus, the ambient light is transmitted by the absorptive polarizer 10 and reaches the front surface of the transparent display 200. Thus, the observer on the front side of the transparent display 200 can visually recognize only the background seen through the transparent display 200.

If the voltage applied to the liquid crystal panel 30 is changed from the state illustrated in FIG. 4(B) to the state illustrated in FIG. 4(A), the rotation angle of the polarization direction of the polarized backlight is consequently increased, and the proportion of a polarized component, included in the polarized backlight, that is in the same direction as the transmission axis of the absorptive polarizer 10 is increased. Meanwhile, the polarization direction of the ambient light approaches the direction of the absorption axis of the absorptive polarizer 10. Thus, the proportion of the polarized component of the ambient light transmitted by the absorptive polarizer 10 is decreased. Consequently, during the period from the state illustrated in FIG. 4(B) to the state illustrated in FIG. 4(A), the image displayed in an overlaid manner on the background seen through the transparent display 200 is visually recognized in the same manner as the case illustrated in FIG. 4(A). In this case, as the applied voltage is increased, the luminance of the image is increased, and the luminance of the background is decreased.

Rotating the polarization direction of the polarized backlight or the ambient light per pixel by the liquid crystal panel 30 or transmitting the polarized backlight or the ambient light without rotation allows the polarized backlight or the ambient light to be transmitted to the front side of the transparent display 200, and the polarized backlight and the ambient light are transmitted with transmission proportions determined in accordance with the applied voltage of the liquid crystal panel 30. In this case, the transmittance of the polarized backlight and the transmittance of the ambient light are changed with the sum thereof being constant. Thus, the transmittance of the ambient light is decreased if the transmittance of the polarized backlight is increased by increasing the applied voltage, and the transmittance of the ambient light is increased if the transmittance of the polarized backlight is decreased by decreasing the applied voltage. In addition, changing the applied voltage of the liquid crystal panel 30 enables the image to be displayed with gradation. Accordingly, at least any one of the image and the background is displayed at all times on the transparent display 200.

The polarized backlight unit 50 emits the polarized backlight also to the rear side. However, the polarized backlight emitted to the rear side is absorbed by the absorptive polarizer 11. Thus, the observer on the rear side cannot visually recognize the image and does not sense glare. However, the ambient light incident from the front side of the transparent display 200 is transmitted by the absorptive polarizer 10 and the absorptive polarizer 11 without the polarization direction thereof being rotated and reaches the rear surface. Thus, the observer on the rear side can visually recognize the background on the front side.

2.1 Effect

According to the present embodiment, using the polarized backlight unit 50 allows the absorptive polarizer 10 to be arranged on only the front side of the liquid crystal panel 30, and the liquid crystal panel 30 is not required to be interposed between polarizers from both sides thereof. Thus, the transparent display 200 can have a simple configuration. In addition, with such a configuration, the manufacturing cost of the transparent display 200 can be decreased, and both of the image and the background can be brightly displayed with improved transmittance.

The polarization directions of the polarized backlight and the ambient light immediately before being incident on the liquid crystal panel 30 are orthogonal with respect to each other. Thus, only the image or the background can be displayed unlike the case of the first embodiment. In addition, changing the transmittances of the polarized backlight and the ambient light transmitted to the front side with the sum thereof being constant per pixel enables gradation of the image and the background to be controlled in accordance with the transmission proportions of the polarized backlight and the ambient light. Furthermore, arranging the absorptive polarizer 11 on the rear side enables reducing the polarized backlight leaking to the rear side. Thus, the observer is unlikely to sense glare when seeing the transparent display 200 from the rear side.

2.2 Modification Example

Figure 5:
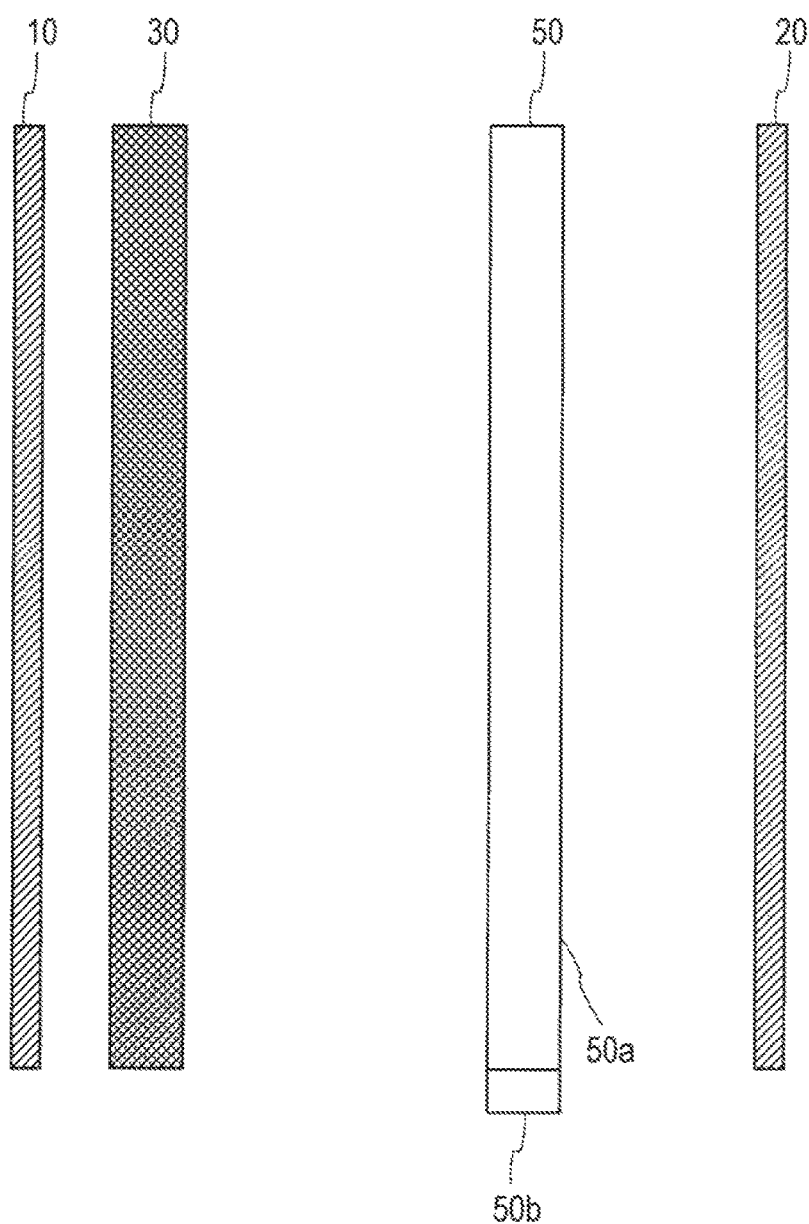
FIG. 5 is a diagram illustrating a configuration of a transparent display according to a modification example of the second embodiment of the present invention.

FIG. 5 is a diagram illustrating a configuration of a transparent display 210 according to a modification example of the present embodiment. Of each constituent of the transparent display 210 that is the display device illustrated in FIG. 5, the same constituents as the constituents illustrated in FIG. 3 will be designated by the same reference signs and will not be described. As illustrated in FIG. 5, the reflective polarizer 20 instead of the absorptive polarizer 11 is arranged on the rearmost surface of the transparent display 210. The reflective polarizer 20 has a characteristic of transmitting a polarized component of incident light that has a polarization direction in the same direction as a transmission axis, and reflecting a polarized component that has a polarization direction orthogonal with respect to the direction of the transmission axis (a polarization direction in the same direction as a reflection axis). In the present modification example, the directions of the reflection axis and the transmission axis of the reflective polarizer 20 are respectively the same as the directions of the absorption axis and the transmission axis of the absorptive polarizer 10. In the present specification, the reflective polarizer 20 and the absorptive polarizer 11 of the transparent display 200 may be collectively referred to as the "second polarized component separating unit". The reflective polarizer 20 may be referred to as a "first reflective separating unit".

The transmission of the polarized backlight and the ambient light in the transparent display 210 are the same as the cases illustrated in FIG. 4(A) and FIG. 4(B) except that the polarized backlight is reflected by the reflective polarizer 20. Thus, descriptions and drawings thereof will not be provided. In the transparent display 210 as well, changing the voltage applied to the liquid crystal panel 30 enables only the image to be seen, only the background to be seen through the transparent display 210, or the image displayed in an overlaid manner on the background to be seen.

3. Third Embodiment

Figure 6:
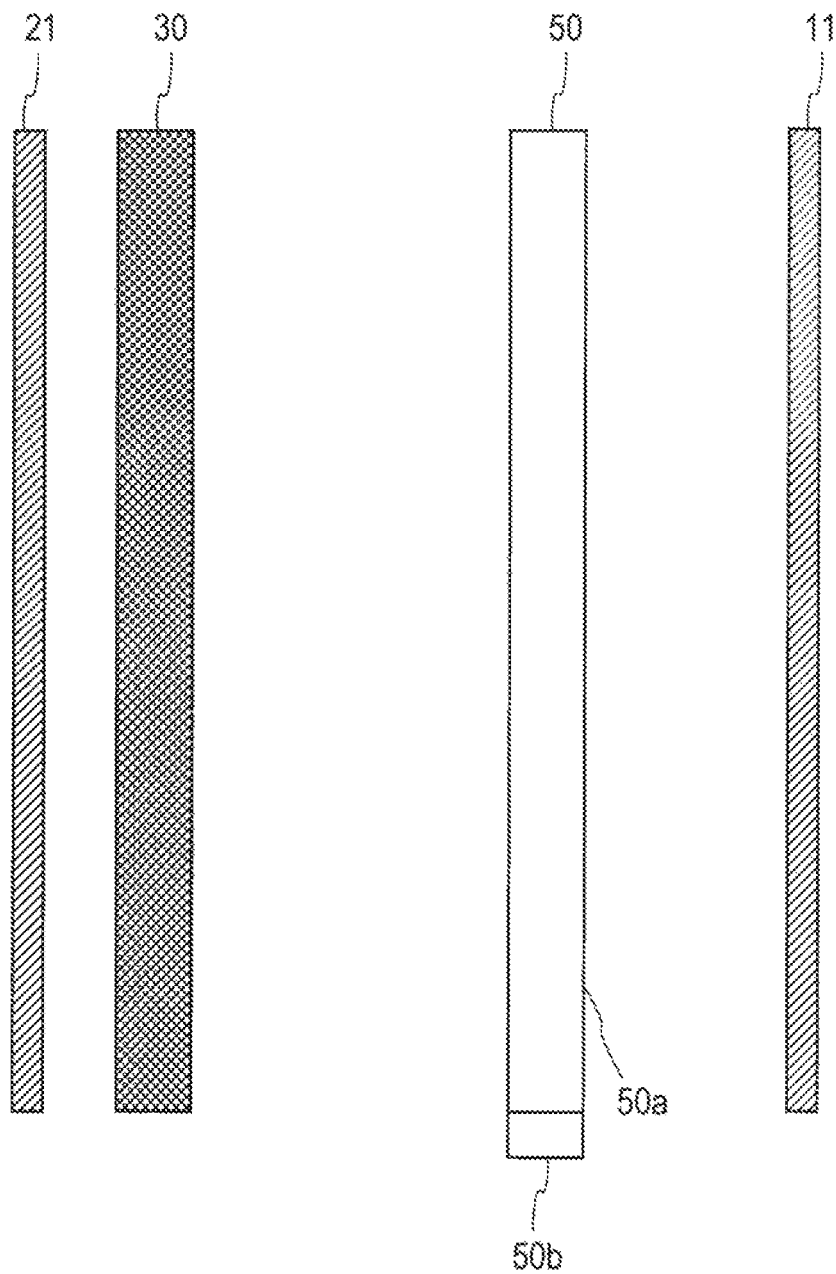
FIG. 6 is a diagram illustrating a configuration of a transparent display according to a third embodiment of the present invention.

FIG. 6 is a diagram illustrating a configuration of the transparent display 300 according to a third embodiment of the present invention. As illustrated in FIG. 6, in the transparent display 300 that is a display device, the reflective polarizer 21 is arranged instead of the absorptive polarizer 10 that is arranged on the frontmost surface of the transparent display 200 illustrated in FIG. 3. That is, as illustrated in FIG. 6, the reflective polarizer 21, the liquid crystal panel 30, the polarized backlight unit 50, and the absorptive polarizer 11 are arranged in this order from the front side of the transparent display 300. In the present specification, the reflective polarizer 21 and the absorptive polarizer 10 of the transparent display 100 may be collectively referred to as the "first polarized component separating unit". The reflective polarizer 21 may be referred to as the "first reflective separating unit". The absorptive polarizer 11 may be referred to as the "second absorptive separating unit".

Figure 7:
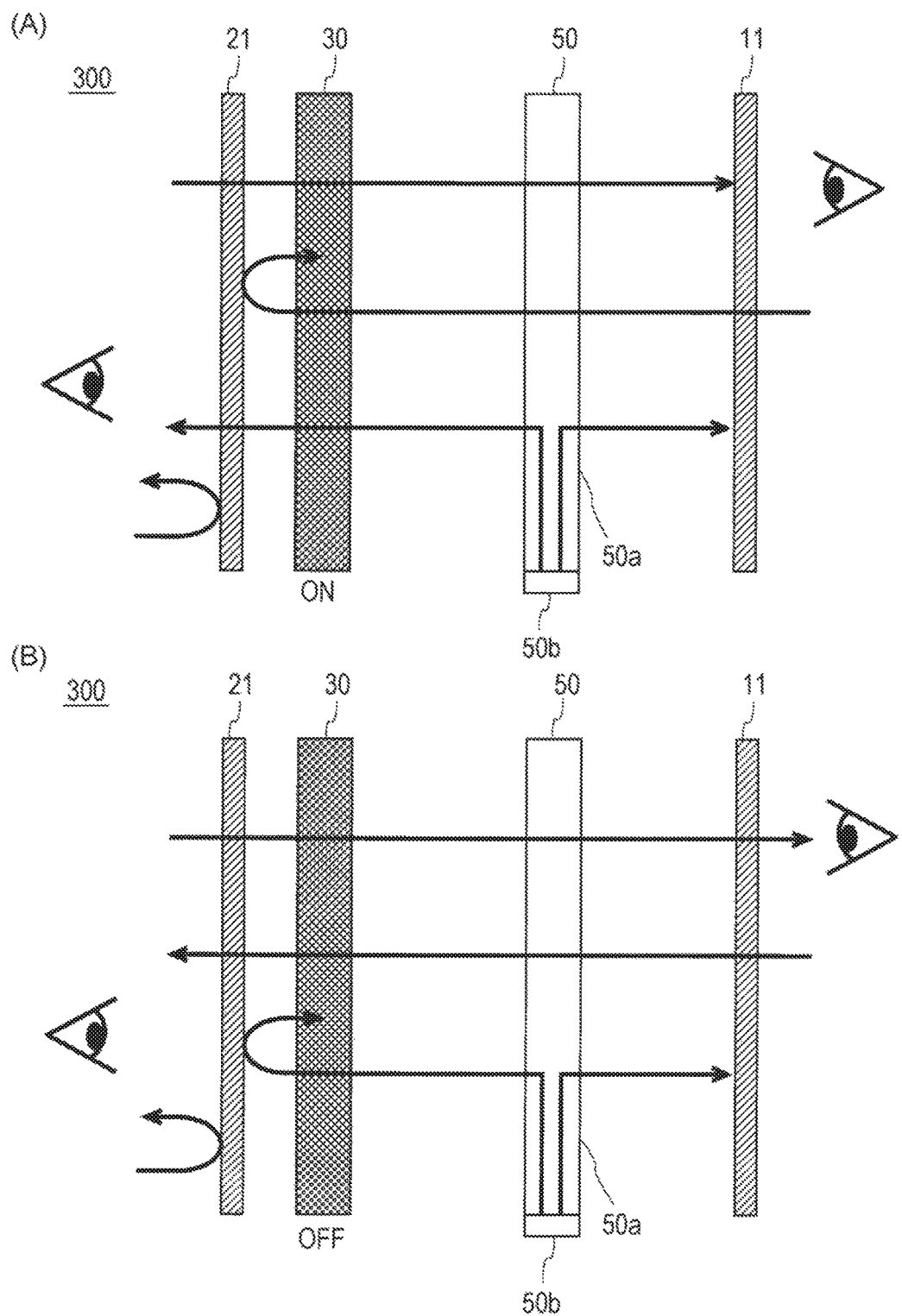
FIG. 7 is a diagram illustrating transmission of polarized backlight and ambient light in the transparent display illustrated in FIG. 6. More specifically.

FIG. 7 is a diagram illustrating transmission of the polarized backlight and the ambient light in the transparent display 300 according to the present embodiment. More specifically, FIG. 7(A) is a diagram illustrating the transmission of the polarized backlight and the ambient light in the transparent display 300 in the case of displaying an image on the transparent display 300, and FIG. 7(B) is a diagram illustrating the transmission of the polarized backlight and the ambient light in the transparent display 300 in the case of not displaying an image on the transparent display 300.

The direction of the reflection axis of the reflective polarizer 21 arranged on the frontmost surface of the transparent display 300 is adjusted to the same direction as the direction of the absorption axis of the absorptive polarizer 11. In addition, in the present embodiment, the polarized backlight emitted from the polarized backlight unit 50 is described as having a polarization direction that is the same as the directions of the reflection axis of the reflective polarizer 21 and the absorption axis of the absorptive polarizer 11. In this case, the polarization direction of the polarized backlight is orthogonal with respect to the polarization direction of the ambient light.

First, the case illustrated in FIG. 7(A) will be described. When a voltage that causes the polarization direction of the polarized backlight to be rotated by 90° is applied to the liquid crystal panel 30, the polarization direction of a polarized component of the polarized backlight emitted from the polarized backlight unit 50 is rotated by 90° in the liquid crystal panel 30, and the polarized component is incident on the reflective polarizer 21. Consequently, the polarization direction of the polarized backlight is the same as the direction of the transmission axis of the reflective polarizer 21. Thus, the polarized backlight is transmitted by the reflective polarizer 21 and reaches the front surface of the transparent display 300.

Meanwhile, the polarization direction of a polarized component of the ambient light that is incident from the rear side of the transparent display 300 and transmitted by the absorptive polarizer 11 is rotated by 90° by the liquid crystal panel 30. Consequently, the polarization direction of the ambient light is the same as the direction of the reflection axis of the reflective polarizer 21. Thus, the ambient light is reflected and cannot reach the front surface of the transparent display 300. Accordingly, the observer on the front side can visually recognize only the image displayed on the liquid crystal panel 30. However, the observer on the rear side cannot visually recognize the image and the background on the front side.

Next, the case illustrated in FIG. 7(B) will be described. When the liquid crystal panel 30 is in the OFF state, a polarized component of the polarized backlight is incident on the reflective polarizer 21 without being rotated. Consequently, the polarization direction of the polarized backlight is the same as the direction of the reflection axis of the reflective polarizer 21. Thus, the polarized backlight emitted from the polarized backlight unit 50 is reflected by the reflective polarizer 21.

Meanwhile, a polarized component, of the ambient light incident on the absorptive polarizer 11 from the rear side of the transparent display 300, having a polarization direction in the same direction as the transmission axis of the absorptive polarizer 11 is transmitted by the absorptive polarizer 11 and incident on the liquid crystal panel 30. Since the liquid crystal panel 30 is in the OFF state, the ambient light is incident on the reflective polarizer 21 without the polarization direction thereof being rotated. Consequently, the polarization direction of the ambient light is the same as the direction of the transmission axis of the reflective polarizer 21. Thus, the ambient light is transmitted by the reflective polarizer 21 and reaches the front surface of the transparent display 300. In this case, the ambient light that is incident on the reflective polarizer 21 from the front side of the transparent display 300 is transmitted by the reflective polarizer 21 and the absorptive polarizer 11 and reaches the rear surface. Accordingly, the observer on the front side of the transparent display 300 can visually recognize only the background on the rear side, and the observer on the rear side can visually recognize only the background on the front side.

Figure 8:
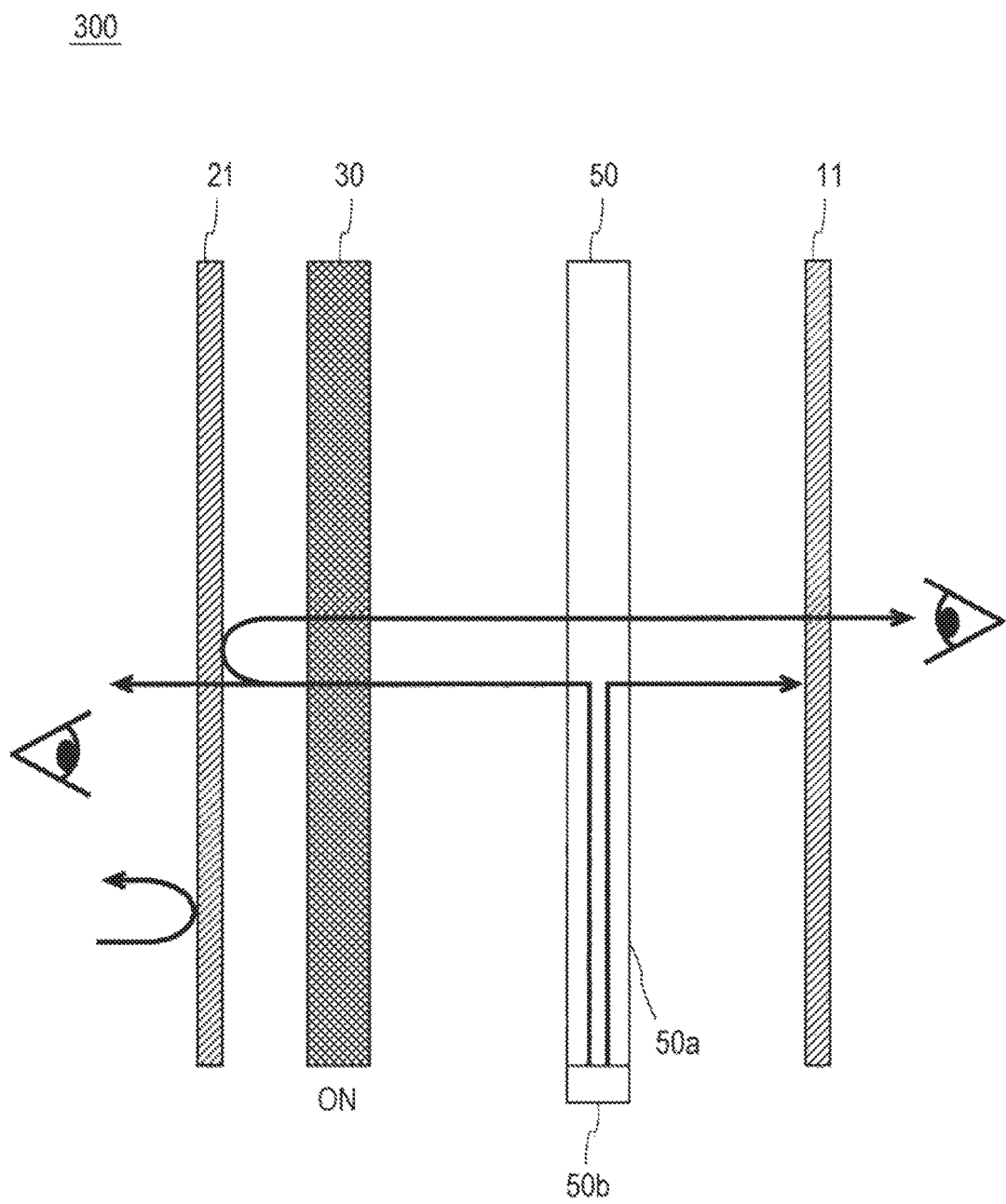
FIG. 8 is a diagram illustrating, in the transparent display illustrated in FIG. 6, the transmission of polarized backlight when a voltage applied to a liquid crystal panel is set to a voltage between those of the state illustrated in FIG. 7(A) and the state illustrated in FIG. 7(B).

FIG. 8 is a diagram illustrating the transmission of the polarized backlight in the transparent display 300 when the voltage applied to the liquid crystal panel 30 is set to a voltage between those of the state illustrated in FIG. 7(A) and the state illustrated in FIG. 7(B). The transmission of the polarized backlight in the transparent display 300 will be described with reference to FIG. 8. Hereinafter, the liquid crystal panel 30 will be described as a twisted nematic (TN) liquid crystal.

In the case of not applying a voltage to the liquid crystal panel 30, the polarized backlight is not transmitted to the front side and the rear side of the transparent display 300 as illustrated in FIG. 7(B). Next, in the case of applying a higher voltage than the case of FIG. 7(B), the polarized backlight is transmitted by the liquid crystal panel 30, and the polarization direction thereof is rotated. The rotation angle of the polarization direction is increased along with the applied voltage and approaches the direction of the transmission axis of the reflective polarizer 21. Thus, the proportion of a polarized component transmitted by the reflective polarizer 21 is increased. Meanwhile, if a polarized component of the polarized backlight reflected by the reflective polarizer 21 is again transmitted by the liquid crystal panel 30, the polarization direction of the polarized component is further rotated and approaches the direction of the transmission axis of the absorptive polarizer 11. Accordingly, the proportion of the polarized backlight transmitted by the absorptive polarizer 11 is increased. Thus, both of the observer on the front side and the observer on the rear side of the transparent display 300 can visually recognize the image displayed with gradation.

If the voltage applied to the liquid crystal panel 30 is further increased to set the rotation angle of the polarization direction of the polarized backlight incident on the reflective polarizer 21 to 45 degrees, the reflective polarizer 21 transmits 50% of the polarized backlight and reflects remaining 50%. The polarized backlight that is reflected by the reflective polarizer 21 is only polarized light that is equivalent in direction to the polarized backlight incident on the reflective polarizer 21. Thus, the rotation angle of the polarization direction when the polarized backlight reflected by the reflective polarizer 21 is again incident on the liquid crystal panel 30 is considered to be 0°. If the polarized backlight having a rotation angle of 0° is again incident on the liquid crystal panel 30, the liquid crystal panel 30 rotates the polarization direction of the polarized backlight and emits the polarized backlight that has a rotation angle of 45°. The emitted polarized backlight is transmitted by the polarized backlight unit 50 and incident on the absorptive polarizer 11. The absorptive polarizer 11 absorbs 50% of the incident polarized backlight and transmits remaining 50% to the rear side.

Meanwhile, the polarized backlight that is emitted from the polarized backlight unit 50 to the rear side and directly incident on the absorptive polarizer 11 is, since the polarization direction thereof is not rotated, absorbed by the absorptive polarizer 11 and cannot be transmitted to the rear side.

Accordingly, 50% of the polarized backlight emitted from the polarized backlight unit 50 to the front side is transmitted by the reflective polarizer 21 and reaches the front surface of the transparent display 300. The remaining polarized backlight is reflected toward the rear side, and 50% thereof is transmitted by the absorptive polarizer 11 and reaches the rear surface. Accordingly, both of the observer on the front side and the observer on the rear side can visually recognize the same image displayed with gradation.

If the voltage applied to the liquid crystal panel 30 is further increased, the rotation angle of the polarization direction of the polarized backlight is increased larger than 45°. In this case, the proportion of the polarized backlight transmitted by the reflective polarizer 21 is increased. Thus, the proportion of the polarized backlight consequently reflected is decreased. Thus, the intensity of the polarized backlight reaching the surface of the transparent display 300 is larger than that at the time of a rotation angle of 45°, and the intensity of the polarized backlight reaching the rear surface is smaller than that at the time of a rotation angle of 45°. Accordingly, while the optical output of the polarized backlight transmitted to the front side is increased, the optical output of the polarized backlight transmitted to the rear side is decreased. Thus, the luminance of the image visually recognized by the observer on the front side of the transparent display 300 is increased, and the luminance of the image visually recognized by the observer on the rear side is decreased. However, the observers on both sides can visually recognize the image displayed with gradation.

If the voltage applied to the liquid crystal panel 30 is further increased to set the rotation angle of the polarization direction of the polarized backlight to 90°, the entirety of the polarized backlight incident on the reflective polarizer 21 is transmitted by the reflective polarizer 21 and reaches the front surface as illustrated in FIG. 7(A). Thus, the polarized backlight is not reflected. Thus, the observer on the front side of the transparent display 300 can visually recognize the image displayed with gradation, and the observer on the rear side cannot visually recognize the image.

Figure 9:
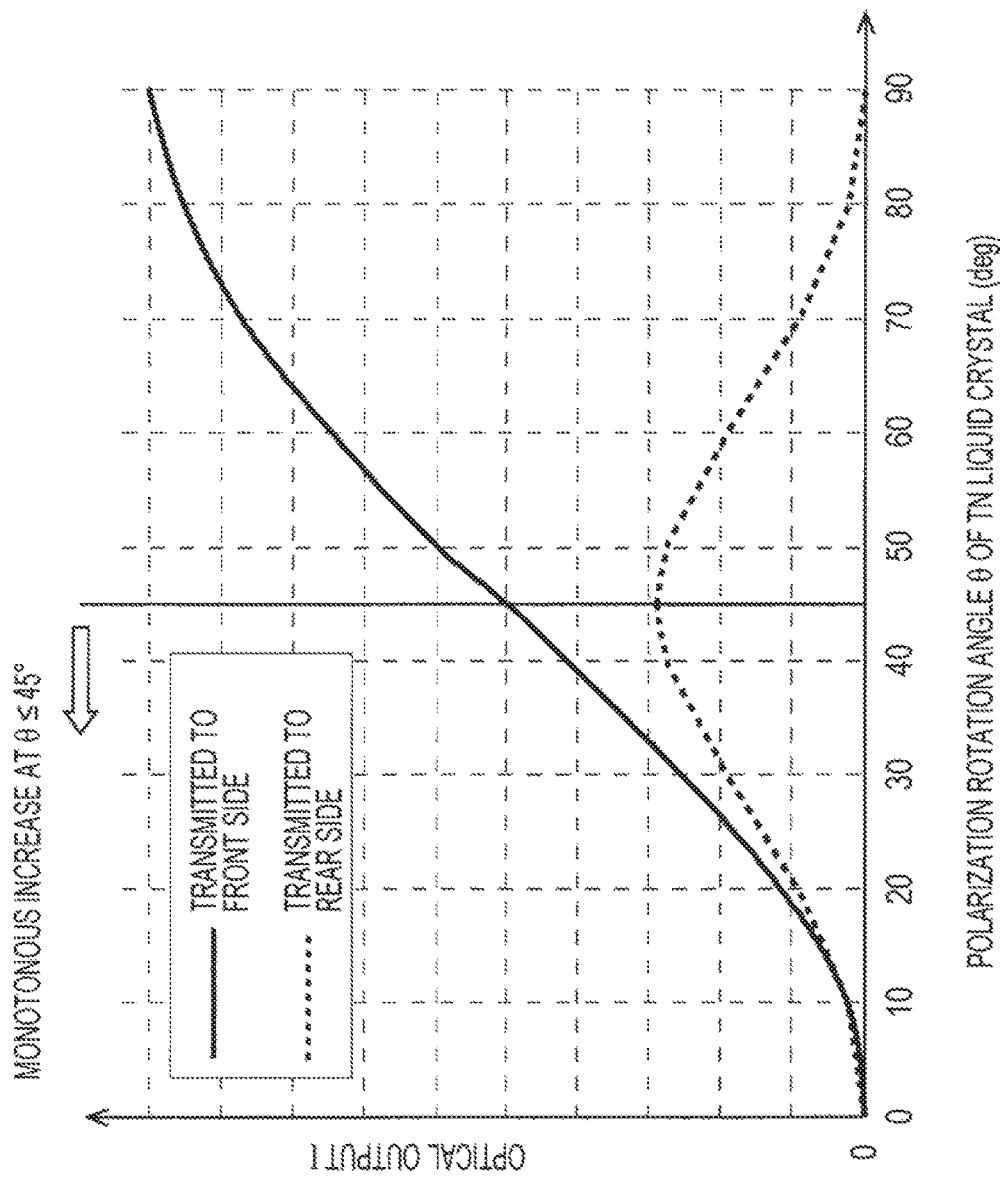
FIG. 9 is a diagram illustrating a relationship between a polarization rotation angle and an optical output of light that travels through the transparent display illustrated in FIG. 6.

The above content will be more specifically described. FIG. 9 is a diagram illustrating a relationship between a polarization rotation angle θ and an optical output I. The optical output I (the luminance of the image and the background) that is transmitted to the front side and the rear side of the transparent display 300 in consequence of increase in the voltage applied to the liquid crystal panel 30 will be described. The ideal case that the polarized backlight output from the polarized backlight unit 50 is complete linearly polarized light and that the reflective polarizer 21 and the absorptive polarizer 11 completely transmit only one polarized component and completely reflect or absorb another polarized component will be described.

In the case of the liquid crystal panel 30 being a TN liquid crystal, if the applied voltage is increased from 0 V to the maximum voltage, the rotation angle (polarization rotation angle) θ of the TN liquid crystal is consequently changed from 0° to 90°. The maximum optical output of light that is transmitted by the reflective polarizer 21 toward the front side is denoted by Io. On such a precondition, the optical output I of the light that is transmitted by the reflective polarizer 21 and reaches the front surface is represented by Formula (2).

$$I = Io \sin^2\theta \quad (2)$$

Meanwhile, the optical output I of light that is transmitted by the absorptive polarizer 11 and reaches the rear surface is represented by Formula (3).

$$I = (Io/4)\sin^2 2\theta \quad (3)$$

FIG. 9 is a diagram illustrating curves represented by Formula (2) and Formula (3). As understood from FIG. 9, in the case of the rotation angle θ of the TN liquid crystal being less than or equal to 45°, the optical output I of the light reaching the front surface is monotonically increased. Accordingly, both of the observers on the front side and the rear side of the transparent display 300 can visually recognize the image.

The optical output I of the light reaching the rear side is maximum at the rotation angle θ of 45° and is decreased if the rotation angle θ is increased from 45°. In this case, the rate of change of the optical output I of the polarized backlight transmitted to the rear side is decreased at the rotation angle θ of around 45°. Thus, changes in gradation of the image visually recognized by the observer on the rear side are decreased. Therefore, in order to decrease discordance between the display on the front side and the display on the rear side, it is preferable to adjust the rotation angle θ at the maximum gradation value to less than or equal to 45°.

While the above description describes the liquid crystal panel 30 as a TN liquid crystal, the liquid crystal panel 30 may be a vertical alignment (VA) liquid crystal. In this case, while the retardation angle θ is changed according to the applied voltage of the liquid crystal panel 30, the optical output I satisfies Formula (2) and Formula (3) and thus changes in the same manner as the curves illustrated in FIG. 9. Thus, description thereof will not be provided. Rotation of the polarization direction of the illuminant light or the ambient light (TN liquid crystal) or change of the retardation angle (VA liquid crystal) by the liquid crystal panel 30 may be referred to as "modulation".

In the transparent display 300, both of the polarized backlight displaying the image on the front side and the polarized backlight displaying the image on the rear side are light that is emitted from the polarized backlight unit 50 and transmitted by the liquid crystal panel 30. Thus, the image displayed on the front side has the same color as the image displayed on the rear side.

The reflective polarizer 21 is arranged on the frontmost surface of the transparent display 300. Thus, a polarized component, of the ambient light incident on the reflective polarizer 21 from the front side of the transparent display 300, having a polarization direction in the same direction as the reflection axis of the reflective polarizer 21 is reflected by the reflective polarizer 21. Thus, in the case of seeing the transparent display 300 from the front side, the transparent display 300 functions as a mirror display in which the image and the background are displayed in a mirror.

The ambient light that is incident on the transparent display 300 from the front side and the rear side is not disclosed in FIG. 8 and the description thereof. If the voltage applied to the liquid crystal panel 30 is increased, both of the ambient light incident on the reflective polarizer 21 from the front side and transmitted by the absorptive polarizer 11 to reach the rear surface and the ambient light incident on the absorptive polarizer 11 from the rear side and transmitted by the reflective polarizer 21 to reach the front surface have increase in the rotation angle of the polarization direction thereof. Accordingly, the ambient light after the polarization direction thereof is rotated by the liquid crystal panel 30 is unlikely to be transmitted by the reflective polarizer 21 or the absorptive polarizer 11, and the transmittance of the ambient light in both cases is decreased.

3.1 Effect

According to the present embodiment, using the polarized backlight unit 50 allows the absorptive polarizer 10 to be arranged on only the front side of the liquid crystal panel 30, and the liquid crystal panel 30 is not required to be interposed between polarizers from both sides thereof. Thus, the transparent display 300 can have a simple configuration. In addition, with such a configuration, the manufacturing cost of the transparent display 300 can be decreased, and both of the image and the background can be brightly displayed with improved transmittance.

The rotation angle of the polarization direction of the polarized backlight transmitted by the liquid crystal panel 30 is controlled by the liquid crystal panel 30, and the polarized backlight is transmitted to the front side or reflected to the rear side by the reflective polarizer 21 arranged on the frontmost surface. Accordingly, the observers on the front side and the rear side of the transparent display 300 can visually recognize the same image by the transparent display 300 that includes only one liquid crystal panel 30 instead of two liquid crystal panels that are typically required in a double-sided display. Thus, the manufacturing cost of the transparent display 300 can be further decreased.

3.2 Modification Example

Figure 10:
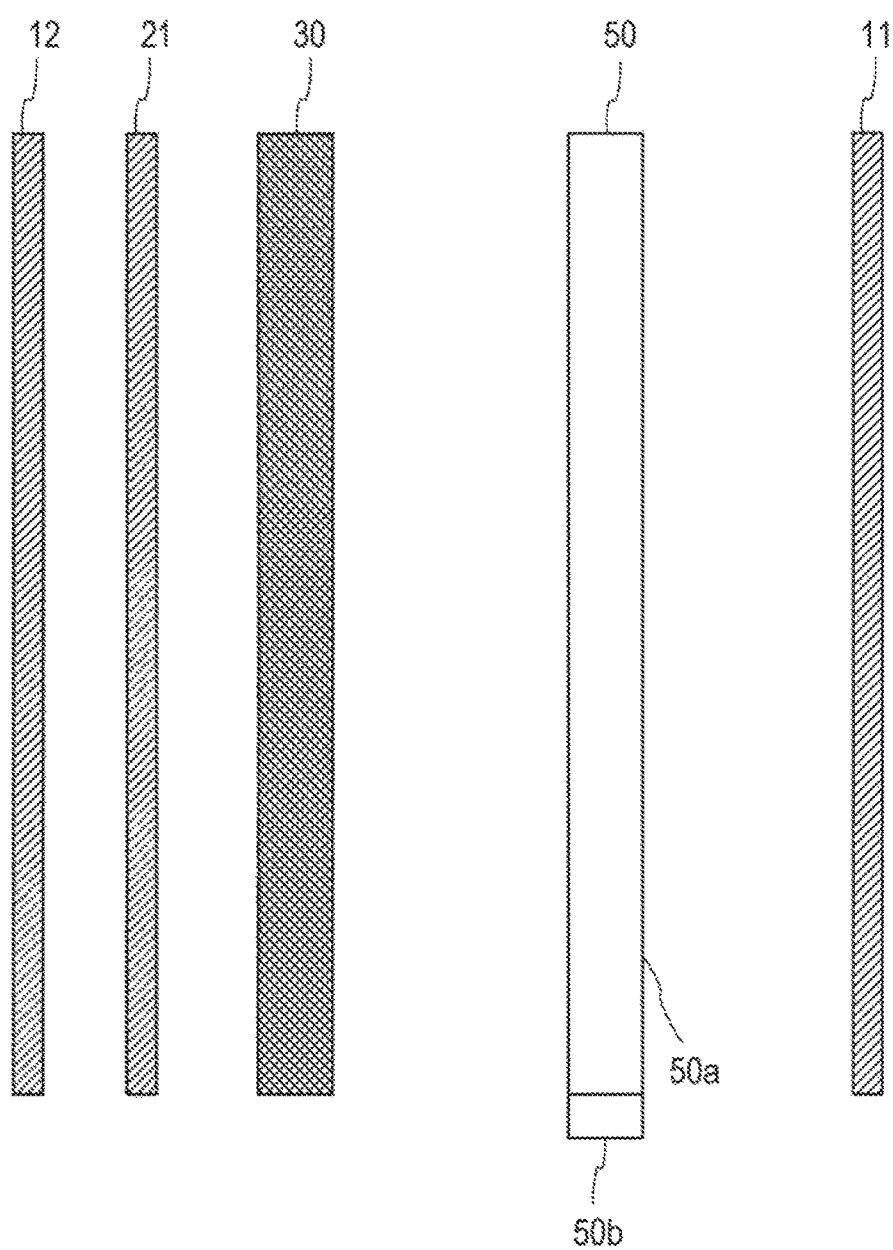
FIG. 10 is a diagram illustrating a configuration of a transparent display according to a modification example of the third embodiment of the present invention.

FIG. 10 is a diagram illustrating a configuration of a transparent display 310 according to a modification example of the present embodiment. Of the constituents of the transparent display 310 that is the display device illustrated in FIG. 10, the same constituents as the constituents of the transparent display 300 illustrated in FIG. 6 will be designated by the same reference signs and will not be described. As illustrated in FIG. 10, in the transparent display 310, an absorptive polarizer 12 is further arranged on the frontmost surface of the transparent display 300 illustrated in FIG. 6. Accordingly, the ambient light incident from the front side of the transparent display 310 is transmitted by the absorptive polarizer 12 or absorbed by the absorptive polarizer 12 and thus is not reflected. Thus, the observer on the front side can visually recognize the image and the background without mirror reflection, unlike a mirror display in which the image and the background are displayed in a mirror. In the present specification, the absorptive polarizer 12 may be referred to as a "third absorptive separating unit".

4. Fourth Embodiment

Figure 11:
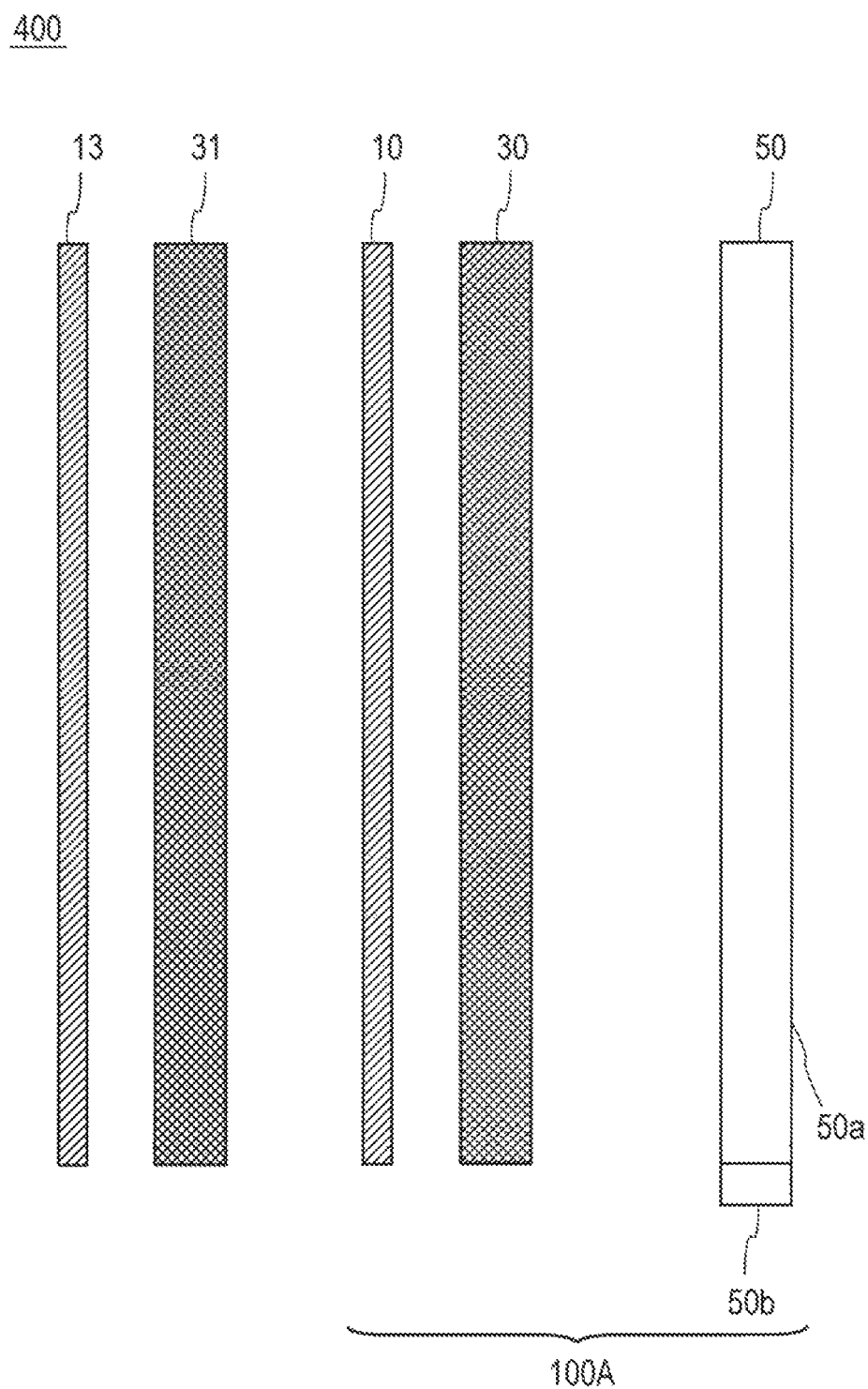
FIG. 11 is a diagram illustrating a configuration of a transparent display according to a fourth embodiment of the present invention.

FIG. 11 is a diagram illustrating a configuration of a transparent display 400 according to a fourth embodiment of the present invention. As illustrated in FIG. 11, in the transparent display 400 that is a display device, an absorptive polarizer 13 and a liquid crystal panel 31 are further arranged on the frontmost surface of the transparent display 100 illustrated in FIG. 1. That is, the absorptive polarizer 13, the liquid crystal panel 31, the absorptive polarizer 10, the liquid crystal panel 30, and the polarized backlight unit 50 are arranged in this order from the front side of the transparent display 400. The two absorptive polarizers 10 and 13 are adjusted in such a manner that the transmission axes thereof are in the same direction and that the absorption axes thereof are in the same direction. The polarization direction of the polarized backlight emitted from the polarized backlight unit 50 is the same as the directions of the absorption axes of the absorptive polarizers 10 and 13. In the present specification, the absorptive polarizer 13 may be referred to as a "third polarized component separating unit". The liquid crystal panel 31 may be referred to as a "light on/off control unit".

As described in the first embodiment, a configuration 100A (first basic configuration 100A) from the absorptive polarizer 10 to the polarized backlight unit 50 can display the image in an overlaid manner on the background or display only the background. However, the area of the image that is to display black (black display area) does not display black and becomes transparent to display the background. Therefore, in order to enable black display, the absorptive polarizer 13 and the liquid crystal panel 31 are further arranged on the front side of the absorptive polarizer 10 in the present embodiment.

The first basic configuration 100A, by switching the ON/OFF state of the liquid crystal panel 30, is placed into a turn-on state of transmitting the polarized backlight and the ambient light per pixel of the liquid crystal panel 30 or into a transparent state of transmitting only the ambient light. Accordingly, the first basic configuration 100A functions as active backlight that can be switched into the turn-on state or the transparent state per pixel.

From above, the transparent display 400 is understood to have the same configuration as a typical liquid crystal display device in which the absorptive polarizer 13, the liquid crystal panel 31, and the first basic configuration 100A functioning as an active backlight unit are arranged in this order. Accordingly, the transparent display 400 is placed into any state of the turn-on state, a turn-off state, and the transparent state, and black display is enabled in the turn-off state.

Figure 12:
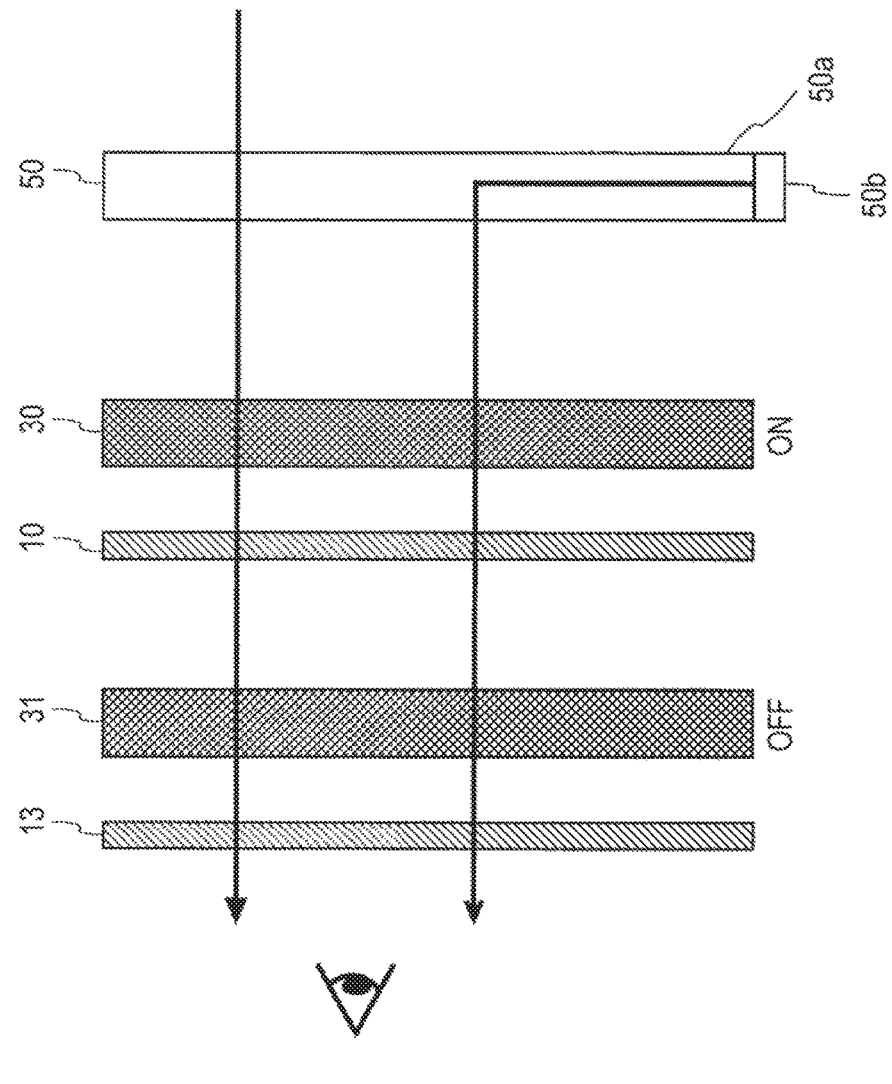
FIG. 12 is a diagram illustrating transmission of polarized backlight and ambient light when the transparent display illustrated in FIG. 11 is in a turn-on state.
Figure 13:
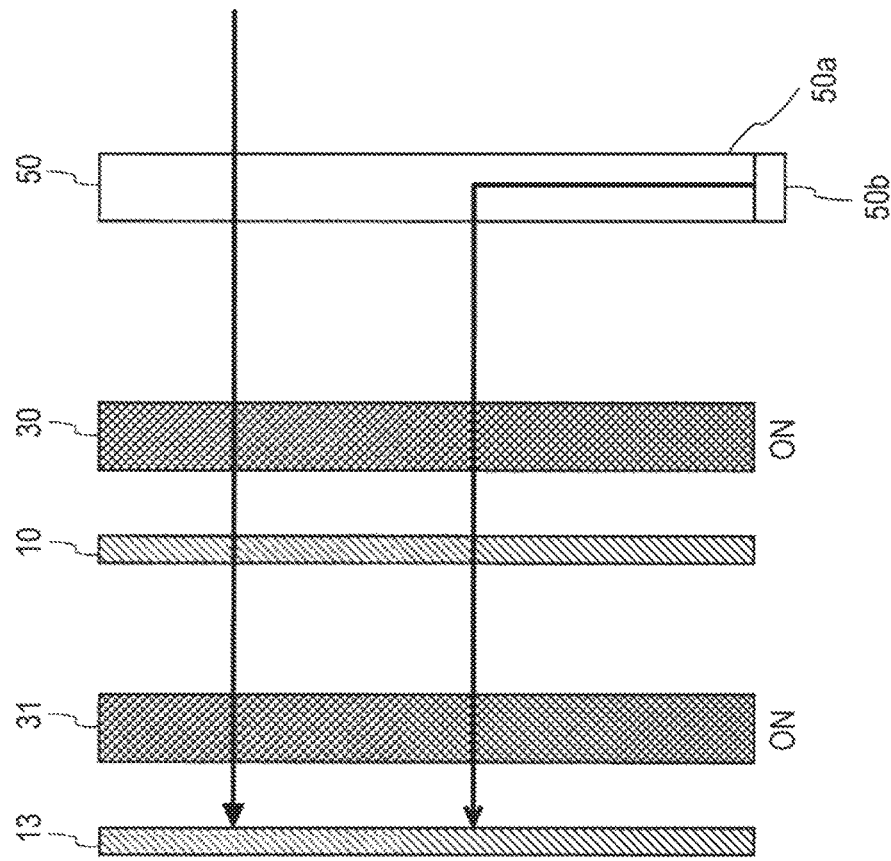
FIG. 13 is diagram illustrating the transmission of polarized backlight and ambient light when the transparent display illustrated in FIG. 11 is in a turn-off state.
Figure 14:
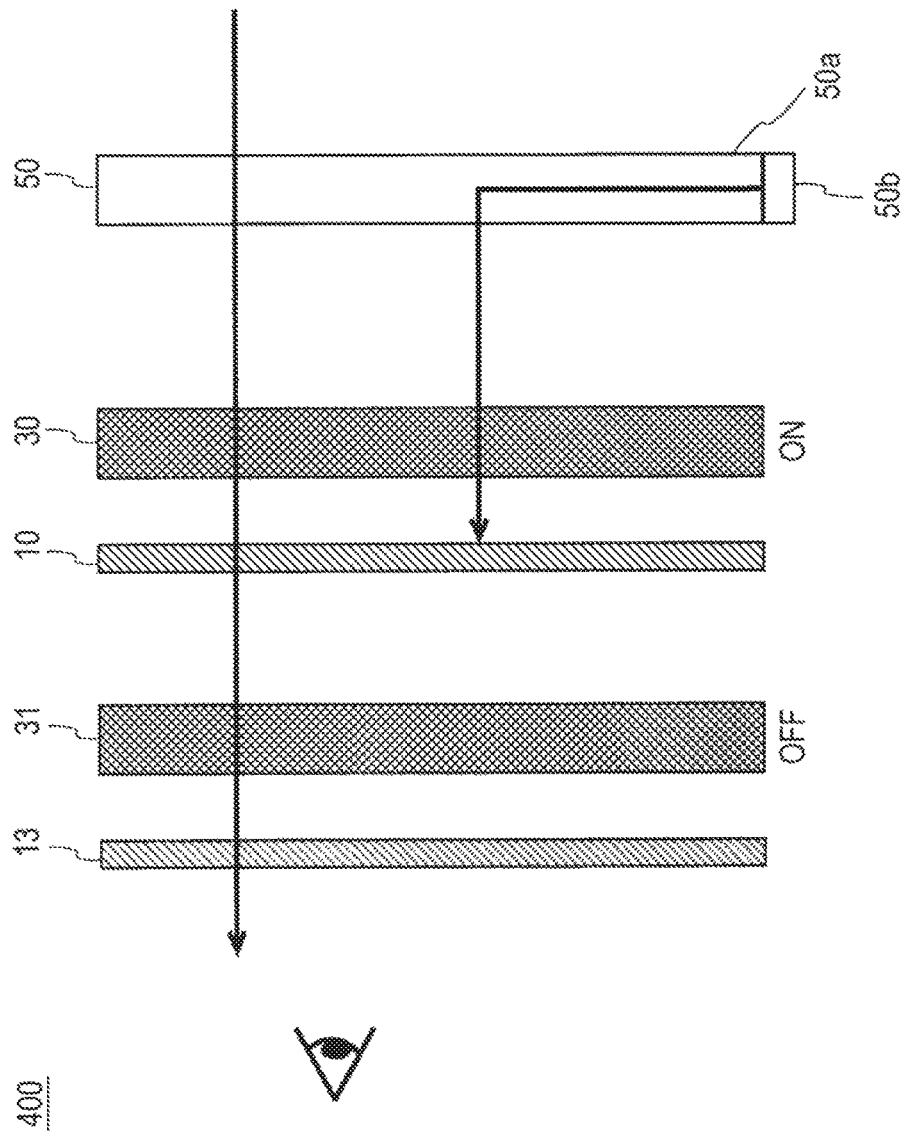
FIG. 14 is a diagram illustrating the transmission of polarized backlight and ambient light when the transparent display illustrated in FIG. 11 is in a transparent state.

FIG. 12 is a diagram illustrating transmission of the polarized backlight and the ambient light when the transparent display 400 is in the turn-on state. FIG. 13 is a diagram illustrating the transmission of the polarized backlight and the ambient light when the transparent display 400 is in the turn-off state. FIG. 14 is a diagram illustrating the transmission of the polarized backlight and the ambient light when the transparent display 400 is in the transparent state.

In the turn-on state illustrated in FIG. 12, the liquid crystal panel 30 is placed into the ON state, and the liquid crystal panel 31 is placed into the OFF state. The polarized backlight emitted from the polarized backlight unit 50 is incident on the liquid crystal panel 30. Since the liquid crystal panel 30 is in the ON state, the polarization direction of the polarized backlight is rotated by 90°, and the polarized backlight is incident on the absorptive polarizer 10. The polarization direction of the polarized backlight becomes the same as the direction of the transmission axis of the absorptive polarizer 10 by rotation. Thus, the polarized backlight is transmitted by the absorptive polarizer 10 and incident on the liquid crystal panel 31. Since the liquid crystal panel 31 is in the OFF state, the polarized backlight is incident on the absorptive polarizer 13 without the polarization direction thereof being rotated. Consequently, the polarization direction of the polarized backlight is the same as the direction of the transmission axis of the absorptive polarizer 13. Thus, the polarized backlight is transmitted by the absorptive polarizer 13 and reaches the front surface of the transparent display 400.

Meanwhile, a polarized component, of the ambient light incident from the rear side, that is transmitted by the absorptive polarizer 10 is incident on the absorptive polarizer 13 without the polarization direction thereof being rotated by the liquid crystal panel 31 in the OFF state. Consequently, the polarization direction of the ambient light is the same as the direction of the transmission axis of the absorptive polarizer 13. Thus, the ambient light as well is transmitted by the absorptive polarizer 13 and reaches the front surface of the transparent display 400. Accordingly, since both of the polarized backlight and the ambient light reach the front surface of the transparent display 400, the transparent display 400 is placed into the turn-on state.

In the turn-off state illustrated in FIG. 13, both of the liquid crystal panel 30 and the liquid crystal panel 31 are placed into the ON state. The polarized backlight emitted from the polarized backlight unit 50 is incident on the liquid crystal panel 30. Since the liquid crystal panel 30 is in the ON state, the polarization direction of the polarized backlight is rotated by 90°, and the polarized backlight is incident on the absorptive polarizer 10. The polarization direction of the polarized backlight becomes the same as the direction of the transmission axis of the absorptive polarizer 10 by rotation. Thus, the polarized backlight is transmitted by the absorptive polarizer 10 and incident on the liquid crystal panel 31. Since the liquid crystal panel 31 as well is in the ON state, the polarization direction of the polarized backlight is further rotated by 90°, and the polarized backlight is incident on the absorptive polarizer 13. Consequently, the polarization direction of the polarized backlight is the same as the direction of the absorption axis of the absorptive polarizer 13. Thus, the polarized backlight is absorbed by the absorptive polarizer 13 and cannot reach the front surface of the transparent display 400.

Meanwhile, the polarization direction of a polarized component, of the ambient light incident from the rear side, that is transmitted by the absorptive polarizer 10 is rotated by 90° by the liquid crystal panel 31 in the ON state, and the polarized component is incident on the absorptive polarizer 13. Consequently, the polarization direction of the ambient light is the same as the direction of the absorption axis of the absorptive polarizer 13. Thus, the ambient light as well is absorbed by the absorptive polarizer 13 and cannot reach the front surface of the transparent display 400. Accordingly, since both of the polarized backlight and the ambient light cannot reach the front surface of the transparent display 400, the transparent display 400 is placed into the turn-off state.

In the transparent state illustrated in FIG. 14, both of the liquid crystal panel 30 and the liquid crystal panel 31 are placed into the OFF state. The polarized backlight emitted from the polarized backlight unit 50 is incident on the liquid crystal panel 30. Since the liquid crystal panel 30 is in the OFF state, the polarized backlight is incident on the absorptive polarizer 10 without the polarization direction thereof being rotated. Consequently, the polarization direction of the polarized backlight is the same as the direction of the absorption axis of the absorptive polarizer 10. Thus, the polarized backlight is absorbed by the absorptive polarizer 10 and cannot reach the front surface of the transparent display 400.

Meanwhile, a polarized component, of the ambient light incident from the rear side, that is transmitted by the absorptive polarizer 10 is incident on the absorptive polarizer 13 without the polarization direction thereof being rotated by the liquid crystal panel 31 in the OFF state. Consequently, the polarization direction of the ambient light is the same as the direction of the transmission axis of the absorptive polarizer 13, and the ambient light is transmitted by the absorptive polarizer 113. Accordingly, the ambient light reaches the front surface of the transparent display 400. Accordingly, since only the ambient light can reach the front surface of the transparent display 400, the transparent display 400 is placed into the transparent state.

The two liquid crystal panels 30 and 31 may be in close contact with each other with the absorptive polarizer 10 interposed therebetween. In this case, moire is rarely generated even if liquid crystal panels having the same or approximately the same pixel size are used for the two liquid crystal panels 30 and 31. Thus, liquid crystal panels having the same pixel size can be used as the two liquid crystal panels 30 and 31. Accordingly, not only the incident light can be efficiently used, but also the manufacturing cost of the transparent display 400 can be decreased.

4.1 Effect

According to the present embodiment, the first basic configuration 100A from the absorptive polarizer 10 to the polarized backlight unit 50 functions as an active backlight unit that transmits or blocks the polarized backlight per pixel of the liquid crystal panel 30. In addition, the absorptive polarizer 13 and the liquid crystal panel 31 arranged on the front side of the absorptive polarizer 10 function as a shutter that transmits or blocks the polarized backlight incident from the rear side. Thus, the transparent display 400 incorporating the first basic configuration 100A, the absorptive polarizer 13, and the liquid crystal panel 31 can realize not only the turn-on state of displaying the image and the transparent state of the background being seen therethrough but also the turn-off state of blocking both of the polarized backlight and the ambient light. Accordingly, since black display for the image is enabled, the display quality of the image can be improved.

Changing the voltage applied to the liquid crystal panel 30 per pixel can control, per pixel, the transmittance of the polarized backlight transmitted by the liquid crystal panel 30. Thus, the transmittance of the polarized backlight transmitted by pixels in a desired area can be increased or decreased. Accordingly, local dimming can be performed by using the first basic configuration 100A. In addition, backlight scanning can be performed by using the first basic configuration 100A by increasing, in synchronization with the liquid crystal panel 31, the transmittance of the polarized backlight transmitted by the pixels of the liquid crystal panel 30 in order.

4.2 Modification Example

Figure 15:
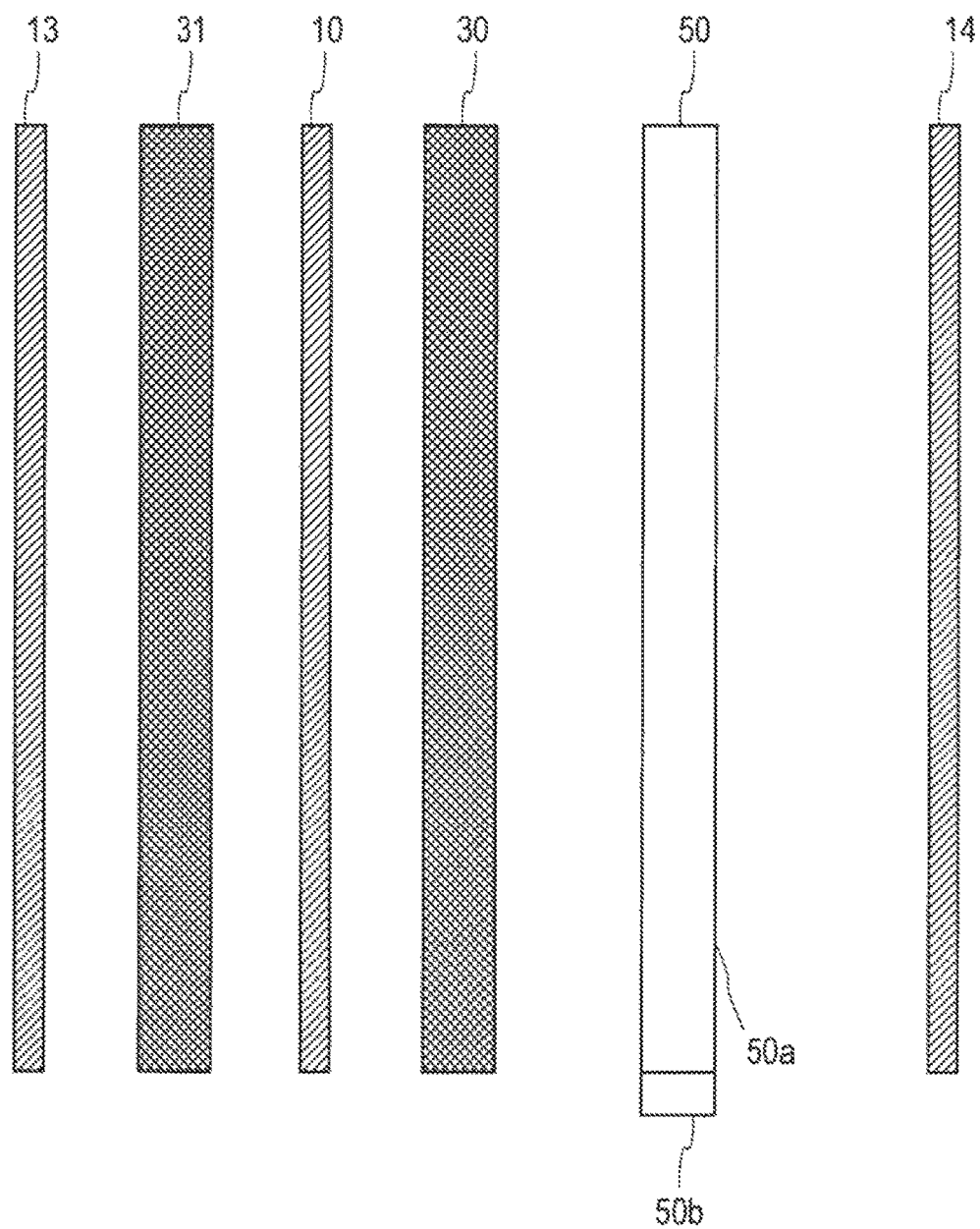
FIG. 15 is a diagram illustrating a configuration of a transparent display according to a modification example of the fourth embodiment of the present invention.

FIG. 15 is a diagram illustrating a configuration of a transparent display 410 according to a modification example of the fourth embodiment of the present invention. As illustrated in FIG. 15, in the transparent display 410 that is a display device, an absorptive polarizer 14 is further arranged on the rearmost surface of the transparent display 400 illustrated in FIG. 11. That is, the absorptive polarizer 13, the liquid crystal panel 31, the absorptive polarizer 10, the liquid crystal panel 30, the polarized backlight unit 50, and the absorptive polarizer 14 are arranged in this order from the front side of the transparent display 410. The three absorptive polarizers 10, 13, and 14 are adjusted in such a manner that the transmission axes thereof are in the same direction and that the absorption axes thereof are in the same direction. In addition, the polarization direction of the polarized backlight emitted from the polarized backlight unit 50 is adjusted to be the same as the directions of the absorption axes of the absorptive polarizers 10, 13, and 14. In the present specification, the absorptive polarizer 14 may be referred to as a "fourth polarized component separating unit".

Figure 16:
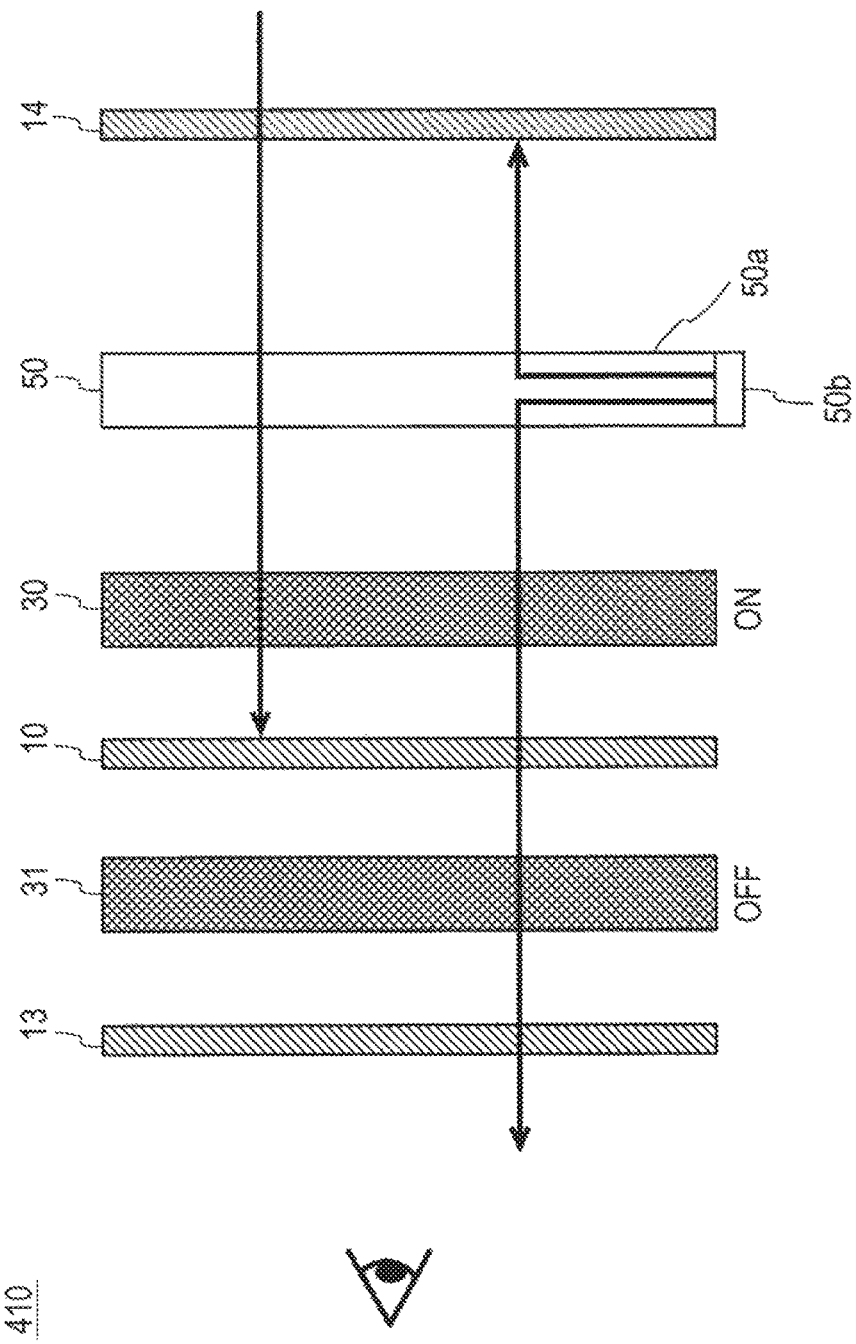
FIG. 16 is a diagram illustrating transmission of polarized backlight and ambient light when the transparent display illustrated in FIG. 15 is in a turn-on state.
Figure 17:
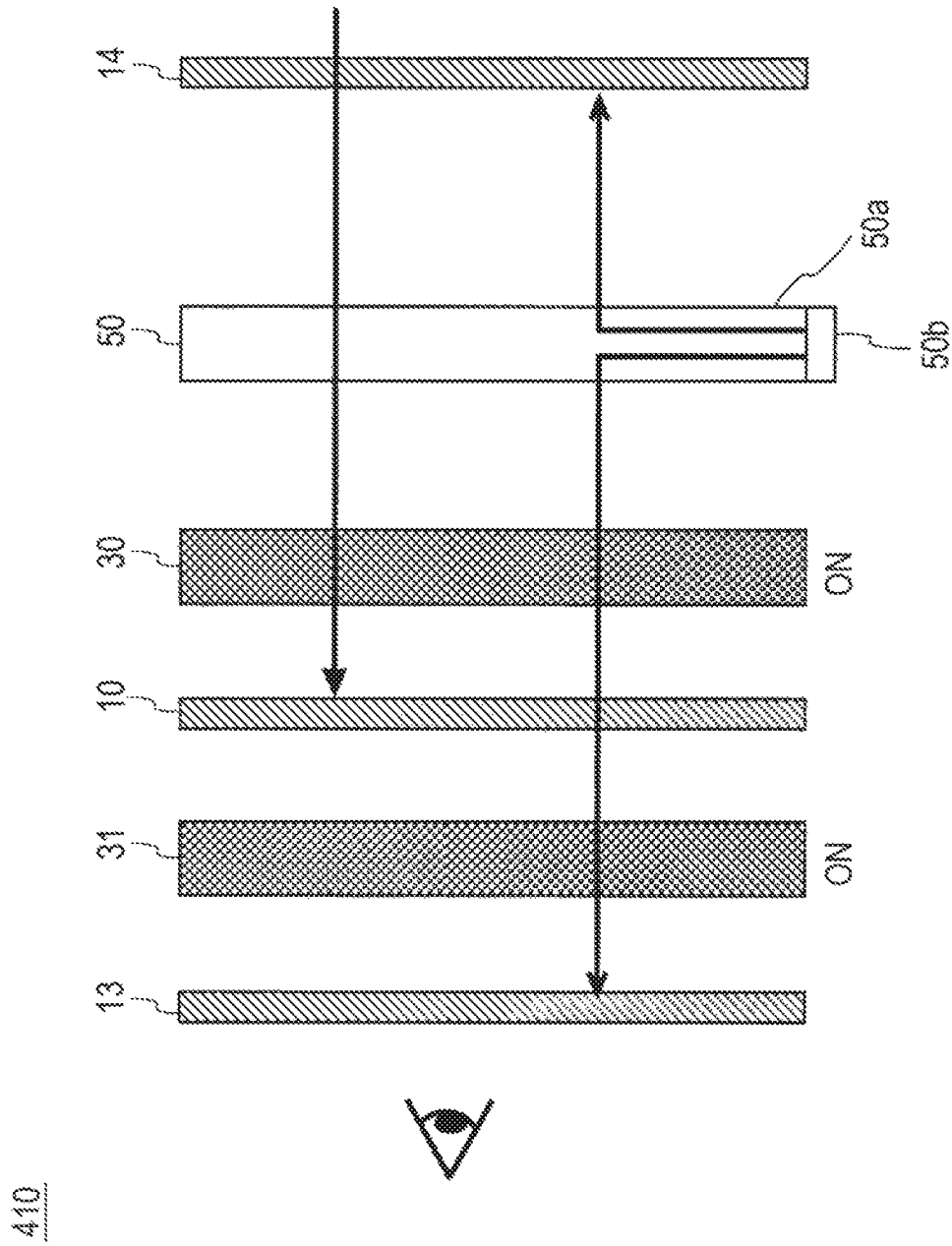
FIG. 17 is a diagram illustrating the transmission of polarized backlight and ambient light when the transparent display illustrated in FIG. 15 is in a turn-off state.
Figure 18:
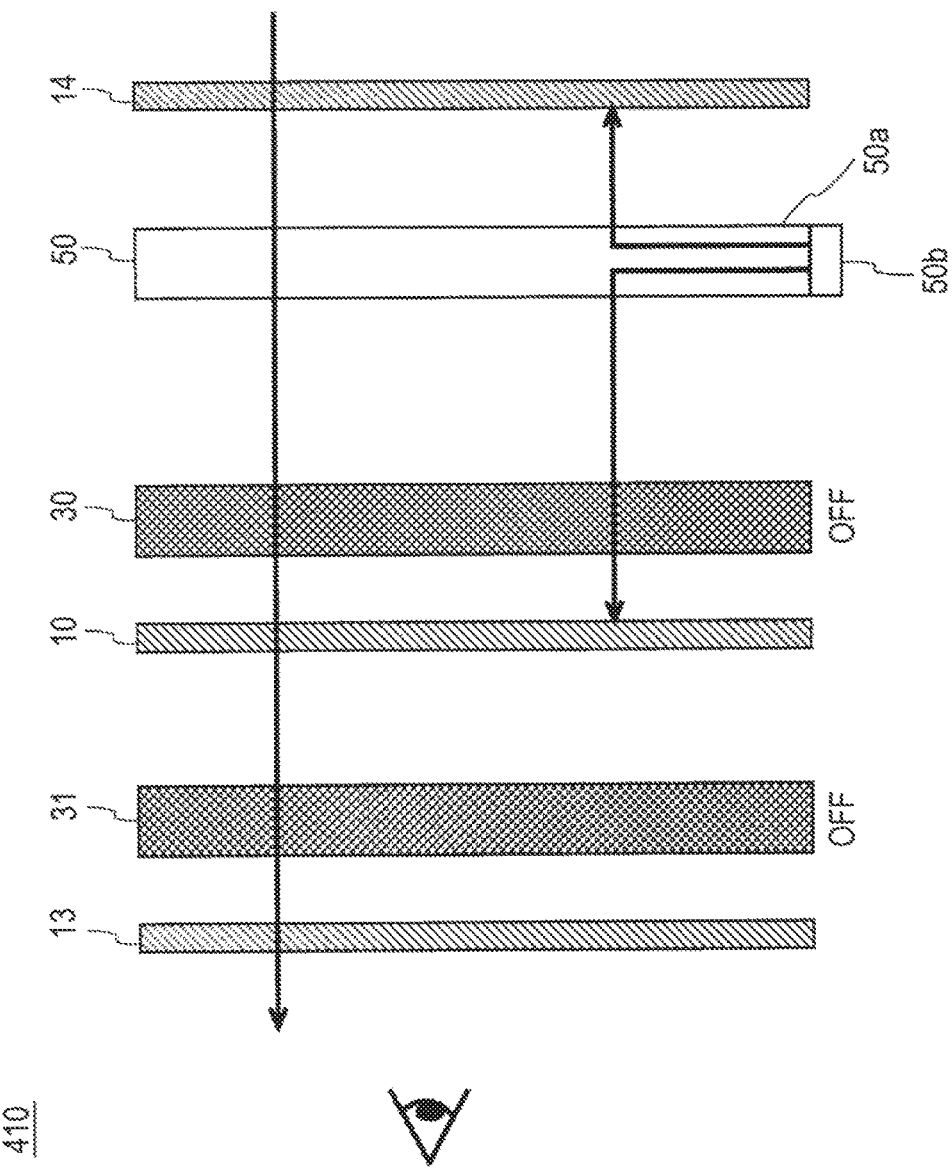
FIG. 18 is a diagram illustrating the transmission of polarized backlight and ambient light when the transparent display illustrated in FIG. 15 is in a transparent state.

FIG. 16 is a diagram illustrating transmission of the polarized backlight and the ambient light when the transparent display 410 is in the turn-on state. FIG. 17 is a diagram illustrating the transmission of the polarized backlight and the ambient light when the transparent display 410 is in the turn-off state. FIG. 18 is a diagram illustrating the transmission of the polarized backlight and the ambient light when the transparent display 410 is in the transparent state.

In the turn-on state illustrated in FIG. 16, the liquid crystal panel 30 is placed into the ON state, and the liquid crystal panel 31 is placed into the OFF state. The polarized backlight emitted from the polarized backlight unit 50 is incident on the liquid crystal panel 30. Since the liquid crystal panel 30 is in the ON state, the polarization direction of the polarized backlight is rotated by 90°, and the polarized backlight is incident on the absorptive polarizer 10. The polarization direction of the polarized backlight becomes the same as the direction of the transmission axis of the absorptive polarizer 10 by 90° rotation. Thus, the polarized backlight is transmitted by the absorptive polarizer 10 and incident on the liquid crystal panel 31. Since the liquid crystal panel 31 is in the OFF state, the polarized backlight is incident on the absorptive polarizer 13 without the polarization direction thereof being further rotated. Consequently, the polarization direction of the polarized backlight is the same as the direction of the transmission axis of the absorptive polarizer 13. Thus, the polarized backlight is transmitted by the absorptive polarizer 13 and reaches the front surface of the transparent display 410.

Meanwhile, the polarization direction of a polarized component, of the ambient light incident from the rear side, that is transmitted by the absorptive polarizer 14 is rotated by 90° by the liquid crystal panel 30 in the ON state, and the polarized component is incident on the absorptive polarizer 10. Consequently, the polarization direction of the ambient light is the same as the direction of the absorption axis of the absorptive polarizer 10. Thus, the ambient light is absorbed by the absorptive polarizer 10 and cannot reach the front surface of the transparent display 410. Accordingly, since only the polarized backlight reaches the front surface of the transparent display 410, the transparent display 410 is placed into the turn-on state.

In the turn-off state illustrated in FIG. 17, both of the liquid crystal panel 30 and the liquid crystal panel 31 are placed into the ON state. The polarized backlight emitted from the polarized backlight unit 50 is incident on the liquid crystal panel 30. Since the liquid crystal panel 30 is in the ON state, the polarization direction of the polarized backlight is rotated by 90°, and the polarized backlight is incident on the absorptive polarizer 10. The polarization direction of the polarized backlight becomes the same as the direction of the transmission axis of the absorptive polarizer 10 by rotation. Thus, the polarized backlight is transmitted by the absorptive polarizer 10 and incident on the liquid crystal panel 31. Since the liquid crystal panel 31 as well is in the ON state, the polarization direction of the polarized backlight is further rotated by 90°, and the polarized backlight is incident on the absorptive polarizer 13. Consequently, the polarization direction of the polarized backlight is the same as the direction of the absorption axis of the absorptive polarizer 13. Thus, the polarized backlight is absorbed by the absorptive polarizer 13 and cannot reach the front surface of the transparent display 410.

Meanwhile, the polarization direction of a polarized component, of the ambient light incident from the rear side, that is transmitted by the absorptive polarizer 14 is rotated by 90° by the liquid crystal panel 30 in the ON state, and the polarized component is incident on the absorptive polarizer 10. Consequently, the polarization direction of the ambient light is the same as the direction of the absorption axis of the absorptive polarizer 10. Thus, the ambient light is absorbed by the absorptive polarizer 10 and cannot reach the front surface of the transparent display 410. Accordingly, since both of the polarized backlight and the ambient light cannot reach the front surface of the transparent display 410, the transparent display 410 is placed into the turn-off state.

In the transparent state illustrated in FIG. 18, both of the liquid crystal panel 30 and the liquid crystal panel 31 are placed into the OFF state. The polarized backlight emitted from the polarized backlight unit 50 is incident on the liquid crystal panel 30. Since the liquid crystal panel 30 is in the OFF state, the polarized backlight is incident on the absorptive polarizer 10 without the polarization direction thereof being rotated. Consequently, the polarization direction of the polarized backlight is the same as the direction of the absorption axis of the absorptive polarizer 10. Thus, the polarized backlight is absorbed by the absorptive polarizer 10 and cannot reach the front surface of the transparent display 410.

Meanwhile, a polarized component, of the ambient light incident from the rear side, that is transmitted by the absorptive polarizer 14 is incident on the absorptive polarizer 10 without the polarization direction thereof being rotated by the liquid crystal panel 30 in the OFF state. The polarization direction of the ambient light is the same as the direction of the transmission axis of the absorptive polarizer 10. Thus, the ambient light is transmitted by the absorptive polarizer 10 and incident on the liquid crystal panel 31. Since the liquid crystal panel 31 as well is in the OFF state, the ambient light is also transmitted by the absorptive polarizer 13 and reaches the front surface of the transparent display 410. Accordingly, since only the ambient light can reach the front surface of the transparent display 410, the transparent display 410 is placed into the transparent state.

The polarized backlight emitted from the polarized backlight unit 50 to the rear side is absorbed by the absorptive polarizer 14 in the case of all of the states. Thus, the polarized backlight cannot reach the rear surface of the transparent display 410. Thus, the observer does not sense glare when seeing the transparent display 410 from the rear side.

The embodiment and the modification example above describe the transparent display 400 in which the absorptive polarizer 13 and the liquid crystal panel 31 are arranged on the frontmost surface of the transparent display 100 according to the first embodiment, and the transparent display 410 in which the absorptive polarizer 13 and the liquid crystal panel 31 are arranged on the frontmost surface of the transparent display 200 according to the second embodiment. A transparent display in which the absorptive polarizer 13 and the liquid crystal panel 31 are arranged on the frontmost surface of the transparent display 300 according to the third embodiment is the same as the transparent displays 400 and 410. Thus, drawings and descriptions thereof will not be provided.

5. Fifth Embodiment

Figure 19:
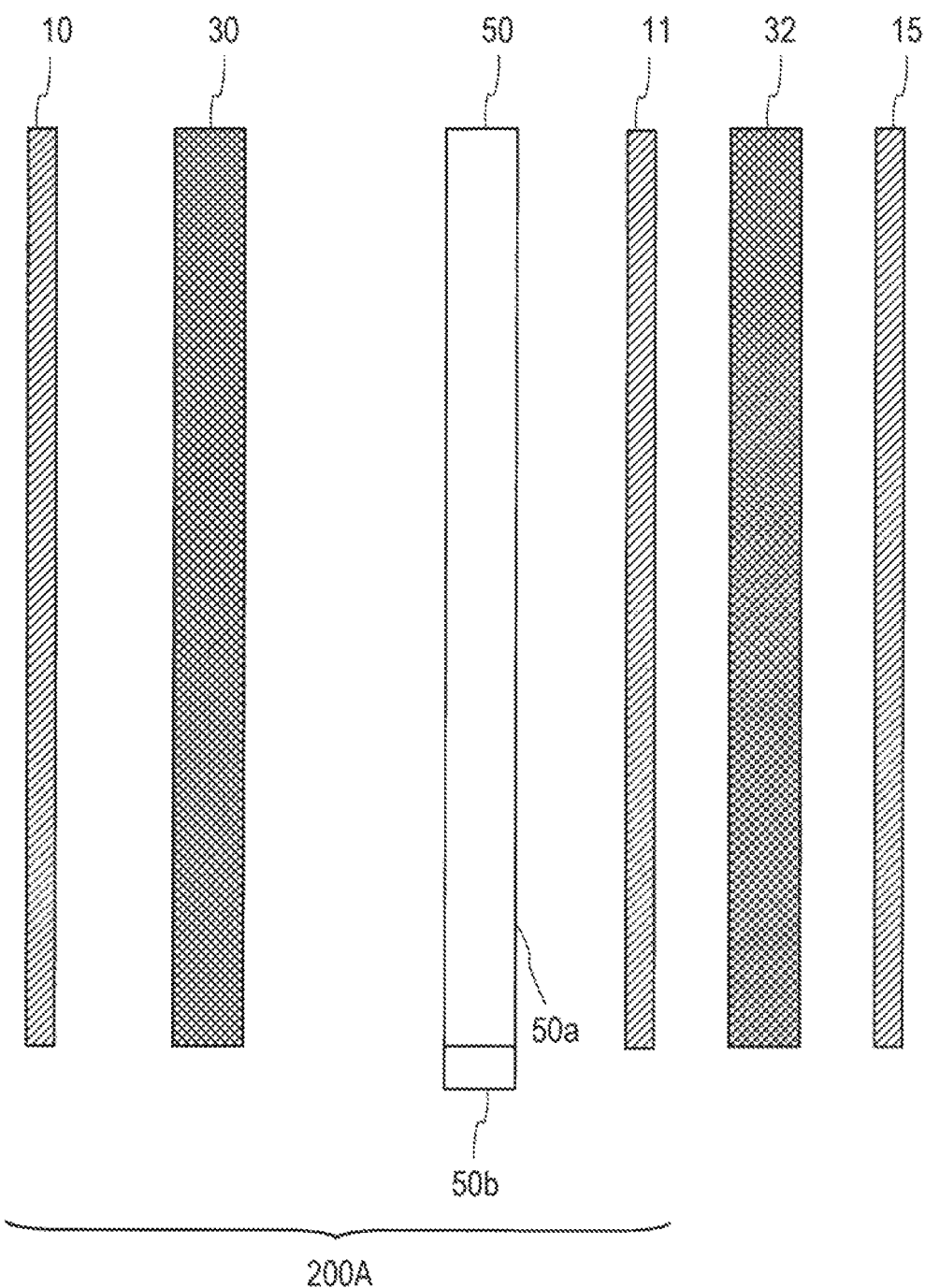
FIG. 19 is a diagram illustrating a configuration of a transparent display according to a fifth embodiment of the present invention.

FIG. 19 is a diagram illustrating a configuration of a transparent display 500 according to a fifth embodiment of the present invention. As illustrated in FIG. 19, in the transparent display 500 that is a display device, a liquid crystal panel 32 and an absorptive polarizer 15 are further arranged on the rearmost surface of the transparent display 200 illustrated in FIG. 3. That is, the absorptive polarizer 10, the liquid crystal panel 30, the polarized backlight unit 50, the absorptive polarizer 11, the liquid crystal panel 32, and the absorptive polarizer 15 are arranged in this order from the front side of the transparent display 500. The three absorptive polarizers 10, 11, and 15 are adjusted in such a manner that the transmission axes thereof are in the same direction and that the absorption axes thereof are in the same direction. In the present specification, the liquid crystal panel 32 may be referred to as a "third illuminant/ambient light adjusting unit". The absorptive polarizer 15 may be referred to as a "fifth polarized component separating unit".

As described in the second embodiment, a configuration 200A (second basic configuration 200A) from the absorptive polarizer 10 to the absorptive polarizer 11 can display the image or display the background. However, in the second basic configuration 200A, the black display area does not display black and becomes transparent to display the background. Therefore, in order to enable black display, the liquid crystal panel 32 and the absorptive polarizer 15 that function as a shutter are arranged on the rear side of the second basic configuration 200A in the present embodiment. Accordingly, the transparent display 500 is placed into any state of the turn-on state, the turn-off state, and the transparent state, and black display is enabled in the turn-off state.

Figure 20:
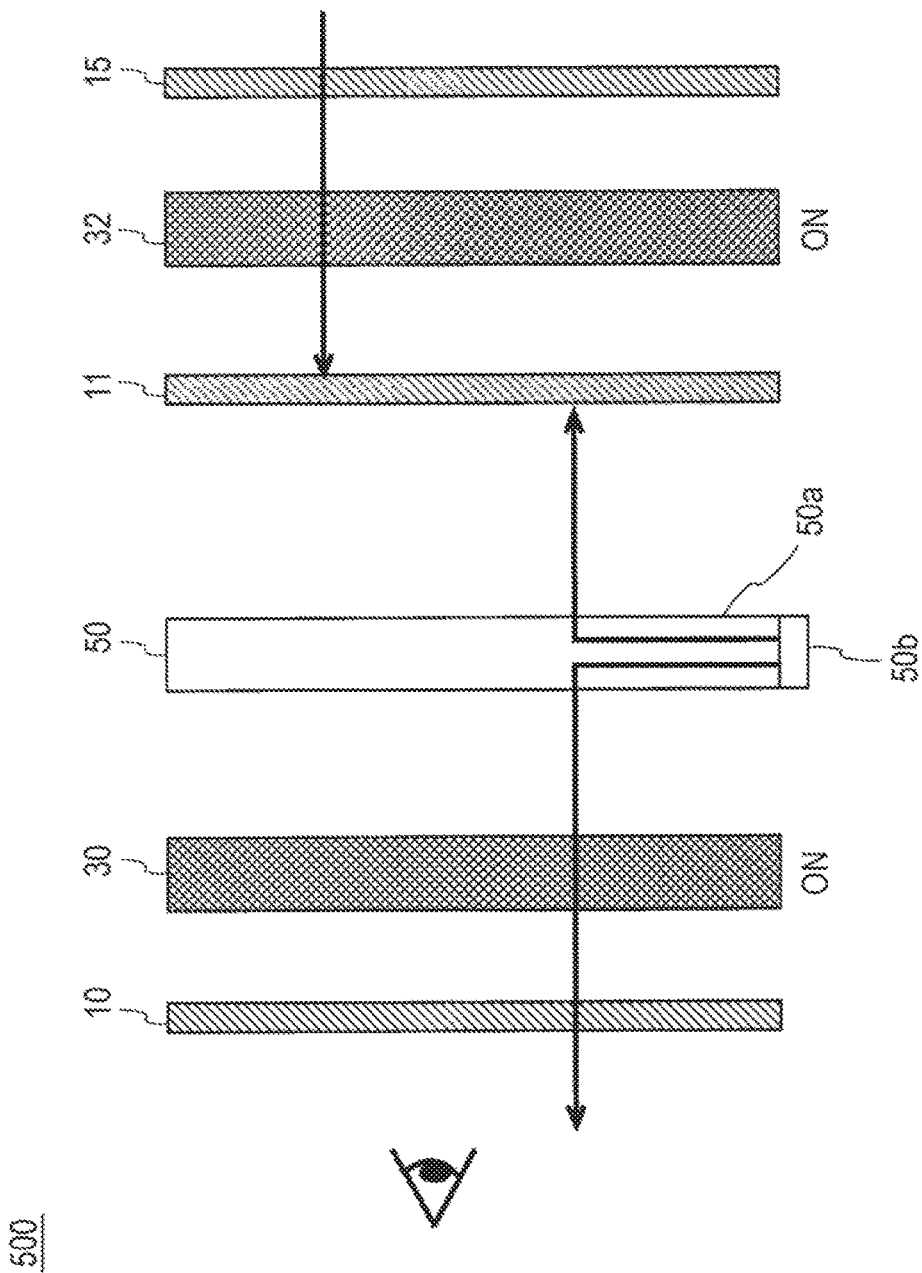
FIG. 20 is a diagram illustrating transmission of polarized backlight and ambient light when the transparent display illustrated in FIG. 19 is in a turn-on state.
Figure 21:
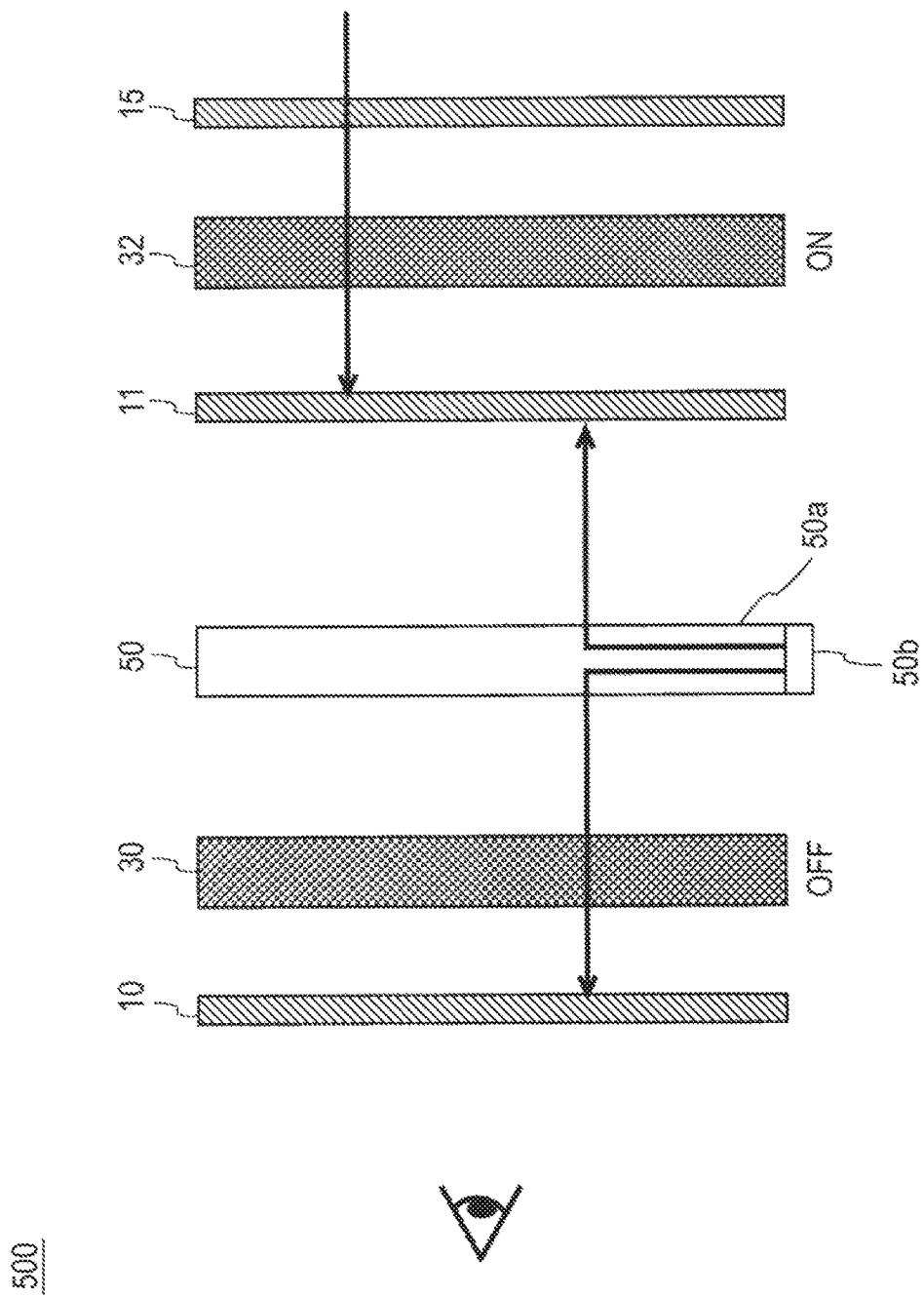
FIG. 21 is a diagram illustrating the transmission of polarized backlight and ambient light when the transparent display illustrated in FIG. 19 is in a turn-off state.
Figure 22:
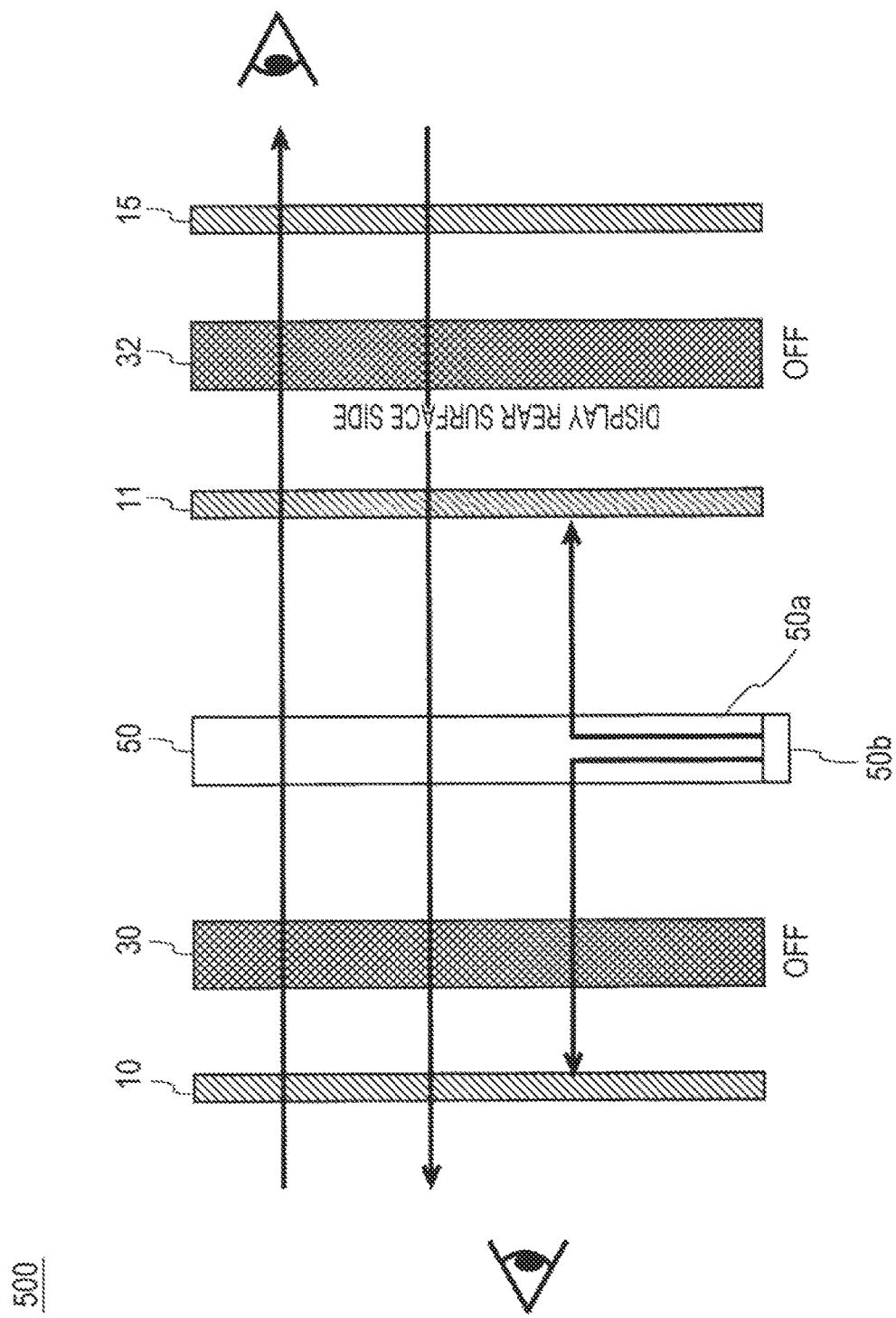
FIG. 22 is a diagram illustrating the transmission of polarized backlight and ambient light when the transparent display illustrated in FIG. 19 is in a transparent state.

FIG. 20 is a diagram illustrating transmission of the polarized backlight and the ambient light when the transparent display 500 is in the turn-on state. FIG. 21 is a diagram Illustrating the transmission of the polarized backlight and the ambient light when the transparent display 500 is in the turn-off state. FIG. 22 is a diagram illustrating the transmission of the polarized backlight and the ambient light when the transparent display 500 is in the transparent state.

In the turn-on state illustrated in FIG. 20, both of the liquid crystal panel 30 and the liquid crystal panel 32 are placed into the ON state. The polarized backlight emitted from the polarized backlight unit 50 to the front side is incident on the liquid crystal panel 30. Since the liquid crystal panel 30 is in the ON state, the polarization direction of the polarized backlight is rotated by 90°, and the polarized backlight is incident on the absorptive polarizer 10. The polarization direction of the polarized backlight becomes the same as the direction of the transmission axis of the absorptive polarizer 10 by rotation. Thus, the polarized backlight is transmitted by the absorptive polarizer 10 and reaches the front surface of the transparent display 500.

Meanwhile, a polarized component, of the ambient light incident from the rear side, that is transmitted by the absorptive polarizer 15 is incident on the liquid crystal panel 32. Since the liquid crystal panel 32 is in the ON state, the polarization direction of the ambient light is rotated by 90°, and the ambient light is incident on the absorptive polarizer 11. The polarization direction of the ambient light becomes the same as the direction of the absorption axis of the absorptive polarizer 11 by 90° rotation. Thus, the ambient light is absorbed by the absorptive polarizer 11 and cannot reach the front surface of the transparent display 500. Accordingly, since only the polarized backlight reaches the front surface of the transparent display 500, the transparent display 500 is placed into the turn-on state.

In the turn-off state illustrated in FIG. 21, the liquid crystal panel 32 is placed into the ON state, and the liquid crystal panel 30 is placed into the OFF state. The polarized backlight emitted from the polarized backlight unit 50 to the front side is incident on the liquid crystal panel 30. Since the liquid crystal panel 30 is in the OFF state, the polarized backlight is incident on the absorptive polarizer 10 without the polarization direction thereof being rotated. The polarization direction of the polarized backlight is the same as the direction of the absorption axis of the absorptive polarizer 10. Thus, the polarized backlight is absorbed by the absorptive polarizer 10 and cannot reach the front surface of the transparent display 500.

Meanwhile, a polarized component, of the ambient light incident from the rear side, that is transmitted by the absorptive polarizer 15 is incident on the liquid crystal panel 32. Since the liquid crystal panel 32 is in the ON state, the polarization direction of the ambient light is rotated by 90°, and the ambient light is incident on the absorptive polarizer 11. The polarization direction of the ambient light is the same as the direction of the absorption axis of the absorptive polarizer 11. Thus, the ambient light is absorbed by the absorptive polarizer 11 and cannot reach the front surface of the transparent display 500. Accordingly, since both of the polarized backlight and the ambient light cannot reach the front surface of the transparent display 500, the transparent display 500 is placed into the turn-off state.

In the transparent state illustrated in FIG. 22, both of the liquid crystal panel 30 and the liquid crystal panel 32 are placed into the OFF state. The polarized backlight emitted from the polarized backlight unit 50 to the front side is incident on the liquid crystal panel 30. Since the liquid crystal panel 30 is in the OFF state, the polarized backlight is incident on the absorptive polarizer 10 without the polarization direction thereof being rotated. Consequently, the polarization direction of the polarized backlight is the same as the direction of the absorption axis of the absorptive polarizer 10. Thus, the polarized backlight is absorbed by the absorptive polarizer 10 and cannot reach the front surface of the transparent display 500.

Meanwhile, a polarized component, of the ambient light incident from the rear side, that is transmitted by the absorptive polarizer 15 is incident on the absorptive polarizer 11 without the polarization direction thereof being rotated by the crystal panel 32 in the OFF state. Consequently, the polarization direction of the ambient light is the same as the direction of the transmission axis of the absorptive polarizer 11. Thus, the ambient light is transmitted by the absorptive polarizer 11 and incident on the liquid crystal panel 30. Since the liquid crystal panel 30 as well is in the OFF state, the ambient light is incident on the absorptive polarizer 10 without the polarization direction thereof being rotated. Consequently, the polarization direction of the ambient light is the same as the direction of the transmission axis of the absorptive polarizer 10. Thus, the ambient light reaches the front surface of the transparent display 500. Accordingly, since only the ambient light can reach the front surface of the transparent display 500, the transparent display 500 is placed into the transparent state.

In the transparent display 500, while the polarized backlight emitted from the polarized backlight unit 50 to the front side reaches the front surface, the polarized backlight emitted to the rear side is absorbed by the absorptive polarizer 11 and cannot reach the inner surface. Thus, even if different pieces of image data are respectively provided to the liquid crystal panel 30 and the liquid crystal panel 32, the transparent display 500 does not function as a double-sided display.

Unlike the case of the fourth embodiment, in the transparent display 500, the polarized backlight unit 50 and the absorptive polarizer 11 are interposed between the two liquid crystal panels 30 and 32. Thus, the liquid crystal panel 30 cannot be arranged in close contact with the liquid crystal panel 32. Thus, when the background is visually recognized in the transparent state, moire may be generated depending on the distance between the liquid crystal panel 30 and the liquid crystal panel 32 or the pixel sizes thereof. Therefore, in order to prevent generation of moire, measures such as using different pixel sizes for the liquid crystal panel 30 and the liquid crystal panel 32 are required to be taken.

5.1 Effect

According to the present embodiment, the second basic configuration 200A from the absorptive polarizer 10 to the absorptive polarizer 11 has the same configuration as the transparent display 200 according to the second embodiment. Thus, the second basic configuration 200A can transmit any of the polarized backlight and the ambient light to the front side. In addition, the liquid crystal panel 32 and the absorptive polarizer 15 arranged on the rear side of the absorptive polarizer 11 function as a shutter that transmits or blocks the ambient light incident from the rear side. Thus, the transparent display 500 incorporating the second basic configuration 200A, the liquid crystal panel 32, and the absorptive polarizer 15 can realize not only the turn-on state of displaying the image and the transparent state of the background being seen therethrough but also the turn-off state of blocking both of the polarized backlight and the ambient light. Accordingly, since black display for the image is enabled, the display quality of the image can be improved.

5.2 Modification Example

Figure 23:
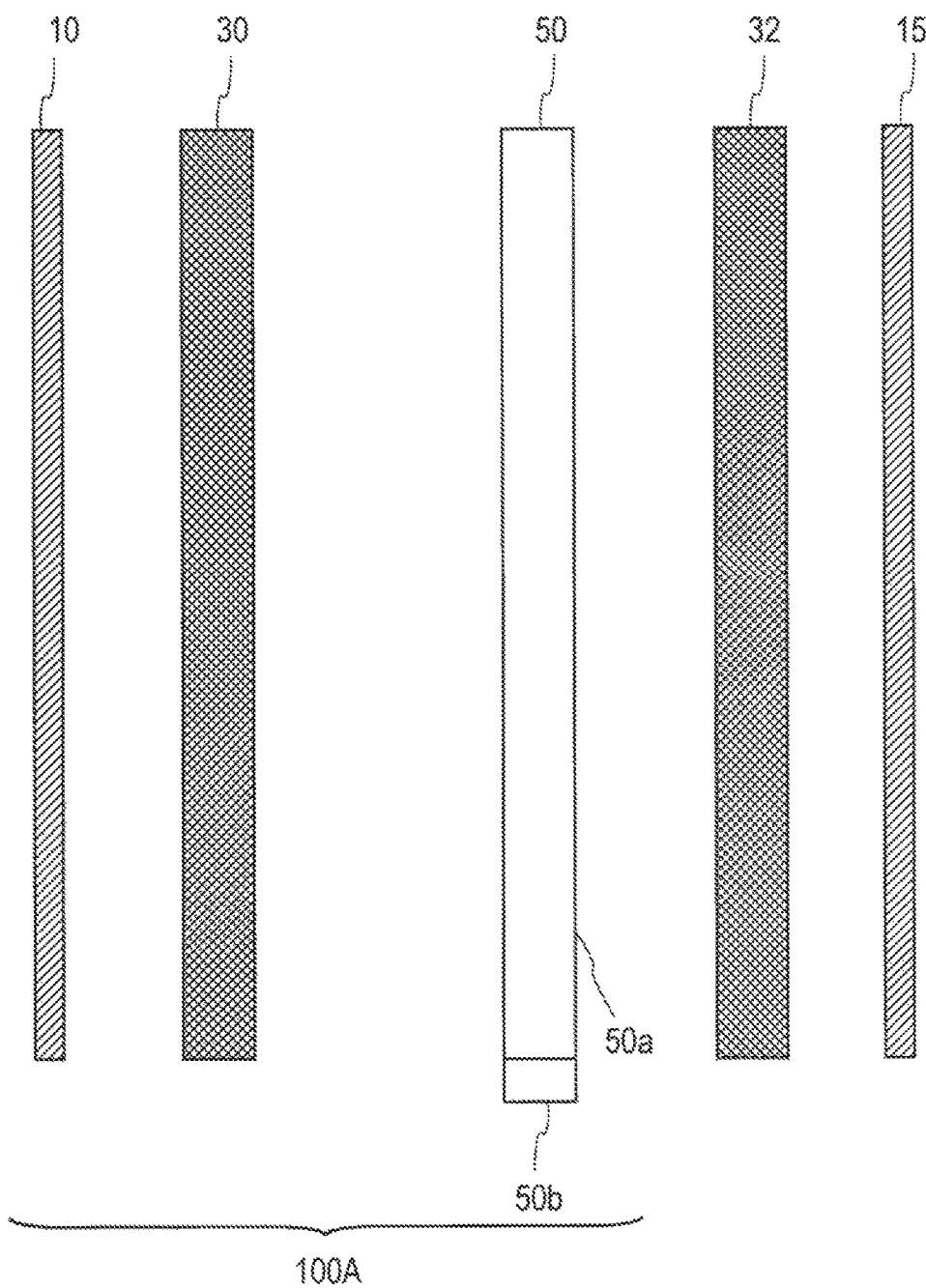
FIG. 23 is a diagram illustrating a configuration of a transparent display according to a modification example of the fifth embodiment of the present invention.

FIG. 23 is a diagram illustrating a configuration of a transparent display 510 according to a modification example of the fifth embodiment of the present invention. As illustrated in FIG. 23, in the transparent display 510 that is a display device, the liquid crystal panel 32 and the absorptive polarizer 15 are further arranged on the rearmost surface of the transparent display 100 illustrated in FIG. 1. That is, the absorptive polarizer 10, the liquid crystal panel 30, the polarized backlight unit 50, the liquid crystal panel 32, and the absorptive polarizer 15 are arranged in this order from the front side of the transparent display 510. The two absorptive polarizers 10 and 15 are adjusted in such a manner that the transmission axes thereof are in the same direction and that the absorption axes thereof are in the same direction. In the present specification, the absorptive polarizer 15 may be referred to as the "fourth polarized component separating unit". The liquid crystal panel 32 may be referred to as a "second illuminant/ambient light adjusting unit".

As described in the first embodiment, in the configuration 100A (first basic configuration 100A) from the absorptive polarizer 10 to the polarized backlight unit 50, the image can be displayed, or the background can be displayed. However, with only the first basic configuration 100A, the black display area does not display black and becomes transparent to display the background. Therefore, in order to enable black display, the liquid crystal panel 32 and the absorptive polarizer 15 that function as a shutter are arranged on the rearmost surface of the transparent display 510 in the present modification example as well.

Figure 24:
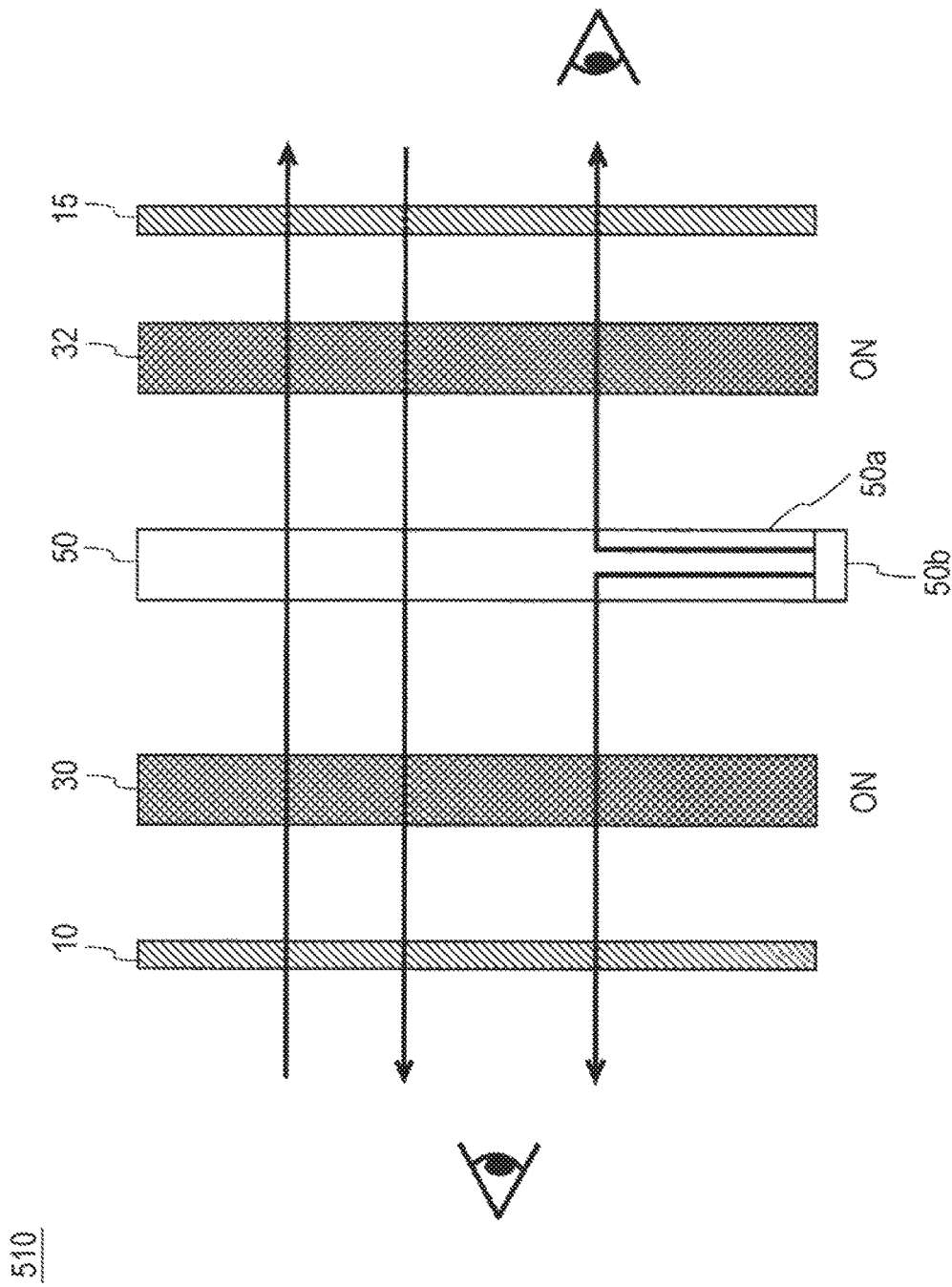
FIG. 24 is a diagram illustrating transmission of polarized backlight and ambient light when the transparent display illustrated in FIG. 23 is in a turn-on state.
Figure 25:
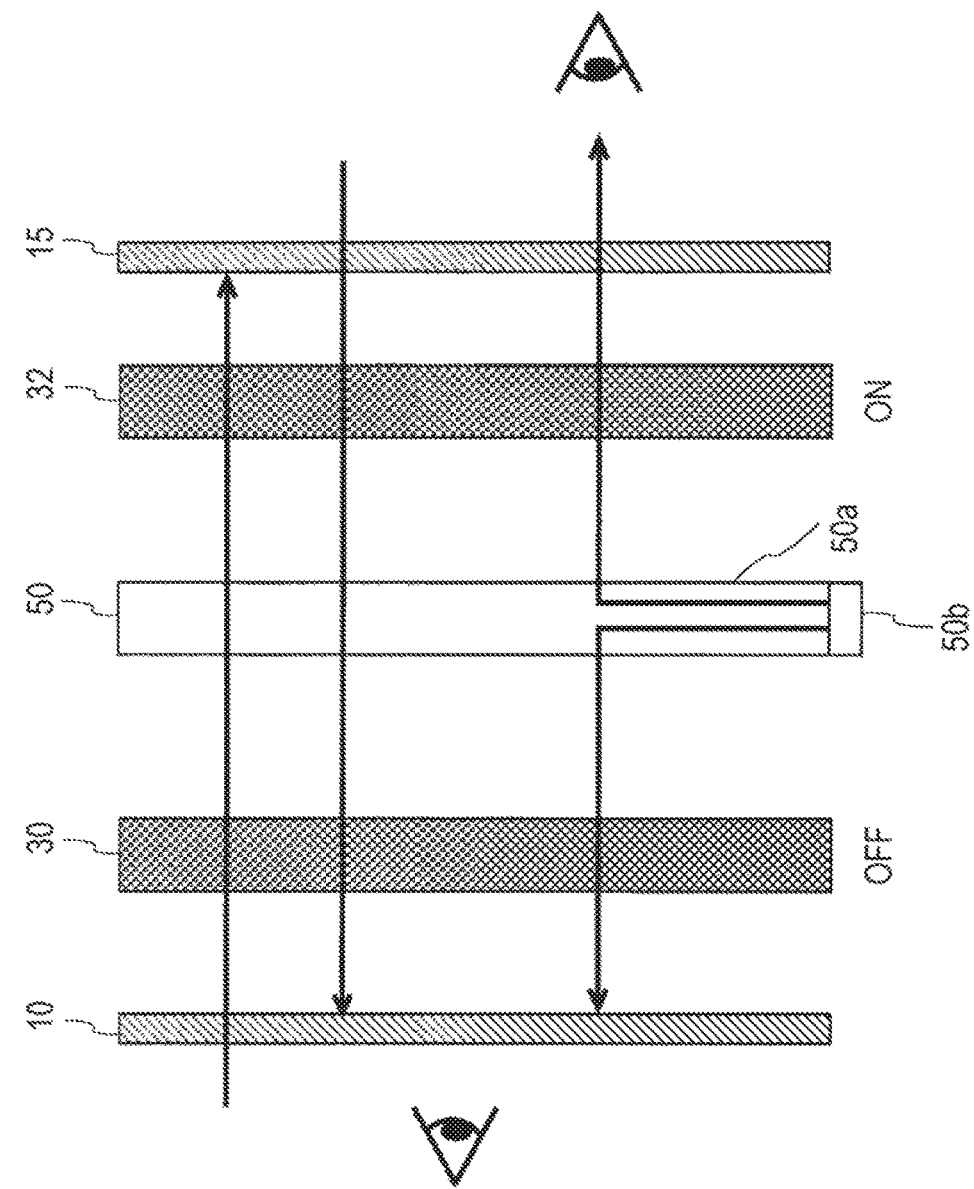
FIG. 25 is a diagram illustrating the transmission of polarized backlight and ambient light when the transparent display illustrated in FIG. 23 is in a turn-off state.
Figure 26:
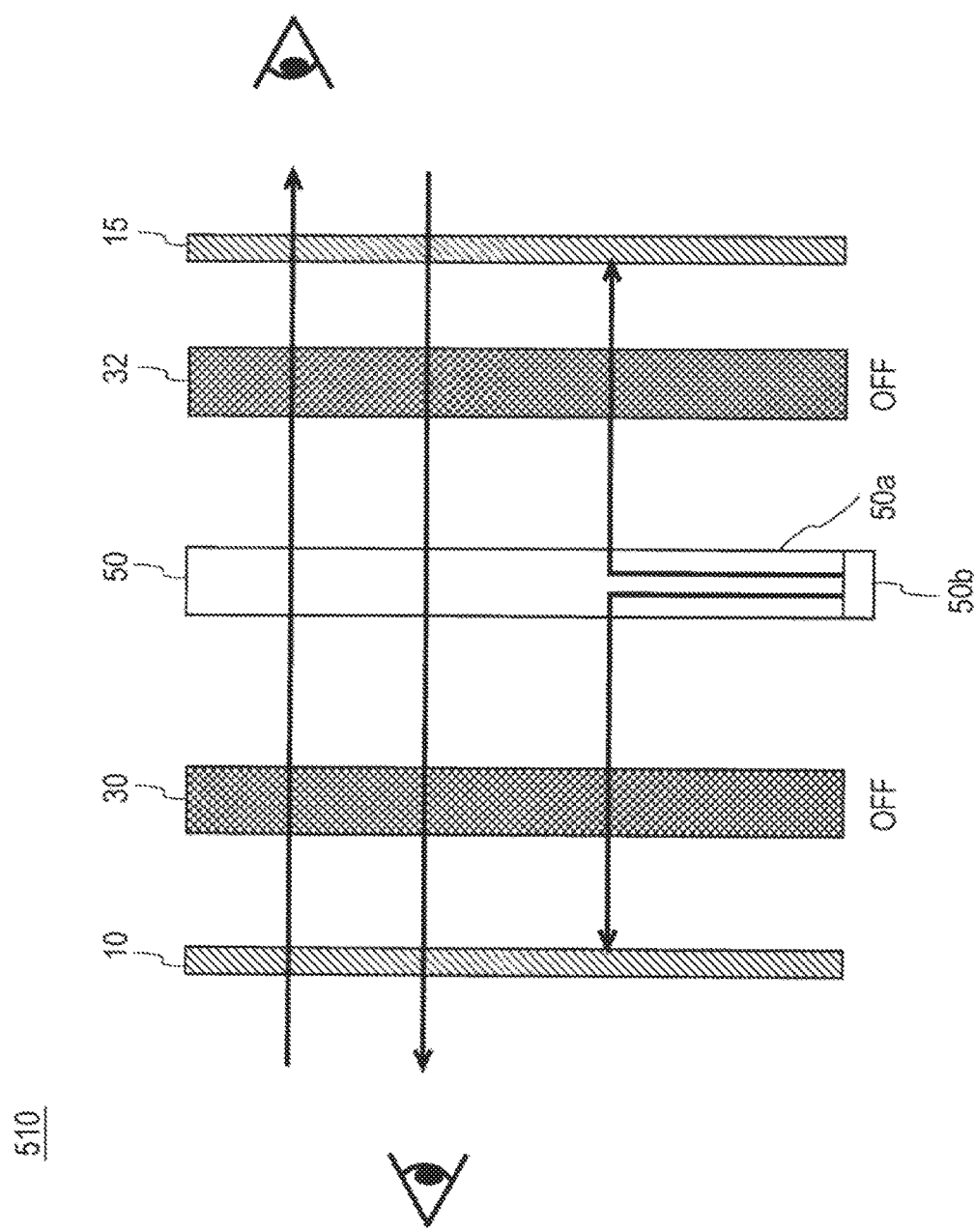
FIG. 26 is a diagram illustrating the transmission of polarized backlight and ambient light when the transparent display illustrated in FIG. 23 is in a transparent state.

FIG. 24 is a diagram illustrating transmission of the polarized backlight and the ambient light when the transparent display 510 is in the turn-on state. FIG. 25 is a diagram illustrating the transmission of the polarized backlight and the ambient light when the transparent display 510 is in the turn-off state. FIG. 26 is a diagram illustrating the transmission of the polarized backlight and the ambient light when the transparent display 510 is in the transparent state.

In the turn-on state illustrated in FIG. 24, both of the liquid crystal panel 30 and the liquid crystal panel 32 are placed into the ON state. The polarized backlight emitted from the polarized backlight unit 50 to the front side is incident on the liquid crystal panel 30 in the ON state. Accordingly, the polarization direction of the polarized backlight incident on the liquid crystal panel 30 is rotated by 90°, and the polarized backlight is incident on the absorptive polarizer 10. Since the polarization direction of the polarized backlight is rotated by 90°, the polarization direction is the same as the direction of the transmission axis of the absorptive polarizer 10. Consequently, the polarized backlight is transmitted by the absorptive polarizer 10 and reaches the front surface of the transparent display 510.

Meanwhile, a polarized component, of the ambient light incident from the rear side, having a polarization direction in the same direction as the transmission axis of the absorptive polarizer 15 is transmitted by the absorptive polarizer 15 and incident on the liquid crystal panel 32 in the ON state. The polarization direction of the polarized component of the ambient light incident on the liquid crystal panel 32 is rotated by 90°, and the polarized component is incident on the liquid crystal panel 30. Since the liquid crystal panel 30 as well is in the ON state, the polarization direction of the ambient light is further rotated by 90°, and the ambient light is incident on the absorptive polarizer 10. Consequently, the polarized component of the ambient light is in the same direction as the transmission axis of the absorptive polarizer 10. Thus, the polarized component is transmitted by the absorptive polarizer 10 and reaches the front surface of the transparent display 510. Accordingly, since both of the polarized backlight and the ambient light reach the front surface of the transparent display 510, the transparent display 510 is placed into the turn-on state.

The transparent display 510 has a symmetric configuration on both sides of the polarized backlight unit 50. Thus, the polarized backlight emitted from the polarized backlight unit 50 to the rear side and the ambient light incident from the front side of the transparent display 510 reach the rear surface in the same manner.

Therefore, in the turn-on state, the observer on the front side of the transparent display 510 can visually recognize the image that is displayed on the liquid crystal panel 30 in an overlaid manner on the background on the rear side. The observer on the rear side can visually recognize the image that is displayed on the liquid crystal panel 32 in an overlaid manner on the background on the front side. In addition, since the liquid crystal panel 30 and the liquid crystal panel 32 can display different images, the observers on the front side and the rear side can visually recognize different images.

In the turn-off state illustrated in FIG. 25, the liquid crystal panel 32 is placed into the ON state, and the liquid crystal panel 30 is placed into the OFF state. The polarized backlight emitted from the polarized backlight unit 50 to the front side is incident on the liquid crystal panel 30 in the OFF state. Accordingly, the polarized backlight incident on the liquid crystal panel 30 is incident on the absorptive polarizer 10 without the polarization direction thereof being rotated. The polarization direction of the polarized backlight is the same as the direction of the absorption axis of the absorptive polarizer 10. Thus, the polarized backlight is absorbed by the absorptive polarizer 10 and cannot reach the front surface of the transparent display 510.

Meanwhile, a polarized component, of polarized components included in the ambient light incident from the rear side, having a polarization direction in the same direction as the transmission axis of the absorptive polarizer 15 is transmitted by the absorptive polarizer 15 and incident on the liquid crystal panel 32 in the ON state. The polarization direction of the ambient light incident on the liquid crystal panel 32 is rotated by 90°, and the ambient light is incident on the liquid crystal panel 30. Since the liquid crystal panel 30 is in the OFF state, the ambient light is incident on the absorptive polarizer 10 without the polarization direction thereof being further rotated. Consequently, the polarization direction of the ambient light is the same as the direction of the absorption axis of the absorptive polarizer 10, and the ambient light is absorbed by the absorptive polarizer 10. Thus, the ambient light as well cannot reach the front surface of the transparent display 510. Accordingly, since both of the polarized backlight and the ambient light cannot reach the front surface of the transparent display 510, the transparent display 510 is placed into the turn-off state.

The polarized backlight emitted from the polarized backlight unit 50 to the rear side is rotated by 90° by the liquid crystal panel 32 in the ON state and incident on the absorptive polarizer 15. Since the polarization direction of the polarized backlight is the same as the direction of the transmission axis of the absorptive polarizer 15, the polarized backlight reaches the rear surface of the transparent display 510. Meanwhile, a polarized component of the ambient light incident from the front side is incident on the liquid crystal panel 30. Since the liquid crystal panel 30 is in the OFF state, the ambient light is incident on the liquid crystal panel 32 without the polarization direction thereof being rotated. Since the liquid crystal panel 32 is in the ON state, the polarization direction of the ambient light is rotated by 90°, and the ambient light is incident on the absorptive polarizer 15. Consequently, the polarization direction of the ambient light is the same as the direction of the absorption axis of the absorptive polarizer 15. Thus, the ambient light is absorbed by the absorptive polarizer 15 and cannot reach the rear surface of the transparent display 510.

Therefore, the observer on the front side of the transparent display 510 cannot visually recognize both of the background on the rear side and the image displayed on the liquid crystal panel 30. The observer on the rear side can visually recognize only the image displayed on the liquid crystal panel 32.

In the transparent state, as illustrated in FIG. 26, both of the liquid crystal panel 30 and the liquid crystal panel 32 are placed into the OFF state. The polarized backlight emitted from the polarized backlight unit 50 to the front side is incident on the liquid crystal panel 30 in the OFF state. The polarized backlight incident on the liquid crystal panel 30 is incident on the absorptive polarizer 10 without the polarization direction thereof being rotated. Consequently, the polarization direction of the polarized backlight is the same as the direction of the absorption axis of the absorptive polarizer 10, and the polarized backlight is absorbed by the absorptive polarizer 10. Thus, the polarized backlight cannot reach the front surface of the transparent display 510.

Meanwhile, a polarized component, of polarized components included in the ambient light incident from the rear side, having a polarization direction in the same direction as the transmission axis of the absorptive polarizer 15 is transmitted by the absorptive polarizer 15 and incident on the liquid crystal panel 32. Since the liquid crystal panel 32 is in the OFF state, the ambient light is incident on the liquid crystal panel 30 without the polarization direction thereof being rotated by the liquid crystal panel 32. Since the liquid crystal panel 30 as well is in the OFF state, the ambient light is incident on the absorptive polarizer 10 without the polarization direction thereof being rotated by the liquid crystal panel 30. Consequently, the polarization direction of the ambient light is the same as the direction of the transmission axis of the absorptive polarizer 10. Thus, the ambient light reaches the front surface of the transparent display 510. Accordingly, since only the ambient light reaches the front surface of the transparent display 510, the transparent display 510 is placed into the transparent state.

The polarized backlight emitted from the polarized backlight unit 50 to the rear side is absorbed by the absorptive polarizer 15. The ambient light incident from the front side is transmitted by the transparent display 510 and reaches the rear surface.

Therefore, the observer on the front side of the transparent display 510 can visually recognize the background on the rear side, and the observer on the rear side can visually recognize the background on the front side. However, both of the observers cannot visually recognize the image.

Accordingly, in the transparent display 510, the polarized backlight emitted from the polarized backlight unit 50 to the front side reaches the front surface, and the polarized backlight emitted to the rear side reaches the inner surface. Thus, the transparent display 510 functions as a double-sided display by providing different pieces of image data to the liquid crystal panel 30 and the liquid crystal panel 32. Accordingly, the observers on the front side and the rear side can visually recognize different images.

The embodiment and the modification example above describe the transparent display 500 in which the liquid crystal panel 32 and the absorptive polarizer 15 are arranged on the rearmost surface of the transparent display 200 according to the second embodiment, and the transparent display 510 in which the liquid crystal panel 32 and the absorptive polarizer 15 are arranged on the rearmost surface of the transparent display 100 according to the first embodiment. A transparent display in which the liquid crystal panel 32 and the absorptive polarizer 15 are arranged on the rearmost surface of the transparent display 300 according to the third embodiment is the same as the transparent displays 500 and 510. Thus, drawings and descriptions thereof will not be provided.

6. Sixth Embodiment

Figure 27:
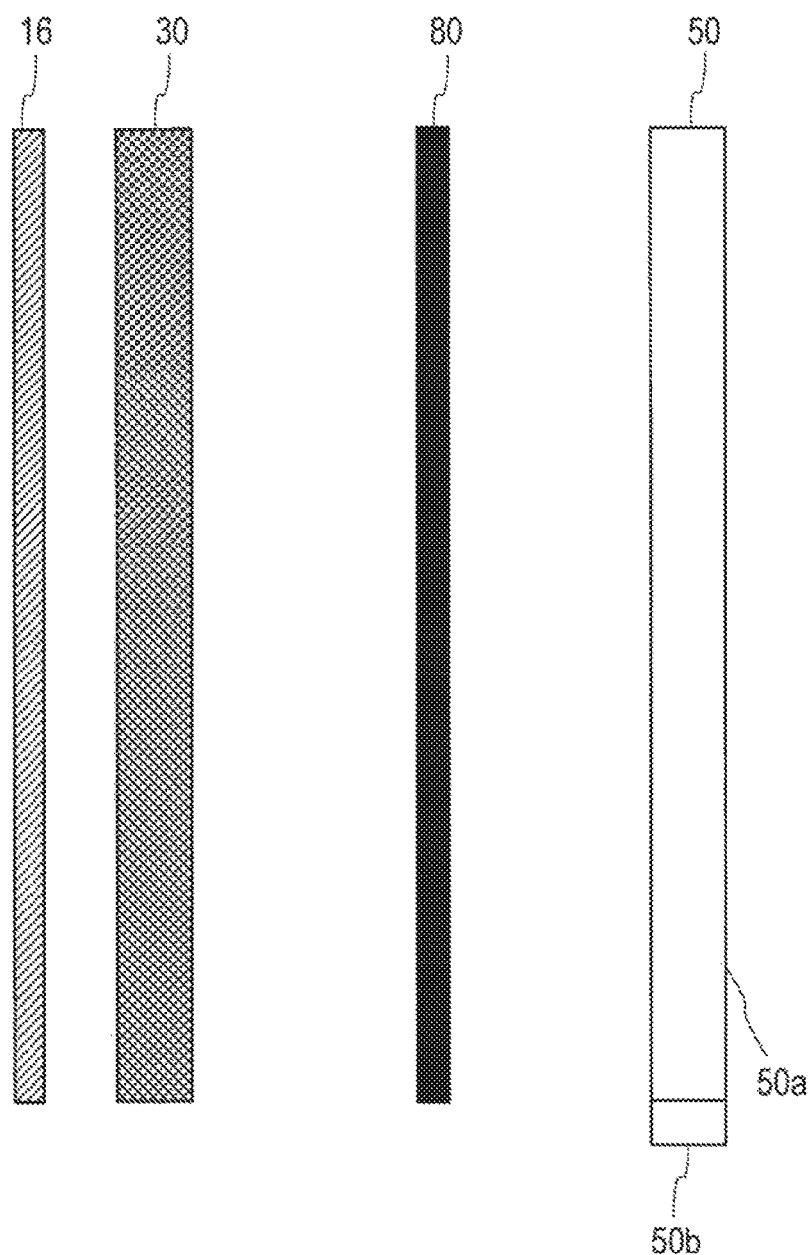
FIG. 27 is a diagram illustrating a configuration of a transparent display according to a sixth embodiment of the present invention.

FIG. 27 is a diagram illustrating a configuration of a transparent display 600 according to a sixth embodiment of the present invention. As illustrated in FIG. 27, in the transparent display 600 that is a display device, unlike the transparent display 100 illustrated in FIG. 1, an absorptive polarizer 16 of which the transmission axis and the absorption axis are respectively orthogonal with respect to the transmission axis and the absorption axis of the absorptive polarizer 10 arranged on the frontmost surface is arranged instead of the absorptive polarizer 10. Furthermore, a λ/2 waveplate 80 that is one kind of retardation plate is arranged between the liquid crystal panel 30 and the polarized backlight unit 50. Accordingly, the absorptive polarizer 16, the liquid crystal panel 30, the λ/2 waveplate 80, and the polarized backlight unit 50 are arranged in this order from the front side of the transparent display 600. "λ" denotes the wavelength of light. In the present specification, the λ/2 waveplate 80 may be referred to as a "first polarization direction changing unit". The absorptive polarizer 16 is included in the above "first polarized component separating unit".

A retardation plate is a transparent plate for imparting a retardation to incident light and is a birefringent element that imparts a prescribed retardation between two components when transmitting orthogonal polarized components. A λ/2 waveplate imparts a retardation of π and can change the polarization direction of linearly polarized light. A λ/4 waveplate imparts a retardation of π/2 and can convert linearly polarized light into circularly polarized light or convert circularly polarized light into linearly polarized light.

For example, in the case of the transparent display 600 having only the absorptive polarizer 16 of which the direction of the transmission axis is different by 90° from the polarization direction of the polarized backlight emitted from the liquid crystal panel 30 in the ON state, the λ/2 waveplate 80 is arranged between the liquid crystal panel 30 and the polarized backlight unit 50. Accordingly, the polarization direction of the polarized backlight incident on the liquid crystal panel 30 can be rotated by 90°. Therefore, the present embodiment will describe the case of using the λ/2 waveplate 80 as a retardation plate.

A problem when the λ/2 waveplate 80 is not arranged will be described before description of the transmission of the polarized backlight in the transparent display 600. FIG. 28 is a diagram illustrating the transmission of the polarized backlight in a transparent display 601 in which the λ/2 waveplate 80 is not arranged. FIG. 29 is a diagram illustrating the transmission of the polarized backlight and the ambient light in the transparent display 600 in which the λ/2 waveplate 80 is arranged. In the transparent displays 601 and 600 respectively illustrated in FIG. 28 and FIG. 29, unlike the case described in the transparent display 100 of FIG. 1, the direction of the transmission axis of the absorptive polarizer 16 is assumed to be the same as the polarization direction of the polarized backlight immediately after being emitted from the polarized backlight unit 50.

As illustrated in FIG. 28, the polarized backlight emitted from the polarized backlight unit 50 is incident on the liquid crystal panel 30. Since the liquid crystal panel 30 is in the ON state, the polarization direction of the polarized backlight is rotated by 90°, and the polarized backlight is incident on the absorptive polarizer 16. The polarization direction of the polarized backlight transmitted by the liquid crystal panel 30 is the same as the direction of the absorption axis of the absorptive polarizer 16. Thus, the polarized backlight is absorbed by the absorptive polarizer 16 and cannot be transmitted to the front surface of the transparent display 601.

Therefore, in order to transmit the polarized backlight to the front surface in the transparent display 601, the λ/2 waveplate 80 is arranged between the polarized backlight unit 50 and the liquid crystal panel 30 in the transparent display 600 as illustrated in FIG. 29. The polarized backlight emitted from the polarized backlight unit 50 is incident on the λ/2 waveplate 80, transmitted with the polarization direction thereof being rotated by 90°, and incident on the liquid crystal panel 30. Since the liquid crystal panel 30 is in the ON state, the polarization direction of the polarized backlight is further rotated by 90° by the liquid crystal panel 30. Accordingly, the polarization direction of the polarized backlight is the same as the direction of the transmission axis of the absorptive polarizer 16, and the polarized backlight is transmitted to the front surface of the transparent display 600.

While described is the case of rotating the polarization direction of the polarized backlight by 90°, the rotation angle may be any angle. For example, the same can be applied to the case of a 45° difference between the polarization direction of the polarized backlight and the polarization direction of the absorptive polarizer 16 by using a retardation plate corresponding to the case.

An optical rotator may be used instead of the retardation plate. The optical rotator, in the same manner as the retardation plate, can be used for not only the case of a 90° difference between the polarization direction of the polarized backlight and the polarization direction of the absorptive polarizer 16 but also the case of a difference of any angle therebetween.

The usable polarization direction is determined for not only the absorptive polarizer but also the liquid crystal panel. Thus, the same can be applied to the case of a 90° difference between the direction of the transmission axis of the liquid crystal panel and the polarization direction of the polarized backlight emitted from the liquid crystal panel 30 in the ON state. In this case, an inexpensive retardation plate or an inexpensive optical rotator may be used without preparation of a new liquid crystal panel that is expensive compared with the absorptive polarizer. Thus, the manufacturing cost of the transparent display can be significantly decreased.

6.1 Effect

According to the present embodiment, in the case of the direction of the transmission axis of the absorptive polarizer 16 arranged on the frontmost surface of the transparent display 600 not being a direction in which the polarized backlight is transmitted, the polarized backlight can be transmitted to the front side of the transparent display 600 by arranging the λ/2 waveplate 80 between the polarized backlight unit 50 and the liquid crystal panel 30. Accordingly, without preparation of a new absorptive polarizer instead of the absorptive polarizer 16, the transparent display 600 can transmit a desired polarized component of the polarized backlight or the ambient light. Accordingly, the manufacturing cost of the transparent display 600 can be decreased. The same can be applied to the case of the direction of the transmission axis of the liquid crystal panel being different from the polarization direction of the polarized backlight emitted from the liquid crystal panel 30 in the ON state. In this case, an inexpensive retardation plate or an inexpensive optical rotator may be used without preparation of a new liquid crystal panel. Thus, the manufacturing cost of the transparent display can be more significantly decreased.

6.2 Modification Example

Figure 31:
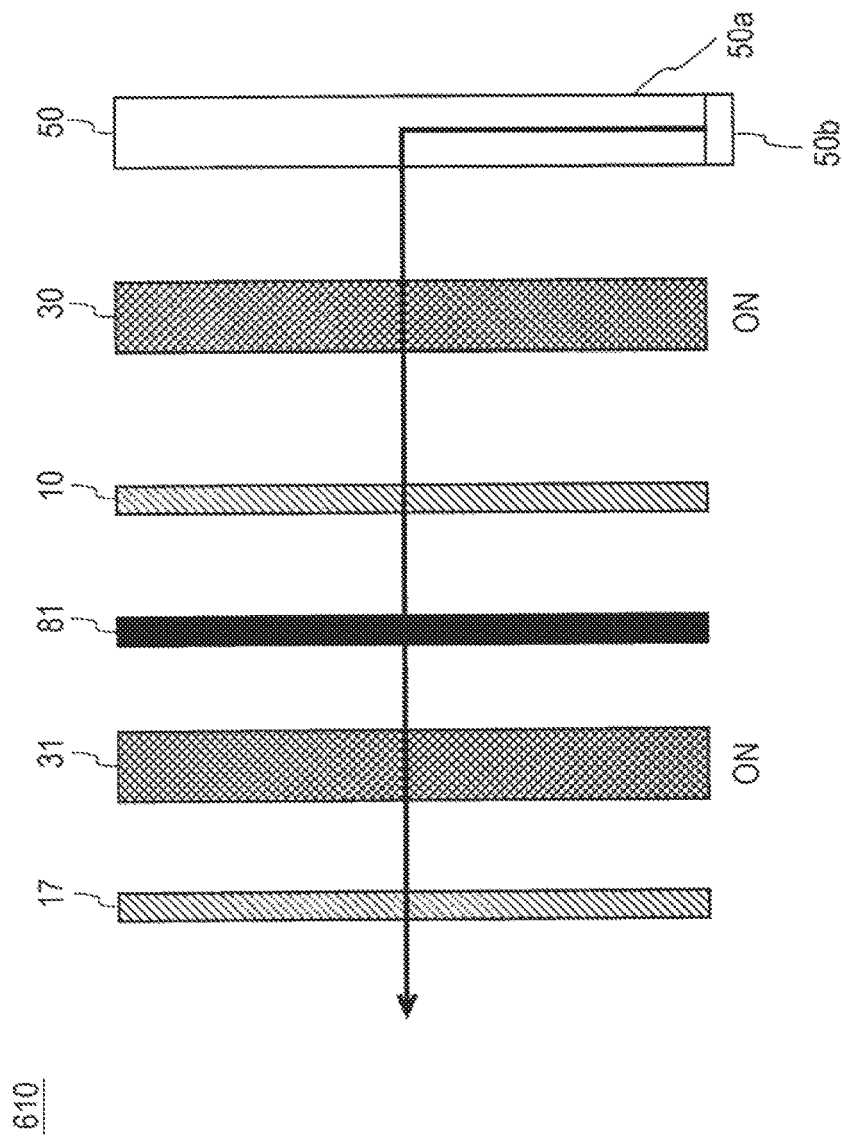
FIG. 31 is a diagram illustrating the transmission of polarized backlight and ambient light in a transparent display where a λ/2 waveplate is not arranged.

FIG. 30 is a diagram illustrating the transmission of the polarized backlight in a transparent display 602 in which the λ/2 waveplate 81 is not arranged. FIG. 31 is a diagram illustrating the transmission of the polarized backlight and the ambient light in the transparent display 610 in which the λ/2 waveplate 81 is arranged. In the transparent displays 602 and 610 respectively illustrated in FIG. 30 and FIG. 31, unlike the case described in the transparent display 400 of FIG. 11, the direction of the transmission axis of an absorptive polarizer 17 is orthogonal with respect to each of the directions of the transmission axis and the absorption axis of the absorptive polarizer 13. In this case, the polarization direction of the polarized backlight immediately after being emitted from the polarized backlight unit 50 is the same as the direction of the transmission axis of the absorptive polarizer 17.

As illustrated in FIG. 30, the polarized backlight emitted from the polarized backlight unit 50 is incident on the liquid crystal panel 30. Since the liquid crystal panel 30 is in the ON state, the polarization direction of the polarized backlight is rotated by 90°, and the polarized backlight is transmitted by the absorptive polarizer 10 and incident on the liquid crystal panel 31. Since the liquid crystal panel 31 as well is in the ON state, the polarization state of the polarized backlight is further rotated, and the polarized backlight is incident on the absorptive polarizer 17. The polarization direction of the polarized backlight is the same as the direction of the absorption axis of the absorptive polarizer 17. Thus, the polarized backlight is absorbed by the absorptive polarizer 17 and cannot be transmitted to the front surface of the transparent display 602.

Therefore, in order to transmit the polarized backlight to the front surface in the transparent display 602 of the above configuration, a λ/2 waveplate 81 is arranged between the polarized backlight unit 50 and the liquid crystal panel 30 in the transparent display 610 that is a display device, as illustrated in FIG. 31. Accordingly, the polarization direction of the polarized backlight transmitted by the absorptive polarizer 10 is further rotated by 90° by the λ/2 waveplate 81, and the polarized backlight is incident on the liquid crystal panel 31. Since the liquid crystal panel 31 is in the ON state, the polarization direction of the polarized backlight is further rotated, and the polarized backlight is incident on the absorptive polarizer 17. Consequently, the polarization direction of the polarized backlight is the same as the direction of the transmission axis of the absorptive polarizer 17. Thus, the polarized backlight is transmitted by the absorptive polarizer 17 and reaches the front surface of the transparent display 610. In the present specification, the λ/2 waveplate 81 may be referred to as a "second polarization direction changing unit". The absorptive polarizer 17 is included in the above "third polarized component separating unit".

While the λ/2 waveplate 81 is arranged between the liquid crystal panel 31 and the absorptive polarizer 10 in the above modification example, the λ/2 waveplate 81 may be arranged between the liquid crystal panel 30 and the polarized backlight unit 50.

The embodiment and the modification example above describe the transparent display 600 in which the λ/2 waveplate 80 is arranged between the liquid crystal panel 30 and the polarized backlight unit 50 of the transparent display 100 according to the first embodiment, and the transparent display 610 in which the λ/2 waveplate 81 is arranged between the liquid crystal panel 31 and the absorptive polarizer 10 of the transparent display 400 according to the fourth embodiment. A transparent display is which the λ/2 waveplate is arranged in the transparent display 500 according to the second, third, and fifth embodiments is the same as the transparent displays 600 and 610. Thus, drawings and descriptions thereof will not be provided.

7. Common Modification Example for Each Embodiment

While a polarizer for a normally white type is bonded to the liquid crystal panel 30 in the description of above each embodiment, a polarizer for a normally black type may be bonded thereto. In order to configure a normally black type, an absorptive polarizer of which the transmission axis and the absorption axis are respectively orthogonal with respect to the transmission axis and the absorption axis of the absorptive polarizer 10 may be bonded to the liquid crystal panel 30 instead of the absorptive polarizer 10.

While the polarized backlight is linearly polarized light in the description of above each embodiment, the polarized backlight may be circularly polarized light. In this case, considered is, for example, a configuration of converting the polarized backlight emitted from the polarized backlight unit 50 into circularly polarized light by causing the polarized backlight to be transmitted by a λ/4 waveplate, configuring the liquid crystal panel 30 of a VA liquid crystal, and replacing the absorptive polarizer and the reflective polarizer respectively with an absorptive circular polarizer and a reflective circular polarizer.

The transparent display of above each embodiment is a display that displays any of a color image and a black-and-white image. In the case of a display that displays a color image, the transparent display is driven as any of a color filter type in which a color filter layer is formed in the liquid crystal panel 30, and a field sequential type that emits light of red, green, and blue in order in a time-division manner.

8. Configuration of Polarized Backlight Unit

While the above first to sixth embodiments describe using, as a backlight unit, the polarized backlight unit 50 that emits polarized backlight in a specific polarization direction, a specific configuration of the polarized backlight unit 50 is not described. Therefore, hereinafter, a configuration of a polarized backlight unit that can be used in the transparent displays 100 to 610 according to above each embodiment will be described. All of each polarized backlight unit described below can be used in the transparent displays 100 to 610 according to above each embodiment.

8.1 First Polarized Backlight Unit

Figure 32:
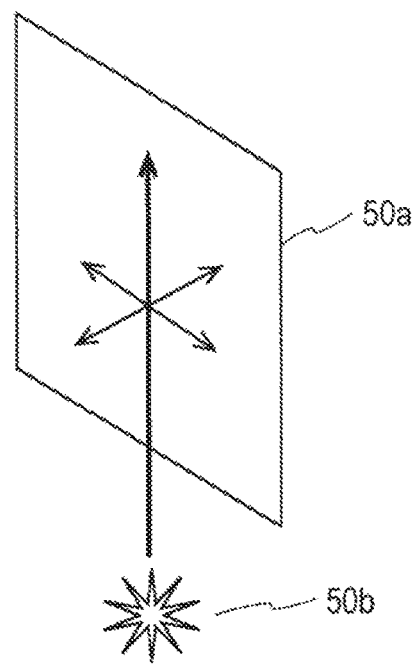
FIG. 32 is a diagram illustrating polarization direction of light.

FIG. 32 is a diagram illustrating polarization direction of light. Light is a transverse wave of which the electric field vector and the magnetic field vector change in a direction perpendicular to the traveling direction thereof. The above each embodiment describes light as linearly polarized light of which the direction of change of the electric field vector has two orthogonal directions determined by the polarized component determined by the direction of the transmission axis of the absorptive or reflective polarizer and the polarized component of the polarized backlight. Therefore, in each polarized backlight unit described below, light that is incident on the light guide plate 50*a* will be described as linearly polarized light configured of two orthogonal polarized components.

Figure 33:
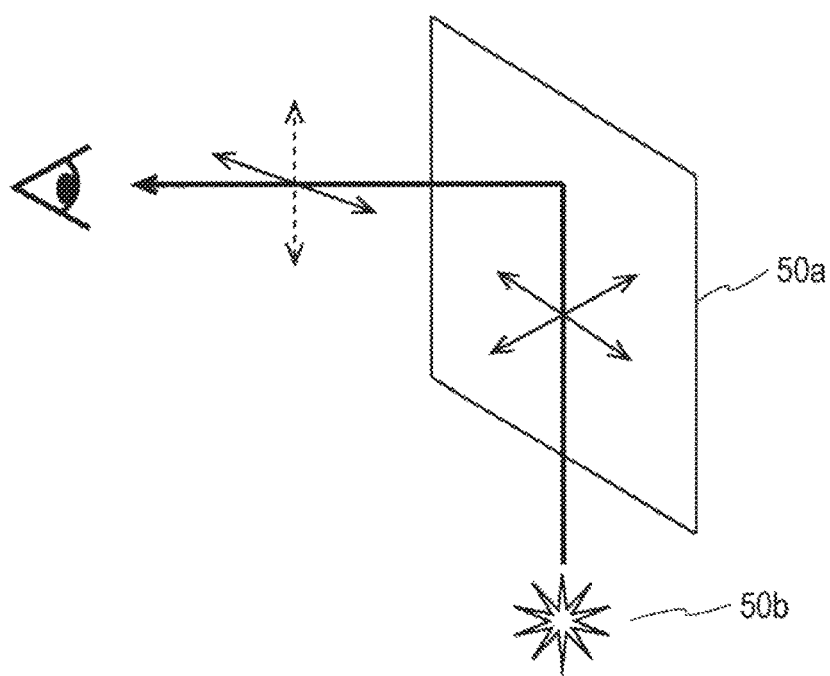
FIG. 33 is a diagram illustrating a relationship between the polarization direction of light propagating in a light guide plate and the polarization direction of light emitted from the light guide plate.

FIG. 33 is a diagram illustrating a relationship between the polarization direction of light propagating in the light guide plate 50*a* and the polarization direction of light emitted from the light guide plate 50*a*. As illustrated in FIG. 33, the case of linearly polarized light configured of two polarized components of orthogonal polarization directions being incident on the light guide plate 50*a* from the illuminant 50*b* attached to the lower edge (light incidence edge) of the light guide plate 50*a* and being acquired on the front side of the light guide plate 50*a* will be described. When light is acquired from the light guide plate 50*a*, the polarized light is assumed to be rarely scattered.

Light that is incident from the lower edge of the light guide plate 50*a* and propagates upward in the light guide plate 50*a* includes two polarized components of orthogonal polarization directions. The two polarized components are a polarized component having an electric field vector changing in the width direction of the light guide plate 50*a* and a polarized component having an electric field vector changing in the thickness direction of the light guide plate 50*a*. The polarized component having an electric field vector changing in the width direction of the light guide plate 50*a* contributes to light emitted in a direction perpendicular to the light guide plate 50*a*. The polarized component having an electric field vector changing in the thickness direction of the light guide plate 50*a* does not contribute to the light. Therefore, light that includes a large amount of the polarized component having an electric field vector changing in the width direction of the light guide plate 50*a* can be acquired from the light guide plate 50*a* by restricting the direction of light incident on the light guide plate 50*a*.

Figure 34:
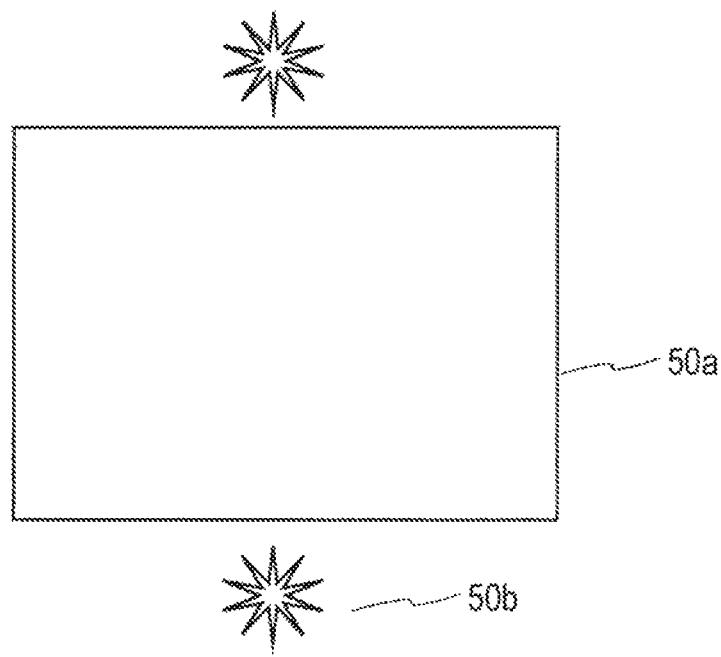
FIG. 34 is a diagram illustrating a case of incidence of light from two opposite edges of the light guide plate.

The above description describes the case of incidence of linearly polarized light from only the lower edge of the light guide plate 50*a*. However, as illustrated in FIG. 34, light of a high degree of polarization can also be acquired from the light guide plate 50*a* in the case of incidence of light from two opposite upper and lower edges or two opposite left and right edges of the light guide plate 50*a*. Light that is acquired from the light guide plate 50*a* in such a case can be used as the polarized backlight in above each embodiment.

Figure 35:
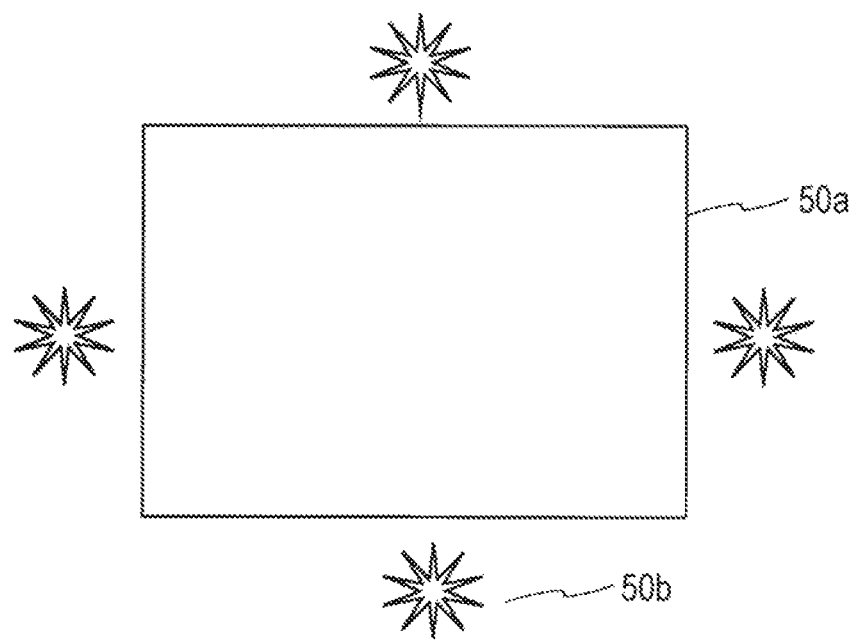
FIG. 35 is a diagram illustrating a case of incidence of light from four surrounding edges of the light guide plate.

As illustrated in FIG. 35, in the case of incidence of linearly polarized light from four upper, lower, left, and right edges of the light guide plate 50*a*, light acquired from the light guide plate 50*a* has a low degree of polarization and does not include a large amount of a specific polarized component. Thus, light that is acquired from the light guide plate 50*a* cannot be used as the polarized backlight in above each embodiment.

Incidence of light in the light guide plate 50*a* from two opposite edges, as illustrated in FIG. 34, can be applied to not only the case of incidence of illuminant light in the light guide plate 50*a* from one edge but also all of each polarized backlight unit described later, and the same effect is acquired. Therefore, while the following description describes the case of incidence of illuminant light from one edge of the light guide plate, illuminant light may be incident on the light guide plate from two opposite edges in the same manner as the case illustrated in FIG. 34.

8.2 Second Polarized Backlight Unit

Figure 36:
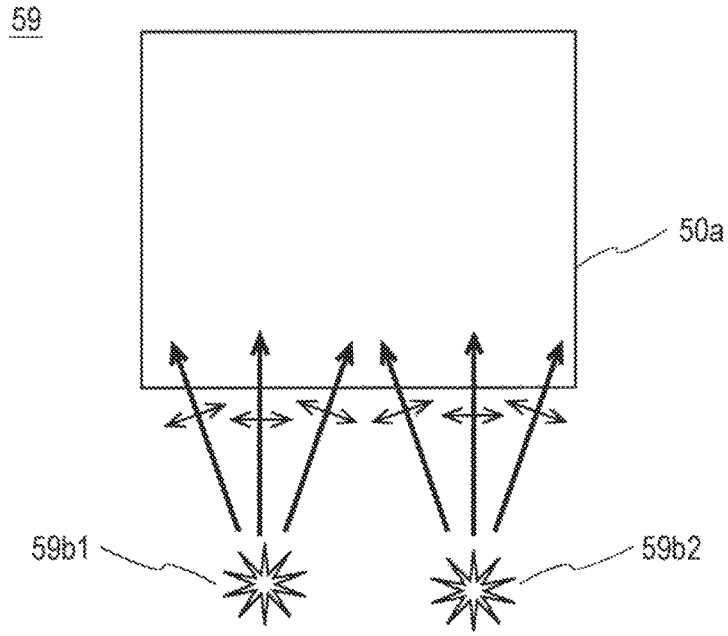
FIG. 36 is a diagram illustrating a configuration of a backlight unit in the related art.
Figure 37:
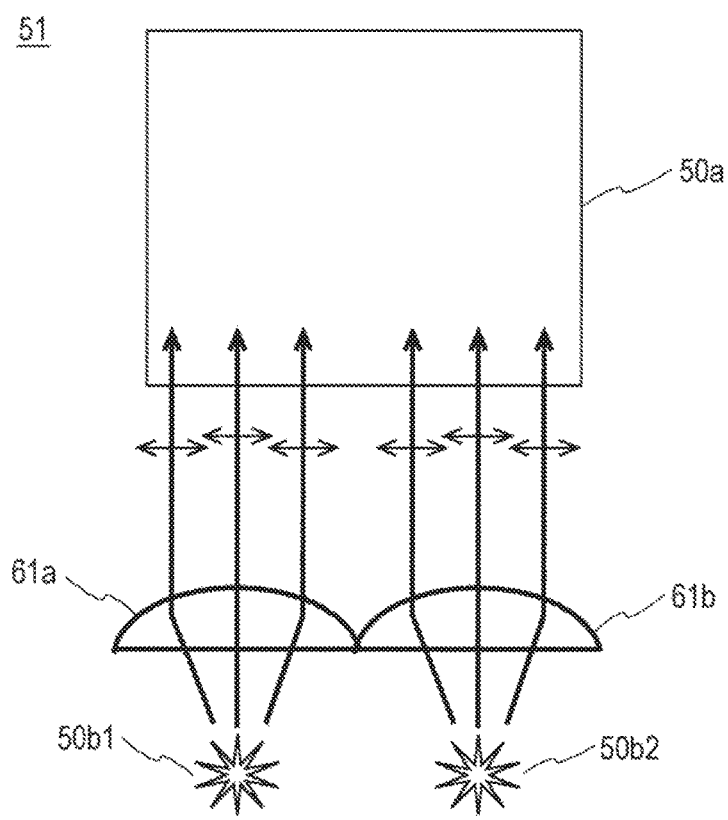
FIG. 37 is a diagram illustrating a configuration of a second polarized backlight unit.

FIG. 36 is a diagram illustrating a configuration of a backlight unit 59 in the related art. FIG. 37 is a diagram illustrating a configuration of a polarized backlight unit 51. As illustrated in FIG. 36, the backlight unit 59 in the related art, for example, causes light emitted from each of two illuminants 59*b*1 and 59*b*2 to be directly incident on the light guide plate 50*a*. However, in the case of the illuminants 59*b*1 and 59*b*2 being, for example, light emitting diodes (LEDs), light (illuminant light) emitted from each of the illuminants 59*b*1 and 59*b*2 spreads all around, and the traveling direction thereof is not aligned to a constant direction. In addition, since the polarization direction of the polarized component is orthogonal with respect to the traveling direction, the polarization direction as well is not aligned in the case of the traveling direction not being aligned to a constant direction. Even if a specific polarized component is desired to be acquired from the light guide plate 50a on which illuminant light of unaligned polarization directions is incident, light that is acquired includes a large amount of polarized components having various polarization directions. Thus, the degree of polarization of the light is decreased.

Therefore, as illustrated in FIG. 37, for example, two cylindrical lenses 61a and 61b are arranged between the light guide plate 50a and two illuminants 50b1 and 50b2 respectively in correspondence with the illuminants 50b1 and 50b2. Illuminant light that is transmitted by each of the cylindrical lenses 61a and 61b is incident on the light guide plate 50a. A cylindrical lens is a lens that emits a linear beam by changing incident light in the width direction (curvature direction) of the lens and not changing the incident light in the length direction.

The illuminant light incident on the light guide plate 50a is transmitted by each of the cylindrical lenses 61a and 61b and thus has a high translation property, and the polarization directions of the polarized components thereof are aligned to a certain extent. The sum of the widths of the two cylindrical lenses 61a and 61b is set to be approximately equal to the width of the light guide plate 50a. Accordingly, if light that is transmitted by the cylindrical lenses 61a and 61b and incident on the light guide plate 50a is acquired from the light guide plate 50a, the light can be used as the polarized backlight. While two illuminants 50b1 and 50b2 and two cylindrical lenses 61a and 61b are in FIG. 37, the number of illuminants and the number of cylindrical lenses may be three or more provided that the numbers of illuminants and cylindrical lenses are the same. Regardless of the number of illuminants and the number of cylindrical lenses, the sum of the widths of the cylindrical lenses is set to be approximately equal to the width of the light guide plate 50a at all times.

8.3 Third Polarized Backlight Unit

Figure 38:
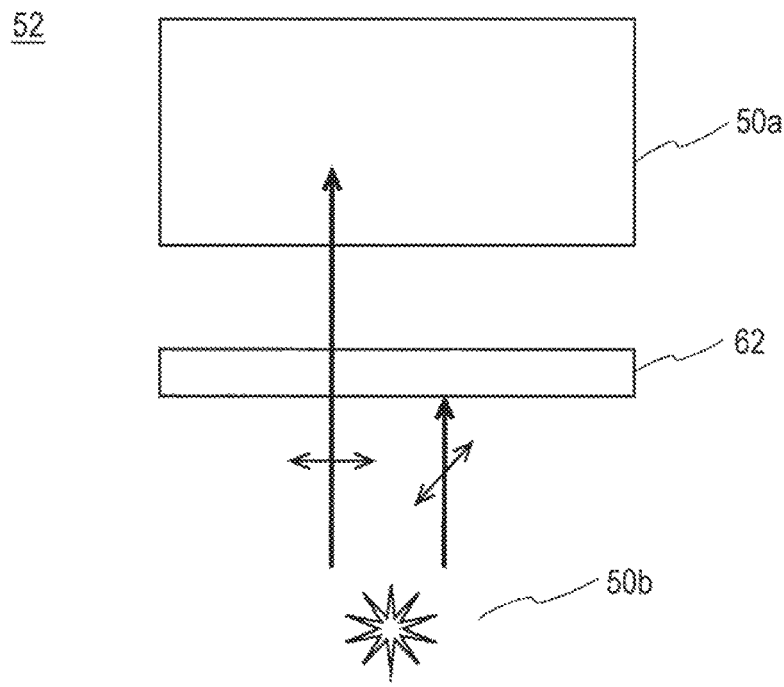
FIG. 38 is a diagram illustrating a configuration of a third polarized backlight unit in which an absorptive polarizer is used as a polarization element.
Figure 39:
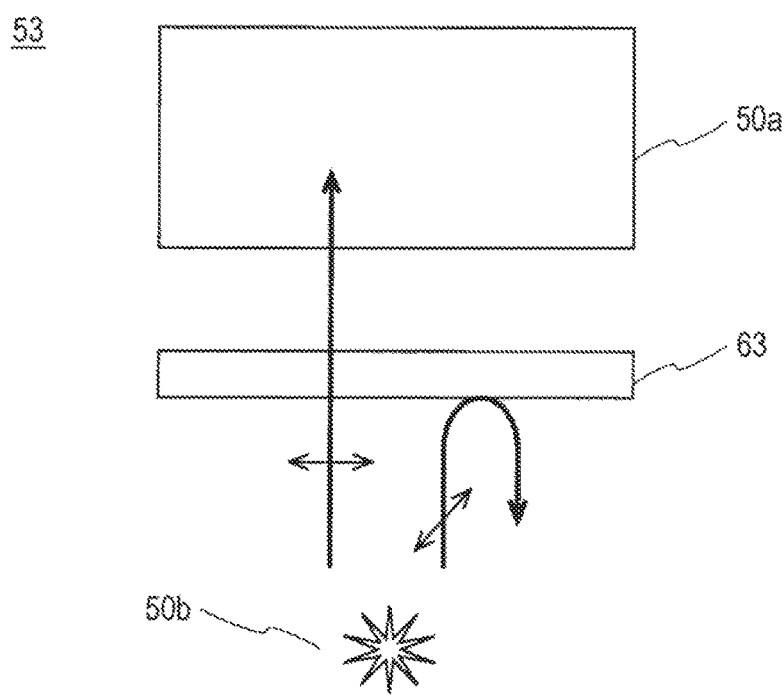
FIG. 39 is a diagram illustrating a configuration of another third polarized backlight unit in which a reflective polarizer is used as a polarization element.
Figure 40:
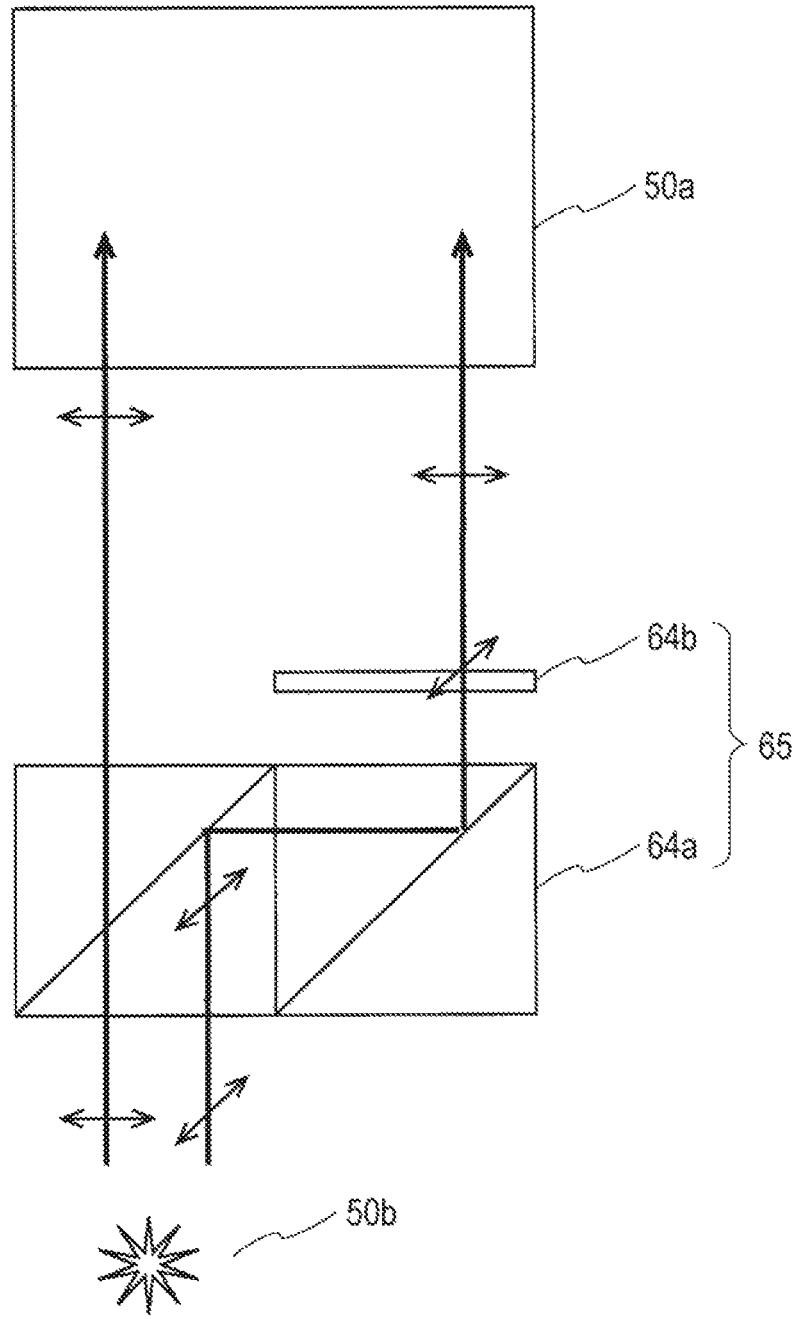
FIG. 40 is a diagram illustrating a configuration of still another third polarized backlight unit in which a polarization conversion element is used as a polarization element.

FIG. 38 is a diagram illustrating a configuration of a polarized backlight unit 52 in which an absorptive polarizer 62 is used as a polarization element. FIG. 39 is a diagram illustrating a configuration of a polarized backlight unit 53 in which a reflective polarizer 63 is used as a polarization element. FIG. 40 is a diagram illustrating a configuration of a polarized backlight unit 54 in which a polarization conversion element 65 is used.

As illustrated in FIG. 38, the absorptive polarizer 62 that is arranged between the illuminant 50b and the light guide plate 50a transmits a polarized component, of light emitted from the illuminant 50b, that changes in the width direction of the light guide plate 50a, and absorbs a polarized component that changes in the thickness direction of the light guide plate 50a. Accordingly, illuminant light that is incident on the light guide plate 50a is light that includes a large amount of the polarized component changing in the width direction of the light guide plate 50a. Thus, since light that is acquired from the light guide plate 50a of the polarized backlight unit 52 includes a large amount of the polarized component changing in the width direction of the light guide plate 50a, the light can be used as the polarized backlight. In the present specification, the absorptive polarizer 62 may be referred to as an "absorptive separating unit".

Backlight of a high degree of polarization is acquired by using the absorptive polarizer 62. In addition, the absorptive polarizer 62 is inexpensive, and the manufacturing cost of the polarized backlight unit 52 can be decreased.

As illustrated in FIG. 39, the reflective polarizer 63 that is arranged between the illuminant 50b and the light guide plate 50a transmits a polarized component, of light emitted from the illuminant 50b, that changes in the width direction of the light guide plate 50a, and reflects a polarized component that changes in the thickness direction of the light guide plate 50a. Accordingly, illuminant light that is incident on the light guide plate 50a is light that includes a large amount of the polarized component changing in the width direction of the light guide plate 50a. Thus, in the same manner as the case of using the absorptive polarizer 62, since light that is acquired from the light guide plate 50a of the polarized backlight unit 53 includes a large amount of the polarized component changing in the width direction of the light guide plate 50a, the light can be used as the polarized backlight. In the present specification, the reflective polarizer 63 may be referred to as a "reflective separating unit".

By using the reflective polarizer 63, the reflected polarized component can be reused for other purposes such as increasing the optical output by converting the reflected polarized component into a target polarized component and causing the converted polarized component to be incident again. In addition, if an inorganic wire-grid polarizer that can endure a high optical output is used as the reflective polarizer 63, an illuminant that emits high energy light can be used for the illuminant 50b of the polarized backlight unit 53.

As illustrated in FIG. 40, the polarized backlight unit 54 includes the polarization conversion element 65. The polarization conversion element 65 includes a polarization separation element 64a and a $\lambda/2$ waveplate 64b arranged on the emission side of the polarization separation element 64a. The polarization separation element 64a is arranged between the illuminant 50b and the light guide plate 50a and, with a polarization separation film formed therein, transmits a polarized component, of light emitted from the illuminant 50b, changing in the width direction of the light guide plate 50a and causes the polarized component to be incident on the light guide plate 50a. In addition, the polarization separation element 64a separates a polarized component changing in the thickness direction of the light guide plate 50a and causes the polarized component to be incident on the $\lambda/2$ waveplate 64b. The $\lambda/2$ waveplate 64b converts the polarized component changing in the thickness direction of the light guide plate 50a into the polarized component changing in the width direction and causes the converted polarized component to be incident on the light guide plate 50a. Accordingly, since the polarized component changing in the thickness direction of the light guide plate 50a is converted into the polarized component changing in the width direction before being incident on the light guide plate 50a, light that is transmitted by the polarization separation element 64a and incident on the light guide plate 50a includes a large amount of the polarized component changing in the width direction. Thus, light that is acquired from the light guide plate 50a of the polarized backlight unit 54 is also polarized backlight of a high degree of polarization. In the present specification, the polarization separation element 64a may be referred to as a "polarization separating unit". The $\lambda/2$ waveplate 64b may be referred to as a "polarization direction converting unit". The absorptive polarizer 62, the reflective polarizer 63, the polarization separation element 64a, and the λ/2 waveplate 64b may be collectively referred to as a "polarized component selecting unit".

If the polarized backlight unit 54 is used, the polarized component changing in the thickness direction of the light guide plate 50a can be efficiently converted into the polarized component changing in the width direction, and polarized backlight of a high degree of polarization is acquired.

Accordingly, arranging any of the absorptive polarizer 62, the reflective polarizer 63, and the polarization conversion element 65 between the illuminant 50b and the light guide plate 50a makes the polarized component changing in the thickness direction of the light guide plate 50a unlikely to be incident on the light guide plate 50a and can increase the degree of polarization of the polarized component acquired from the light guide plate 50a.

8.4 Fourth Polarized Backlight Unit

Figure 41:
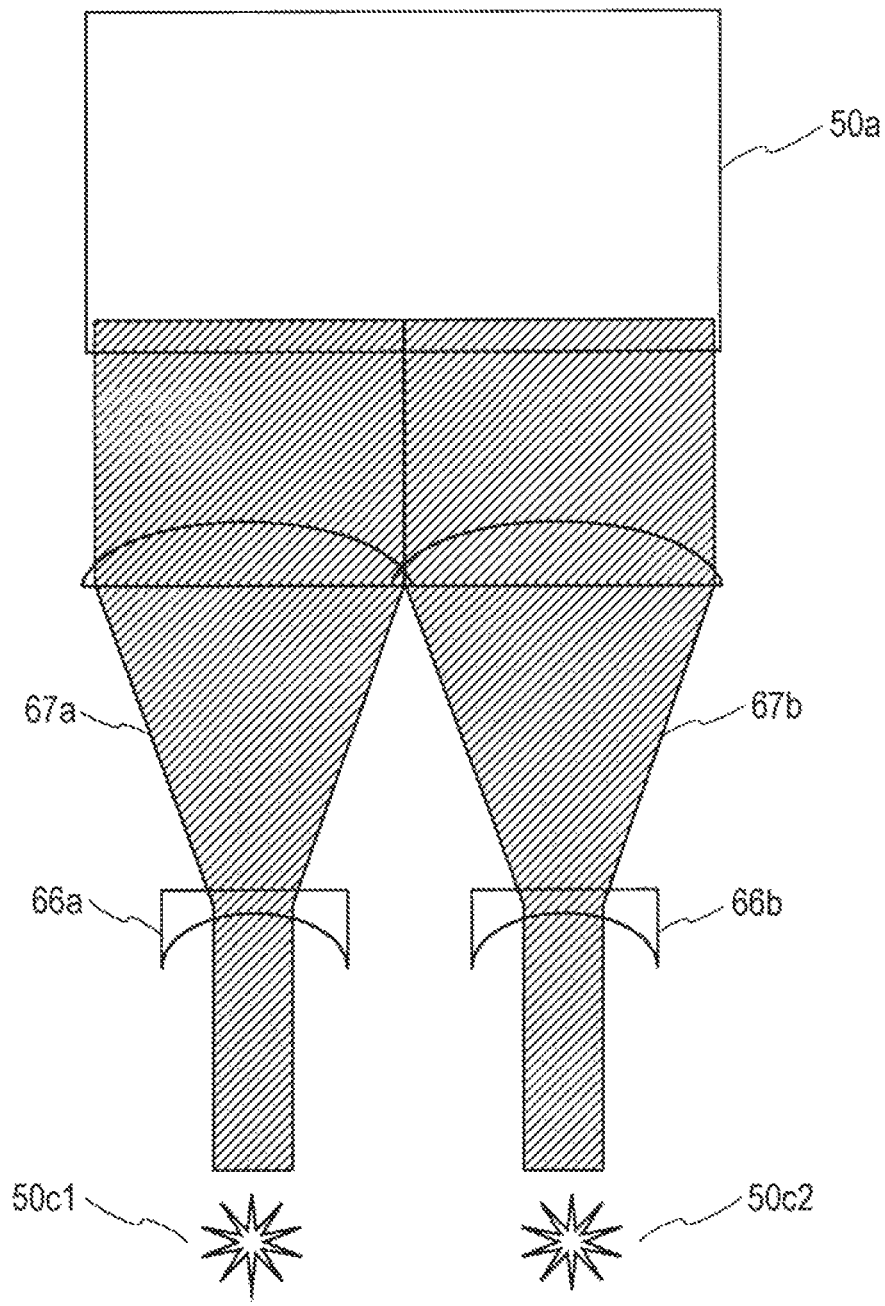
FIG. 41 is a diagram illustrating a configuration of a fourth polarized backlight unit in which two laser illuminants are used as an illuminant.

FIG. 41 is a diagram illustrating a configuration of a polarized backlight unit 55 in which two laser illuminants 50c1 and 50c2 are used as an illuminant. As illustrated in FIG. 41, two laser illuminants 50c1 and 50c2 that emit laser light are used as an illuminant attached to the light guide plate 50a. Laser light is characterized by not only having a high translation property but also having a significantly high degree of polarization. Thus, unlike the case of the above polarized backlight units 50 to 54, it is not required to improve the translation property of the illuminant light or increase the degree of polarization in such a manner that the polarized component changing in the thickness direction of the light guide plate 50a is not incident on the light guide plate 50a.

However, the beam diameter of the laser light is significantly small. Thus, in order to cause the laser light to be evenly incident on the light guide plate 50a, the laser light is required to be spread over the entirety of the light incidence edge of the light guide plate 50a. Therefore, as illustrated in FIG. 41, the two laser illuminants 50c1 and 50c2 are attached to the light guide plate 50a, and two cylindrical concave lenses 66a and 66b and two cylindrical convex lenses 67a and 67b are arranged between the light guide plate 50a and each of the laser illuminants 50c1 and 50c2. The cylindrical concave lens 66a destroys the translation property of the laser light emitted from the laser illuminant 50c1 to spread the laser light and causes the laser light to be incident on the cylindrical convex lens 67a. The cylindrical convex lens 67a restores the translation property of the spread laser light and then causes the laser light to be incident on the light guide plate 50a. Similarly, the cylindrical concave lens 66b and the cylindrical convex lens 67b as well spread the laser light emitted from the laser illuminant 50c2, restore the translation property of the laser light, and then cause the laser light to be incident on the light guide plate 50a. Accordingly, the laser light that is incident on the light guide plate 50a is light that has a high translation property and a high degree of polarization. The sum of the widths of the two cylindrical convex lenses 67a and 67b is set to be approximately equal to the width of the light guide plate 50a. Accordingly, if light that is transmitted by the cylindrical convex lenses 67a and 67b and incident on the light guide plate 50a is acquired from the light guide plate 50a, the light can be used as the polarized backlight. While two laser illuminants 50c1 and 50c2, two cylindrical concave lenses 66a and 66b, and two cylindrical convex lenses 67a and 67b are in FIG. 41, the number of illuminants, the number of cylindrical concave lenses, and the number of cylindrical convex lenses may be three or more provided that the same numbers of illuminants, cylindrical concave lenses, and cylindrical convex lenses are arranged. Regardless of the number of illuminants, the number of cylindrical concave lenses, and the number of cylindrical convex lenses, the sum of the widths of the cylindrical convex lenses is set to be approximately equal to the width of the light guide plate 50a at all times.

Laser light has a significantly narrow spectral width and thus can realize high color reproducibility. Thus, if the laser illuminant 50c is used, a display of high color reproducibility can be realized. However, since laser light is single color light, displaying a color image requires attaching three kinds of laser illuminants emitting laser light of each color of red (R), green (G), and blue (B) to the light incidence edge.

8.5 Fifth Polarized Backlight Unit

Figure 42:
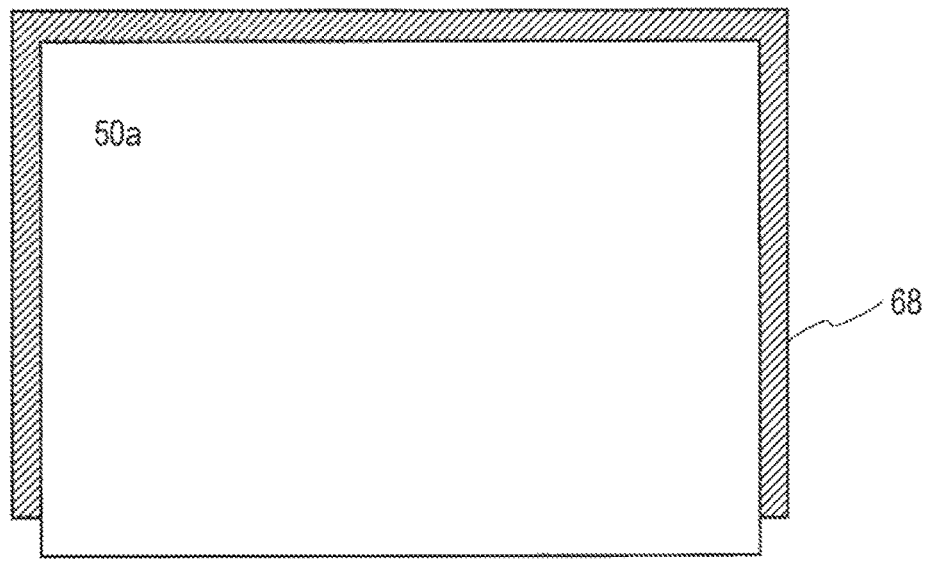
FIG. 42 is a diagram illustrating a configuration of a light guide plate that is used in a fifth polarized backlight unit and around which a non-scattering reflective layer is formed.

FIG. 42 is a diagram illustrating a configuration of a light guide plate 50d around which a non-scattering reflective layer 68 is formed. In a light guide plate in the related art (not illustrated), a white reflective sheet having a high scattering property is bonded to end surfaces at each edge of the light guide plate except for the light incidence edge in order to increase the efficiency of use of light. However, if light that is reflected by the white reflective sheet is incident on the white reflective sheet, the traveling direction or the polarization direction of the light is disturbed. Even if light of which the traveling direction or the polarization direction is disturbed is acquired from the light guide plate, the light cannot be used as the polarized backlight.

Therefore, as illustrated in FIG. 42, the non-scattering reflective layer 68 that has an angle of reflection equal to the angle of incidence and performs reflection without disturbing the polarization state is formed on the end surfaces at each edge of the light guide plate 50d except for the light incidence edge. The non-scattering reflective layer 68 can be realized by, for example, performing specular surface polishing processing of the end surfaces of the light guide plate 50d except for the light incidence edge and bonding a reflective film (for example, ESR series by 3M) or coating a reflective layer thereto.

Accordingly, forming the non-scattering reflective layer 68 on the end surfaces of the light guide plate 50d can prevent the traveling direction or the polarization direction of light, when being incident on the end surfaces of the light guide plate 50d and reflected, from changing. Thus, light of a high degree of polarization can be acquired from the light guide plate 50d. Therefore, a backlight unit in which the light guide plate 50d is used can be used as the polarized backlight unit 50.

8.6 Sixth Polarized Backlight Unit

Figure 43:
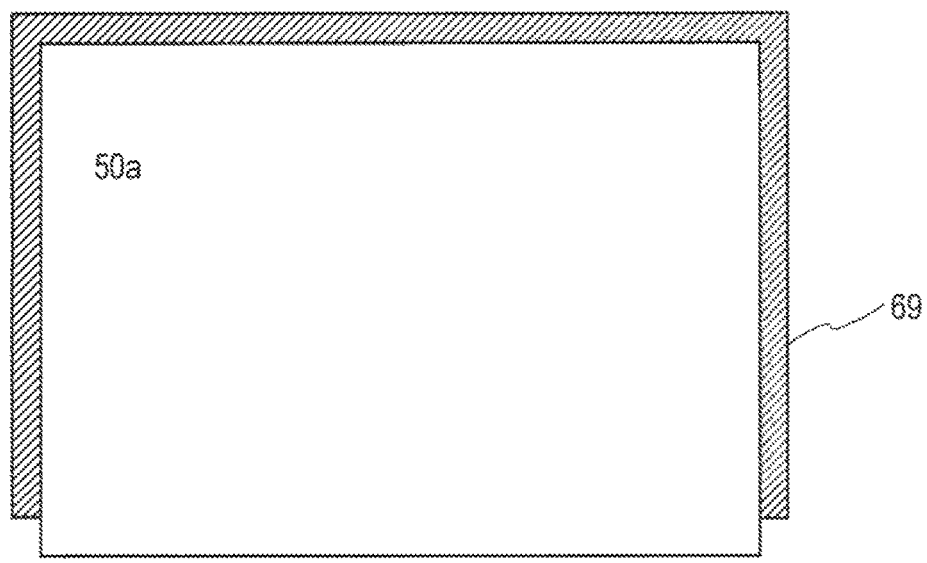
FIG. 43 is a diagram illustrating a configuration of a light guide plate that is used in a sixth polarized backlight unit and around which a light absorptive layer is formed.

FIG. 43 is a diagram illustrating a configuration of a light guide plate 50e around which a light absorptive layer 69 is formed. As illustrated in FIG. 43, the light absorptive layer 69 that absorbs light is formed on end surfaces at each edge of the light guide plate 50e except for the light incidence edge. The absorptive layer 69 can be realized by, for example, performing specular surface polishing processing of the end surfaces of the light guide plate 50e and bonding a light absorptive tape thereto. Light that is incident on the end surfaces of the light guide plate 50e is absorbed by the light absorptive layer 69 and not reflected. Accordingly, the traveling direction or the polarization direction of the polarized component propagating in the light guide plate 50e can be prevented from being disturbed, and light of a high degree of polarization can be acquired from the light guide plate 50e. Therefore, a backlight unit in which the light guide plate 50e is used can be used as the polarized backlight unit 50.

8.7 Seventh Polarized Backlight Unit

It is not preferable for the light guide plate to have birefringence. Thus, a material having an isotropic refractive index is used as the material constituting the light guide plate. However, even if the material having an isotropic refractive index is used, a distortion may be generated in manufacturing steps of the light guide plate, and a light guide plate having birefringence may be manufactured. The light guide plate having birefringence has anisotropy in refractive index. Thus, the polarization state is disturbed while light propagates in the light guide plate. In this case, light that is acquired from the light guide plate is light of a low degree of polarization and thus cannot be used as the polarized backlight. Therefore, using the light guide plate 50e having no distortion enables light of a high degree of polarization to be acquired. Accordingly, a backlight unit in which the light guide plate 50e is used can be used as the polarized backlight unit 50.

The light guide plate 50e having no distortion can be manufactured by using a zero-zero birefringence polymer. A zero-zero birefringence polymer is a polymer that has a birefringence of zero by removing anisotropy in polymer chain by copolymerization of monomers of different polarizability anisotropy. A method for manufacturing such a zero-zero birefringence polymer is disclosed in, for example, Japanese Unexamined Patent Application Publication No. 2012-233901.

8.8 Eighth Polarized Backlight Unit

Figure 44:
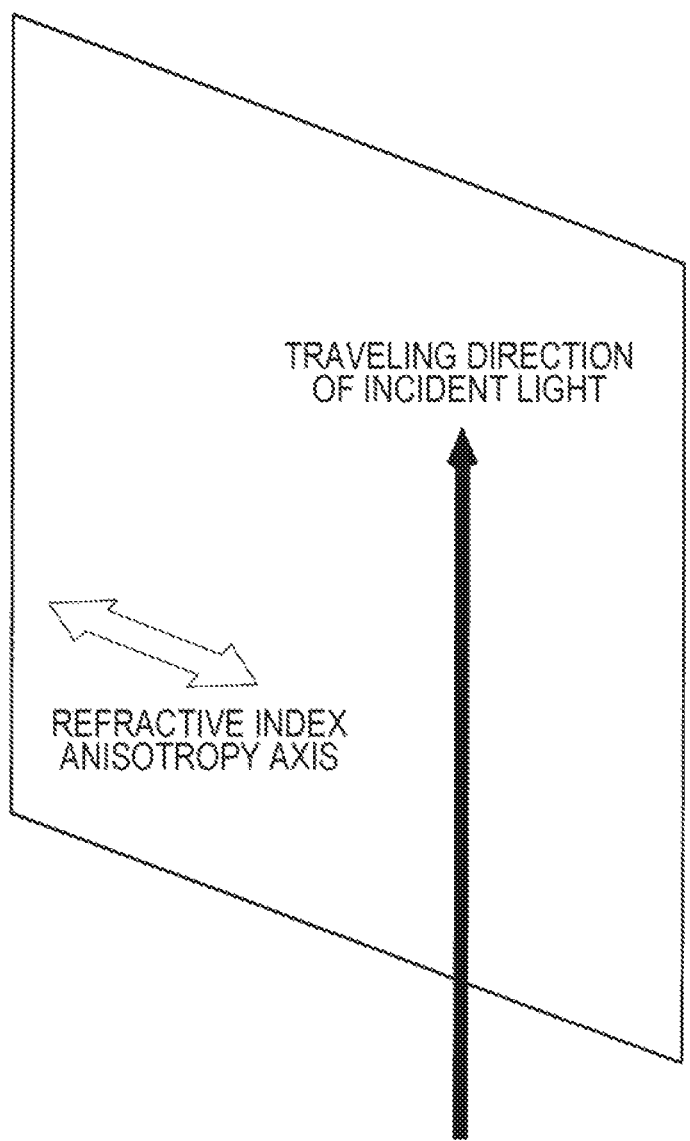
FIG. 44 is a diagram illustrating a relationship between a refractive index anisotropy axis and the traveling direction of a polarized component propagating in a light guide plate that is used in an eighth polarized backlight unit and in which the refractive index anisotropy axis is formed.

When illuminant light of linearly polarized light propagates in a light guide plate, the polarized component of the illuminant light propagates in a direction in which the refractive index changes (refractive index anisotropy axis). FIG. 44 is a diagram illustrating a relationship between a refractive index anisotropy axis and the traveling direction of a polarized component propagating in a light guide plate 50f in which the refractive index anisotropy axis is formed. The case of incidence of illuminant light on the light guide plate 50f of which the direction of the refractive index anisotropy axis is the width direction will be described. As illustrated in FIG. 44, the illuminant light that is incident from a lower edge of the light guide plate 50f and propagates upward in the light guide plate 50f propagates in such a manner that the polarization direction thereof is along the refractive index anisotropy axis. Therefore, if the direction of the refractive index anisotropy axis in the light guide plate 50f is set to be constant, the illuminant light incident on the light guide plate 50f propagates along the refractive index anisotropy axis without the polarization direction thereof being disturbed. Accordingly, the degree of polarization of the illuminant light emitted from the light guide plate 50f can be improved. Thus, a backlight unit in which the light guide plate 50f is used can be used as the polarized backlight unit 50. A light guide plate in which the refractive index anisotropy axis is formed in the thickness direction can also be used. In this case, the illuminant light emitted from the light guide plate 50f includes a large amount of a polarized, component of which the polarization direction is the width direction of the light guide plate 50f.

The light guide plate 50f that has a refractive index anisotropy axis in the width direction or the thickness direction is formed by generating a distortion in the width direction or the thickness direction by stretching or compression in the width direction or the thickness direction at the time of molding of the light guide plate 50f.

8.9 Ninth Polarized Backlight Unit

In the related art, as one method for acquiring, on the outside of a light guide plate, light that propagates by total internal reflection in the light guide plate, dots are printed on the surface of the light guide plate by using white pigment ink to scatter light incident on the dots. However, the polarization state is disturbed when light incident on the dots is scattered. Thus, it is not preferable to use, as the polarized backlight unit, the light guide plate in which dots configured of scattering ink are printed.

Figure 45:
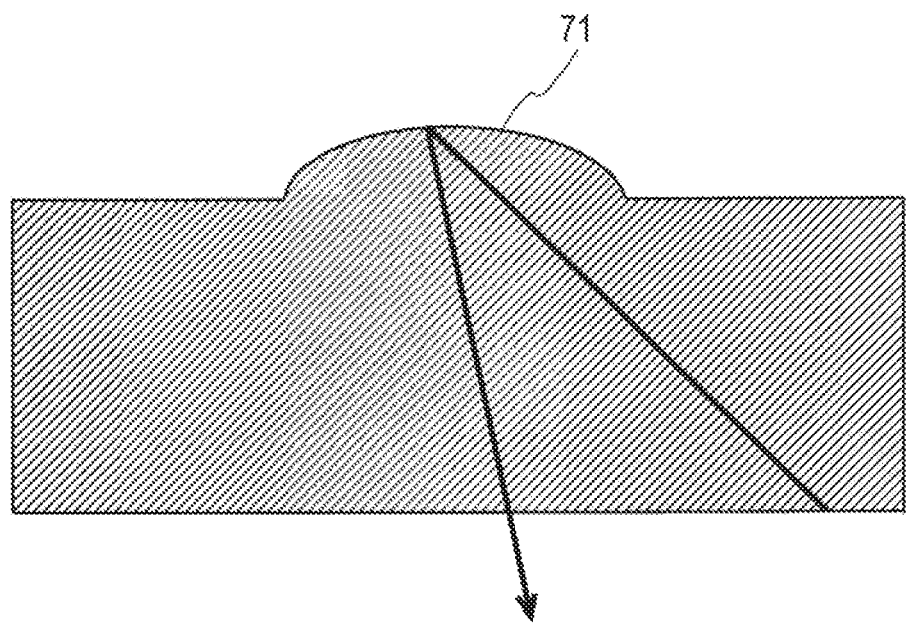
FIG. 45 is a diagram illustrating a light guide plate that is used in a ninth polarized backlight unit and in which a protrusion is formed on the surface thereof.
Figure 46:
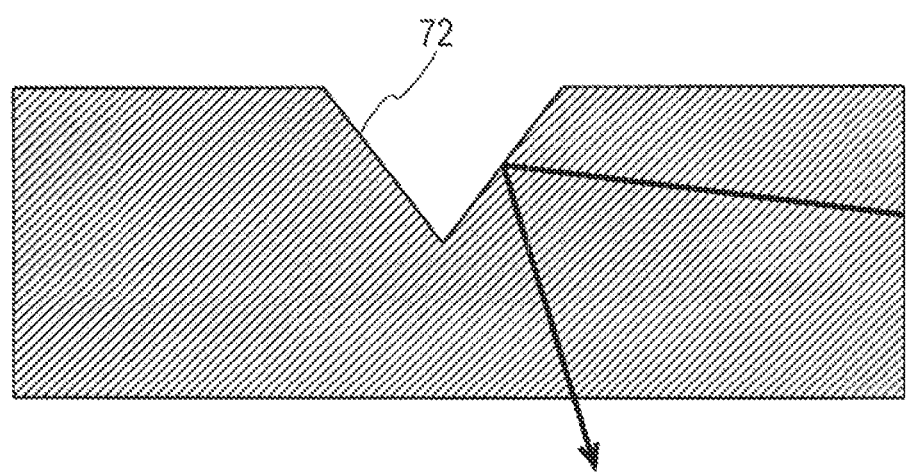
FIG. 46 is a diagram illustrating a light guide plate that is used in another ninth polarized backlight unit and in which a recess is formed on the surface thereof.

Therefore, a light guide plate of which the shape of the surface is changed is formed. FIG. 45 is a diagram illustrating a light guide plate 50g in which a protrusion 71 is formed on the surface thereof. FIG. 46 is a diagram illustrating a light guide plate 50h in which a recess 72 of is formed on the surface thereof.

As illustrated in FIG. 45, the protrusion 71 for reflecting light propagating in the light guide plate 50g is formed on the surface of the light guide plate 50g. A method for forming the protrusion 71 includes an inkjet printing method with transparent ink, a method of pressing a mold having the shape of the protrusion 71 on the surface of the light guide plate 50g, an injection method of pouring a transparent resin into a metal mold having the shape of the protrusion 71, and the like. The protrusion 71 formed by all of the methods is formed by using a material of the same or approximately the same refractive index as the material constituting the light guide plate 50g.

If light propagating in the light guide plate 50g is incident on the protrusion 71, the light is incident on the protrusion 71 without being refracted at the interface between the protrusion 71 and the light guide plate 50g and reflected on the surface of the protrusion 71. Accordingly, the reflected light is reflected without disturbing the polarization state. The protrusion 71 is not limited to the round shape illustrated in FIG. 45 and may have a shape of a triangular pyramid, a quadrangular pyramid, or the like provided that the shape of the protrusion 71 is a protruding shape and does not disturb the polarization state.

As illustrated in FIG. 46, the recess 72 for reflecting light propagating in the light guide plate 50h is formed on the surface of the light guide plate 50h. A method for forming the recess 72 includes a method of pressing a mold having the shape of the recess 72 on the surface of the light guide plate 50h, an injection method of pouring a transparent resin into a metal mold having the shape of the recess 72, a method of forming the recess 72 by melting the material constituting the light guide plate 50h by irradiation of the surface of the light guide plate 50a with laser light, and the like. The surface of the recess 72 formed by all of the methods is configured of the same material as the material constituting the light guide plate 50h. Thus, light that is incident on the recess 72 is reflected on the surface of the recess 72 without disturbing the polarization state. The recess 72 is not limited to the shape such as a triangular pyramid or a quadrangular pyramid illustrated in FIG. 46 provided that the shape of the recess 72 is a recessed shape and does not disturb the polarization state.

Accordingly, the shape of the light guide plate 50g or the light guide plate 50h in which a part of the surface shape thereof is deformed reflects a polarized component propagating in the light guide plate 50g or 50h and causes the polarized component to be acquired on the outside of the light guide plate 50g or 50h. Thus, the polarized component of a high degree of polarization can be acquired. Thus, a backlight unit in which the light guide plate 50g or 50h is used can be used as the polarized backlight unit 50.

INDUSTRIAL APPLICABILITY

The present invention can be applied to a display device that functions as a transparent display allowing the background to be seen therethrough.

REFERENCE SIGNS LIST

10 TO 16 ABSORPTIVE POLARIZER (ABSORPTIVE SEPARATING UNIT, POLARIZED COMPONENT SEPARATING UNIT)
20, 21 REFLECTIVE POLARIZER (REFLECTIVE SEPARATING UNIT, POLARIZED COMPONENT SEPARATING UNIT)
30 LIQUID CRYSTAL PANEL (ILLUMINANT/AMBIENT LIGHT ADJUSTING UNIT)
50 TO 55 POLARIZED BACKLIGHT UNIT (POLARIZED ILLUMINATION UNIT)
50a LIGHT GUIDE PLATE
50b ILLUMINANT
50c TO 50h LIGHT GUIDE PLATE
61 CYLINDRICAL LENS
62 ABSORPTIVE POLARIZER (ABSORPTIVE SEPARATING UNIT, POLARIZED COMPONENT SELECTING UNIT)
63 REFLECTIVE POLARIZER (REFLECTIVE SEPARATING UNIT, POLARIZED COMPONENT SELECTING UNIT)
64a POLARIZATION SEPARATION ELEMENT (POLARIZATION SEPARATING UNIT)
64b ½ WAVEPLATE (POLARIZATION DIRECTION CONVERTING UNIT)
65 POLARIZATION CONVERSION ELEMENT (POLARIZED COMPONENT SELECTING UNIT)
66 CYLINDRICAL, CONCAVE LENS
67 CYLINDRICAL, CONVEX LENS
68 NON-SCATTERING REFLECTIVE LAYER
69 LIGHT ABSORPTIVE LAYER
71 PROTRUSION
72 RECESS
80 λ/2 WAVEPLATE (POLARIZATION DIRECTION CHANGING UNIT)
100 TO 610 TRANSPARENT DISPLAY (DISPLAY DEVICE)

The invention claimed is:

1. A display device that can display an image on a transparent display through which background is seen from a front side of the display device, the display device comprising:
a first illuminant/ambient light adjusting unit that is configured of a pixel array having a plurality of pixels arranged therein and modulates a polarization direction of incident light for each of the pixels and transmits the incident light to the front side in a case where a voltage corresponding to an externally provided image signal is applied;
a polarized illumination unit that is arranged on a rear surface of the first illuminant/ambient light adjusting unit, transmits ambient light incident from a rear side thereof toward the first illuminant/ambient light adjusting unit, and emits polarized illumination light, of illuminant light emitted from an illuminant, including a specific polarization direction toward the first illuminant/ambient light adjusting unit; and
a first polarized component separating unit that is arranged on a front surface of the first illuminant/ambient light adjusting unit and transmits at least any of the ambient light and the polarized illumination light having a polarization direction in the same direction as a transmission axis thereof to the front side in a case where at least any of the ambient light and the polarized illumination light is incident;
wherein the polarized illumination unit includes the illuminant that emits the illuminant light, and a light guide plate that causes the illuminant light to propagate by total internal reflection on a surface thereof and emits the illuminant light to the front side and the rear side, the illuminant light includes at least a polarized component changing in a width direction of the light guide plate and is incident on the light guide plate from one edge or two opposite edges of the light guide plate, and the light guide plate emits the polarized component of the illuminant light changing in the width direction of the light guide plate to the front side and the rear side, and
wherein a refractive index anisotropy axis is formed in the light guide plate in the width direction or a thickness direction of the light guide plate.

2. The display device according to claim 1,
wherein the first polarized component separating unit is a first absorptive separating unit that absorbs a polarized component of the incident light in the same direction as an absorption axis thereof and transmits a polarized component having a polarization direction in the same direction as a transmission axis thereof.

3. The display device according to claim 1, further comprising:
a second polarized component separating unit that is arranged on a rear surface of the polarized illumination unit and transmits a polarized component, of the ambient light incident from the rear side, having a polarization direction in the same direction as a transmission axis thereof.

4. The display device according to claim 3,
wherein the first polarized component separating unit is a first reflective separating unit that reflects a polarized component of the incident light having a polarization direction in the same direction as a reflection axis thereof and transmits a polarized component having a polarization direction in the same direction as a transmission axis thereof, and
the second polarized component separating unit is a second absorptive separating unit that absorbs a polarized component of the incident light in the same direction as an absorption axis thereof and transmits a polarized component having a polarization direction in the same direction as a transmission axis thereof.

5. The display device according to claim 4, further comprising:
a third absorptive separating unit that is arranged on a front surface of the first reflective separating unit, absorbs a polarized component of the incident light in the same direction as an absorption axis thereof, and transmits a polarized component having a polarization direction in the same direction as a transmission axis thereof.

6. The display device according to claim 2, further comprising:
a light on/off control unit that is arranged on a front surface of the first absorptive separating unit, is configured of a pixel array having a plurality of pixels arranged therein, and modulates the incident light for each of the pixels and transmits the incident light to the front side in a case where a voltage corresponding to an externally provided image signal is applied; and
a third polarized component separating unit that is arranged on a front surface of the light on/off control unit, transmits a polarized component of the ambient light incident from the rear side toward the front side, and absorbs or transmits the polarized illumination light.

7. The display device according to claim 6,
wherein the first illuminant/ambient light adjusting unit and the light on/off control unit are arranged in close contact with each other with the first absorptive separating unit disposed therebetween, and
the size of the pixels included in the light on/off control unit is the same or approximately the same as the size of the pixels included in the first illuminant/ambient light adjusting unit.

8. The display device according to claim 2, further comprising:
a second illuminant/ambient light adjusting unit that is arranged on a rear surface of the polarized illumination unit, is configured of a pixel array having a plurality of pixels arranged therein, and modulates the polarization direction of the incident light for each of the pixels and transmits the incident light to the front side or the rear side in a case where a voltage corresponding to an externally provided image signal is applied; and
a fourth polarized component separating unit that is arranged on a rear surface of the second illuminant/ambient light adjusting unit, transmits a polarized component of the ambient light to the front side, and transmits the polarized illumination light or the ambient light incident from the front side to the rear side.

9. The display device according to claim 8,
wherein the first illuminant/ambient light adjusting unit and the second illuminant/ambient light adjusting unit are arranged in close contact with each other with the polarized illumination unit disposed therebetween, and
the size of the pixels included in the first illuminant/ambient light adjusting unit is different from the size of the pixels included in the second illuminant/ambient light adjusting unit.

10. The display device according to claim 3, further comprising:
a third illuminant/ambient light adjusting unit that is arranged on a rear surface of the second polarized component separating unit, is configured of a pixel array having a plurality of pixels arranged therein, and modulates the polarization direction of the incident light for each of the pixels and transmits the incident light to the front side or the rear side in a case where a voltage corresponding to an externally provided image signal is applied; and
a fifth polarized component separating unit that is arranged on a rear surface of the third illuminant/ambient light adjusting unit, transmits a polarized component of the ambient light to the front side, and transmits ambient light incident from the front side to the rear side.

11. The display device according to claim 1, further comprising:
a first polarization direction changing unit that changes a polarization direction of the polarized illumination light between the first illuminant/ambient light adjusting unit and the polarized illumination unit,
wherein the first polarization direction changing unit changes the polarization direction of the polarized illumination light to cause the polarized illumination light to be incident on the first illuminant/ambient light adjusting unit, thereby transmitting the polarized illumination light to the front side.

12. The display device according to claim 1, further comprising:
a light on/off control unit that is arranged on the front side of the first polarized component separating unit, is configured of a pixel array having a plurality of pixels arranged therein, and modulates the incident light for each of the pixels and transmits the incident light to the front side in a case where a voltage corresponding to an externally provided image signal is applied;
a third polarized component separating unit that is arranged on a front surface of the light on/off control unit; and
a second polarization direction changing unit that is arranged between the light on/off control unit and the first polarized component separating unit and changes a polarization direction of the polarized illumination light,
wherein the second polarization direction changing unit changes the polarization direction of the polarized illumination light to cause the polarized illumination light to be incident on the light on/off control unit, thereby transmitting the polarized illumination light to the front side.

13. The display device according to claim 1,
wherein the illuminant comprises a plurality of illuminants and a plurality of cylindrical lenses respectively arranged in correspondence with the plurality of illuminants between the plurality of illuminants and the light guide plate,
each of the plurality of cylindrical lenses aligns a traveling direction of the incident illuminant light and causes the illuminant light to be incident on the light guide plate in a state of the illuminant light being spread in the width direction, and
the sum of the widths of the plurality of cylindrical lenses is approximately the same as the width of the light guide plate.

14. The display device according to claim 1,
wherein the polarized illumination unit further includes a polarized component selecting unit that is arranged between the illuminant and the light guide plate, and
the polarized component selecting unit selects the polarized component, of polarized components included in the illuminant light, changing in the width direction of the light guide plate and emits the polarized component toward the light guide plate.

15. The display device according to claim 14,
wherein the polarized component selecting unit is an absorptive separating unit that absorbs a polarized component, of the polarized components included in the illuminant light, changing in a thickness direction of the light guide plate and transmits the polarized component changing in the width direction of the light guide plate.

16. The display device according to claim 14,
wherein the polarized component selecting unit is a reflective separating unit that reflects a polarized component, of the polarized components included in the illuminant light, changing in a thickness direction of the light guide plate and transmits the polarized component changing in the width direction of the light guide plate.

17. The display device according to claim 14,
wherein the polarized component selecting unit includes a polarization separating unit that separates a polarized component changing in the width direction of the light guide plate and a polarized component changing in a thickness direction of the light guide plate included in the illuminant light and a polarization direction converting unit that transmits only the polarized component changing in the thickness direction,
the polarization separating unit emits the polarized component, of the polarized components included in the illuminant light, changing in the width direction of the light guide plate toward the light guide plate and causes the polarized component changing in the thickness direction to be incident on the polarization direction converting unit, and
the polarization direction converting unit converts the polarized component changing in the thickness direction into the polarized component changing in the width direction of the light guide plate and emits the converted polarized component toward the light guide plate.

18. The display device according to claim 1,
wherein the illuminant is configured of a plurality of laser illuminants that emits laser light,
the polarized illumination unit includes a plurality of cylindrical concave lenses that destroys a translation property of the laser light emitted from each of the plurality of laser illuminants to spread the laser light, and a plurality of cylindrical convex lenses that restores the translation property of the laser light in correspondence with the plurality of cylindrical concave lenses, and
the sum of the widths of the plurality of cylindrical convex lenses is approximately the same as the width of the light guide plate.

19. The display device according to claim 1,
wherein the polarized illumination unit includes a non-scattering reflective layer that is formed on an end surface at an edge of the light guide plate except for a light incidence edge where the illuminant light is incident, and
the light guide plate reflects the illuminant light in a non-scattering manner, which propagates in the light guide plate and is incident on the non-scattering reflective layer, and causes the illuminant light to be emitted from a surface and an inner surface thereof.

20. The display device according to claim 1,
wherein the polarized illumination unit further includes a light absorptive layer that is formed on an end surface at an edge of the light guide plate except for a light incidence edge where the illuminant light is incident, and
the light guide plate causes the illuminant light that propagates in the light guide plate and is incident on the light absorptive layer to be absorbed by the light absorptive layer and causes the illuminant light that is not incident on the light absorptive layer to be emitted from a surface and an inner surface thereof.

\* \* \* \* \*